United States Patent
Hashimoto et al.

(10) Patent No.: US 8,331,316 B2
(45) Date of Patent: Dec. 11, 2012

(54) MOBILE COMMUNICATION SYSTEM

(75) Inventors: Masanori Hashimoto, Kawasaki (JP); Yasuo Tezuka, Kawasaki (JP); Nao Miyazaki, Kawasaki (JP); Kayo Motohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 882 days.

(21) Appl. No.: 12/232,002

(22) Filed: Sep. 9, 2008

(65) Prior Publication Data

US 2009/0141684 A1   Jun. 4, 2009

(30) Foreign Application Priority Data

Dec. 4, 2007 (JP) ................... 2007-313690

(51) Int. Cl.
*H04W 4/00* (2009.01)
*H04W 36/00* (2009.01)

(52) U.S. Cl. ......... 370/331; 455/436; 455/439; 455/442

(58) Field of Classification Search .................. None
See application file for complete search history.

(56) References Cited

U.S. PATENT DOCUMENTS

| | | | |
|---|---|---|---|
| 2006/0052107 A1 | 3/2006 | Isobe et al. | |
| 2007/0270146 A1* | 11/2007 | Suzuki et al. | 455/436 |
| 2009/0040982 A1* | 2/2009 | Ho et al. | 370/331 |
| 2009/0116445 A1* | 5/2009 | Samar et al. | 370/331 |
| 2009/0185539 A1* | 7/2009 | Ohta et al. | 370/331 |
| 2010/0329214 A1* | 12/2010 | Chun et al. | 370/331 |
| 2011/0122839 A1* | 5/2011 | Rexhepi et al. | 370/331 |

FOREIGN PATENT DOCUMENTS

| | | |
|---|---|---|
| JP | 2006-80690 A | 3/2006 |
| JP | 2007013463 A | 1/2007 |
| JP | 2007-104344 | 4/2007 |
| JP | 2007221378 A2 | 8/2007 |

OTHER PUBLICATIONS

Ericsson, "Inter eNodeB handover with CN node relocation (Discussion/Approval) (Agenda Item 7.8)", 3$^{rd}$ Generation Partnership Project, 3GPP TSG-RAN WG3 Meeting #55bis (R3-070623), Mar. 2007, pp. 1-6.

Technical Specification Group Services and System Aspects, "GPRS Enhancements for E-UTRAN Access (Release 8)", 3$^{rd}$ Generation Partnership Project, 3GPP TS 23.401 V1.3,0, Oct. 2007, pp. 1-136.

(Continued)

*Primary Examiner* — Ayaz Sheikh
*Assistant Examiner* — Sori Aga
(74) *Attorney, Agent, or Firm* — Murphy & King, P.C.

(57) ABSTRACT

A mobile communication system has a plurality of nodes, hierarchically connected to each other, including a source base station and a target base station. A U-plane management station includes detecting unit detecting a handover for the mobile terminal, and a Bi-casting unit redundantly transmitting, when detecting the handover for the mobile terminal, the same user data addressed to the mobile terminal toward both of the source base station and the target base station. The target base station includes a retaining unit receiving the user data addressed to the mobile terminal, which is transmitted by the U-plane management station, and retaining the user data, and a wireless transmitting unit wirelessly transmitting, when the mobile terminal is wirelessly connected after moving, the user data requested by the mobile terminal in the user data retained by the retaining unit and addressed to the mobile terminal.

17 Claims, 27 Drawing Sheets

OTHER PUBLICATIONS

Technical Specification Group Services and System Aspects, "Architecture Enhancements for non-3GPP accesses (Release 8)", 3$^{rd}$ Generation Partnership Project, 3GPP TS 23.402 V1.4.0, Oct. 2007, pp. 1-125.

Technical Specification Group Radio Access Network, "Evolved Universal Terrestrial Radio Access (E-UTRA) and Evolved Universal Terrestrial Radko Access Network (E-UTRAN) (Stage 2—Release 8)", 3$^{rd}$ Generation Partnership Project, 3GPP TS 36.300 V8.2.0, Sep. 2007, pp. 1-57.

Japanese Notice of Reason for Rejection dated Jun. 5, 2012 issued in application No. 2007-313690.

* cited by examiner

FIG. 6

| UE IDENTIFIER | UE-eNB IDENTIFICATION NUMBER | eNB-SAE IDENTIFICATION NUMBER |
|---|---|---|
| UE7 (#1) | 1 | 11 |
| | 2 | 12 |
| | 3 | 13 |
| | 4 | 14 |
| | 5 | 15 |
| ... | ... | ... |

FIG. 9

| eNB-SAE IDENTIFICATION NUMBER | SAE-PSAE IDENTIFICATION NUMBER |
|---|---|
| 1 1 | 1 1 1 |
| 1 2 | 1 1 2 |
| 1 3 | 1 1 3 |
| 1 4 | 1 1 4 |
| 1 5 | 1 1 5 |
| . . . | . . . |

MOBILE COMMUNICATION SYSTEM

This application claims the benefit of Japanese Patent Application No. 2007-313690 filed on Dec. 4, 2007 in the Japanese Patent Office, the disclosure of which is herein incorporated in its entirety by reference.

BACKGROUND OF THE INVENTION

1. Field of the Invention

The present invention relates to a handover communication technology for a mobile terminal in a mobile communication system.

2. Description of the Related Art

A communication system, which is generically termed an LTE (Long Term Evolution), exists as a fast data communication system for mobile equipment, of which standardization is now progressed by 3GPP (3rd Generation Partnership Project). The LTE is ranked as a stage for further evolving a W-CDMA (Wideband-Code Division Multiple Access) system etc called 3G and an HSDPA (High Speed Downlink Packet Access) system etc called 3.5G and for attaining a smooth shift scheme to the next generation (4G).

FIG. 25 is a diagram showing an example of a logical architecture of an LTE mobile communication system. As illustrated in FIG. 25, the LTE mobile communication system at the present stage (which will hereinafter be referred to as a conventional LTE mobile communication system) is built up by an evolved Node B (which will hereinafter be abbreviated to eNB) 511, an MME (Mobility Management Entity) 512, an SAE-GW (System Architecture Evolution GateWay) 513, an HSS (Home Subscriber Server) 514, a PDN-SAE-GW (Packet Data Network SAE GW) 515, a user terminal (which will hereinafter be referred to as UE (User Equipment)) 516, etc.

Roles of respective nodes configuring this type of LTE mobile communication system are defined as follows. The eNB 511 has a role as a wireless base station. The SAE-GW 513 has a role as a gateway that mainly manages a user plane (which will hereinafter be abbreviated to the U-plane) for controlling transmission and reception of user data between users. The MME 512 has a role as a gateway that mainly controls a user call for controlling the U-plane, manages a control plane (which will hereinafter be abbreviated to a C-plane) for controlling a connection etc, and performs movement management control of the UE 516. The HSS 514 has a role as a server that retains subscriber data, and the PDN-SAE-GW 515 has a role as a gateway that manages the SAE-GW 513 and connects the self-system to an external network such as an IMS (IP Multimedia Subsystem) 510. Thus, the LTE mobile communication system distributes a function of a conventional RNC (Radio Network Controller) among the eNB 511, the MME 512, the SAE-GW 513, etc and omits the RNC node itself.

As for a topology, an interface connecting the respective eNBs 511 to each other is called an X2 interface (X2 in FIG. 25), and an interface connecting between the eNB 511, the MME 512 and the SAE-GW 513 is called an S1 interface.

In this type of LTE mobile communication system also, the handover process accompanying a movement of the UE 516 is important. Namely, when the UE 516 moves from a communication source base station (which will hereinafter be termed S-eNB (Source-eNB)) to a communication destination base station (which will hereinafter be termed T-eNB (Target-eNB)), it is required that all the user data are forwarded without setting in a communication-disconnected status and causing any loss. An examination of a technique for realizing this type of no-loss handover in the LTE mobile communication system is now underway. In the handovers, a handover, in which a management unit of the MME 512 and the SAE-GW 513 changes before and after the UE 516 has moved, and the X2 interface between the S-eNB and the T-eNB can not be utilized, will hereinafter be expressed as an S1 base handover.

An outline of the S1 base handover process in the conventional LTE mobile communication system will be explained with reference to FIGS. 26 and 27. FIGS. 26 and 27 are diagrams each showing the outline of the S1 base handover process in the conventional LTE mobile communication system.

The S-eNB 521 determines the handover for the UE 529 on the basis of reception quality information etc given from the UE 529 (S1). When the S-eNB 521 determined the handover, an S-MME 523, a T-MME 524, a T-eNB 522, a T-SAE-GW 526 transmit and receive a C-plane control message shown in FIG. 26, thereby notifying a PDN-SAE-GW 528 of the handover for the UE 529 (S2), (S3), (S4a), etc.).

On the other hand, when a preparation for the handover for the UE 529 is completed on the system side by transmitting and receiving the C-plane control message, the S-eNB 521 sends a Handover Command message to the UE 529 (S9). With this operation, the UE 529 secedes from a precedent cell managed by the S-eNB 521 and starts a process of synchronizing with a present cell managed by the T-eNB 522.

The UE 529, upon taking the synchronism with the present cell, sends a Handover Confirm message to the T-eNB 522 in order to notify of an approval of the handover (S11). The T-eNB 522 receives this message, thereby detecting the approval of the handover for the UE 529. Thereafter, the T-eNB 522 sends a Relocation Complete message to the T-MME 524 (S12). Subsequently, the T-MME 524 transmits an Update Context Request (SAE-GW) message to the T-SAE-GW 526 (S14).

Finally, the PDN-SAE-GW 528 detects the approval of the handover for the UE 529 by receiving the Update Context Request (PDN-SAE-GW) message from the T-SAE-GW 526 (S15a).

Note that the following documents are disclosed as the documents of the related arts related to the invention of the present application. The first document is a "Japanese Patent Laid-Open Publication No. 2006-80690". The second document is a "Japanese Patent Laid-Open Publication No. 2007-104344". The third document is a "Ericsson, "Inter eNodeB handover with CN node relocation (Discussion/Approval) (Agenda Item 7.8)", 3rd Generation Partnership Project, 3GPP TSG-RAN WG3 Meeting #55bis (R3-070623), Mar. 27-30, 2007". The fourth document is a "Technical Specification Group Services and System Aspects, "GPRS enhancements for E-UTRAN access (Release 8)", 3rd Generation Partnership Project, 3GPP TS 23.401 V1.3.0, October 2007, p. 73-76". The fifth document is a "Technical Specification Group Services and System Aspects, "Architecture Enhancements for non-3GPP accesses (Release 8)", 3rd Generation Partnership Project, 3GPP TS 23.402 V1.4.0, October 2007". The sixth document is a "Technical Specification Group Radio Access Network, "Evolved Universal Terrestrial Radio Access (E-UTRA) and Evolved Universal Terrestrial Radio Access Network (E-UTRAN) (Stage 2-Release 8)", 3rd Generation Partnership Project, 3GPP TS 36.300 V8.2.0, September 2007".

In the conventional LTE mobile communication system described above, when taking the handover in the status where the management unit of the MME 512 and the SAE-GW 513 remains unchanged, if the S-eNB and the T-eNB mutually transmit and receive the uplink data or the downlink data via the X2 interface, the no-loss handover can be actualized. When taking the S1 base handover, however, it is not an easy to realize the no-loss handover.

The S1 base handover in the conventional LTE mobile communication system causes a time lag till the PDN-SAE-GW 528 detects an approval of a handover since the UE 529 actually has approved a connection handover from the S-eNB 521 to the T-eNB 522. To be specific, the UE 529 has already approved the connection handover just when the Handover Confirm message is sent to the T-eNB 522 (S11). The PDN-SAE-GW 528, however, finally comes to know the connection handover of the UE 529 from the Update Context Request (PDN-SAE-GW) message (S15a) through (S12) and (S14) after the T-eNB 522 has received the Handover Confirm message.

Accordingly, when the data is downlinked to the UE 529 from the PDN-SAE-GW 528, the UE 529 takes the handover, in which case the connection target of the UE 529 has already been switched over to the T-eNB 522, and nevertheless it follows that the PDN-SAE-GW 528 continues to transmit the downlink data for the UE 529 to the S-eNB 521 during the time lag.

At this time, if not the S1 base handover, the X2 interface can be utilized, and hence the S-eNB 521 may forward the downlink data to the T-eNB 522 via the X2 interface (S10). The S1 base handover illustrated in FIGS. 26 and 27 is, however, disabled from using the X2 interface because the management unit of the MME and the SAE-GW changes before and after the UE has moved (from the S-MME 523 to the T-MME 524, and from the S-SAE-GW 525 to the T-SAE-GW 526) ((S10) in FIG. 27).

Such being the case, what is considered is a technique of selecting a route (S10') such as S-eNB 521→S-SAE-GW 525→PDN-SAE-GW→T-SAE-GW→T-eNB 522 in order to transmit, to the T-eNB 522, the data that has already been sent to the S-eNB 521 during the time lag. This technique, however, causes a large time lag due to a multiplicity of via-nodes, and further comes to wastefully consume communication bandwidths between the individual nodes. Note that only a signaling route on the C-plane is established between the S-MME 523 and the T-MME 524, and therefore this C-plane route can not be utilized for forwarding the user data.

Further, if the UE 529 takes the S1 handover when the data is uplinked to the PDN-SAE-GW 528 from the UE 529, the PDN-SAE-GW 528 can not take sequence matching of the uplink data, and hence it is required that, after the T-eNB 522 has taken the sequence matching, the data are uplinked in a due sequence to the PDN-SAE-GW 528 via the T-SAE-GW 526. If not the S1 base handover, the X2 interface can be utilized, so that the S-eNB 521 may forward the uplink data to the T-eNB 522 via the X2 interface (S10). The S1 base handover can not, however, utilize this X2 interface ((S10) in FIG. 27).

Accordingly, a thinkable technique about the S1 base handover is a technique of transmitting the uplink data received by the S-eNB 521 to the T-eNB 522 via the same route (S10') as when downlinked. This technique, however, causes the large time lag due to the multiplicity of via nodes as when downlinked, and further comes to wastefully consume the bandwidths between the respective nodes.

SUMMARY OF THE INVENTION

It is an object of the present invention to provide a technology for actualization of uplinking and downlinking user data without any loss while restraining a traffic quantity within a mobile communication system when taking a handover for a mobile terminal.

Each of embodiments according to the present invention adopts the following configurations in order to solve the problems given above. Namely, a first embodiment of the present invention is a mobile communication system comprising a plurality of nodes, hierarchically connected to each other, including a source base station wirelessly connected to a mobile terminal, and a target base station to which the mobile terminal connects after moving, a U-plane management station defined as a high-order node connected to both of the source base station and the target base station and managing a user plane, including: a detecting unit detecting a handover for the mobile terminal; and a Bi-casting unit redundantly transmitting, when detecting the handover for the mobile terminal, the same user data addressed to the mobile terminal toward both of the source base station and the target base station, the target base station including: a retaining unit receiving the user data addressed to the mobile terminal, which is transmitted by the U-plane management station, and retaining the user data; and a wireless transmitting unit wirelessly transmitting, when the mobile terminal is wirelessly connected after moving, the user data requested by the mobile terminal in the user data retained by the retaining unit and addressed to the mobile terminal.

According to the first embodiment of the present invention, when the U-plane management station detects the handover for the mobile terminal, the same data addressed to the mobile terminal is redundantly transmitted toward both of the source base station and the target base station, respectively. In the redundantly-transmitted user data, the user data received by the target base station is retained by the target base station, and, if the mobile terminal moves and wirelessly connects to the target base station, the user data requested by the mobile terminal in the retained user data is wirelessly transmitted (downlinked) to the mobile terminal.

For example, if the source base station determines the handover for the mobile terminal, a wireless communication state between the mobile terminal and the source base station is deteriorated in many cases. Under such a state, the mobile terminal can not normally receive the user data downlinked from the source base station as the case may be.

According to the first embodiment of the present invention, however, the user data addressed to the mobile terminal is redundantly transmitted to the source base station and to the target base station, and therefore the mobile terminal can receive the user data from any one of the source base station and the target base station before and after the handover. Hence, according to the first embodiment of the present invention, when taking the handover for the mobile terminal, it is feasible to realize uplinking and downlinking the user data without any loss. Furthermore, there is no necessity for transmitting the user data already transmitted to the source base station again to the target base station via the U-plane management station as described by way of the prior art, and a traffic quantity within the system can therefore be also restrained.

Further, preferably in the first embodiment of the present invention, the Bi-casting unit of the U-plane management station attaches the same identification number to the same user data transmitted toward both of the source base station and the target base station, and transmits the same user data together with the identification number attached thereto, and the wireless transmitting unit of the target base station receives the identification number specifying the user data desired by the mobile terminal from the mobile terminal and selects, based on the received identification number, the should-be-wirelessly-transmitted user data from within the user data retained by the retaining unit and addressed to the mobile terminal.

Thus, according to the first embodiment of the present invention, the same identification number is attached to the same user data that is redundantly transmitted toward both of the source base station and the target base station.

Hence, according to the first embodiment of the present invention, the mobile terminal can surely receive, from the target base station, the user data that could not be received by the source base station in a way that specifies this user data. The same user data is attached with the same identification number, and therefore the user data received from both of the source base station and the target base station can be accurately controlled.

A second embodiment of the present invention is a mobile communication system comprising a plurality of nodes, hierarchically connected to each other, including a source base station wirelessly connected to a mobile terminal, and a target base station to which the mobile terminal connects after moving, a U-plane management station defined as a high-order node connected to both of the source base station and the target base station and managing a user plane, including: a detecting unit detecting a handover for the mobile terminal; a retaining unit retaining, after detecting the handover for the mobile terminal, on the occasion of transmitting the user data addressed to the mobile terminal toward the source base station, a copy of the user data; and a retransmitting unit transmitting, when the mobile terminal is wirelessly connected to the target base station, the user data requested by the mobile terminal toward the target base station in the user data retained by the retaining unit and addressed to the mobile terminal.

According to the second embodiment of the present invention, when the U-plane management station detects the handover for the mobile terminal, the user data addressed to the mobile terminal is transmitted toward the source base station, and the copy of the transmitted user data is retained. This retained user data is, if the mobile terminal moves and wirelessly connects to the target base station, retransmitted via the target base station according to a request given from the mobile terminal.

Therefore, according to the second embodiment of the present invention, after detecting the handover for the mobile terminal, the user data addressed to the mobile terminal is transmitted toward the source base station and is also retained by the U-plane management station, and hence the mobile terminal can receive the user data from any one of the source base station and the target base station before and after the handover. Hence, according to the second embodiment of the present invention, when taking the handover for the mobile terminal, it is feasible to realize uplinking and downlinking the user data without any loss.

Moreover, on the occasion of realizing the no-loss handover, the U-plane management station redundantly retains the copy of the user data that has already been transmitted toward the source base station, and hence, as compared with a case of transmitting the user data already transmitted to the source base station again to the target base station via the U-plane management station as described by way of the prior art, the traffic quantity within the system can be further restrained.

Still further, preferably in the second embodiment of the present invention, the retaining unit of the U-plane management station attaches the same identification number as the identification number attached to the user data already transmitted toward the source base station, to the user data retained as the copy of the user data by the retaining unit, and the retransmitting unit of the U-plane management station acquires the identification number specifying the user data desired by the mobile terminal via the target base station, and selects, based on the acquired identification number, the user data that should be transmitted toward the target base station from within the user data retained by the retaining unit and addressed to the mobile terminal.

Thus, in the second embodiment of the present invention, the same identification number is attached to the user data already transmitted toward the source base station and to the copy of the user data once retained by the U-plane management station and retransmitted toward the target base station.

Accordingly, in the second embodiment of the present invention, the mobile terminal can surely receive the user data, which could not be received from the source base station, in a way that specifies the user data. The same identification number is attached to the same user data, and therefore the user data received from both of the source base station and the target base station can be precisely controlled.

Yet further, preferably in the second embodiment of the present invention, the target base station includes: a request forwarding unit getting, when receiving a message containing the identification number specifying the user data desired by the mobile terminal from the mobile terminal, this identification number contained in the predetermined message, and forwarding the predetermined message to a target C-plane management station defined as a high-order node over the target base station and managing a control plane of the target base station, and the retransmitting unit of the U-plane management station acquires the identification number specifying the user data desired by the mobile terminal through a message received via the target C-plane management station and via a target U-plane management station defined as a high-order node over and the target base station and managing the user plane of the target base station.

Moreover, preferably in common to the first embodiment and the second embodiment of the present invention, the source base station includes: a management unit managing, when receiving the user data and identifying information specifying the user data wirelessly transmitted from the mobile terminal after detecting the handover for the mobile terminal, a sequence of the received user data based on the identifying information specifying the user data; and an uplink unit forwarding, if the management unit determines that the received user data is received in a due sequence, the received user data to the U-plane management station, and, whereas if the management unit determines that the received user data is not received in the due sequence, does not forward but retains the received user data.

In this preferred embodiment, the user data (uplink data) wirelessly transmitted from the mobile terminal undergoes the sequence management corresponding to the identifying information in the source base station, the user data received in the due sequence is forwarded toward the U-plane management station, and the user data, which is not received in the due sequence, is forwarded to and retained by the source base station.

According to these embodiment, for example, when the mobile terminal is wirelessly connected to the target base station after moving, the user data, of which delivery acknowledgment to the source base station was not acquired, is again wirelessly transmitted via the target base station, which scheme enables the U-plane management station to receive and forward the uplink data from the mobile terminal without any loss.

It should be noted that another embodiment of the present invention may be a user data transmission method executed in the mobile communication system according to the first and second embodiments, a program for making a computer realize any one of the functions of the mobile communication system according to the first and second embodiments, and also a storage medium recorded with such a program that can be read by the computer.

According to the embodiments of the present invention, it is feasible to realize the technology for actualization of uplinking and downlinking user data without any loss while restraining the traffic quantity within the mobile communication system when taking the handover for the mobile terminal.

BRIEF DESCRIPTION OF THE DRAWINGS

FIG. 6 is a diagram showing an example of an identification number conversion table 50 of the eNB 10 in the first embodiment;

FIG. 9 is a diagram showing an example of an identification number conversion table 66 of the SAE-GW 30 in the first embodiment;

DESCRIPTION OF THE PREFERRED EMBODIMENTS

An LTE mobile communication system (which will hereinafter be simply referred to as the LTE system) according to a best mode (which will hereinafter be termed an embodiment) for carrying out the present invention will hereinafter be described with reference to the drawings. Configurations in the following embodiments are exemplifications, and the present invention is not limited to the configurations in the embodiments.

First Embodiment

The LTE system according to a first embodiment will be discussed.

[System Architecture]

Figure 1:
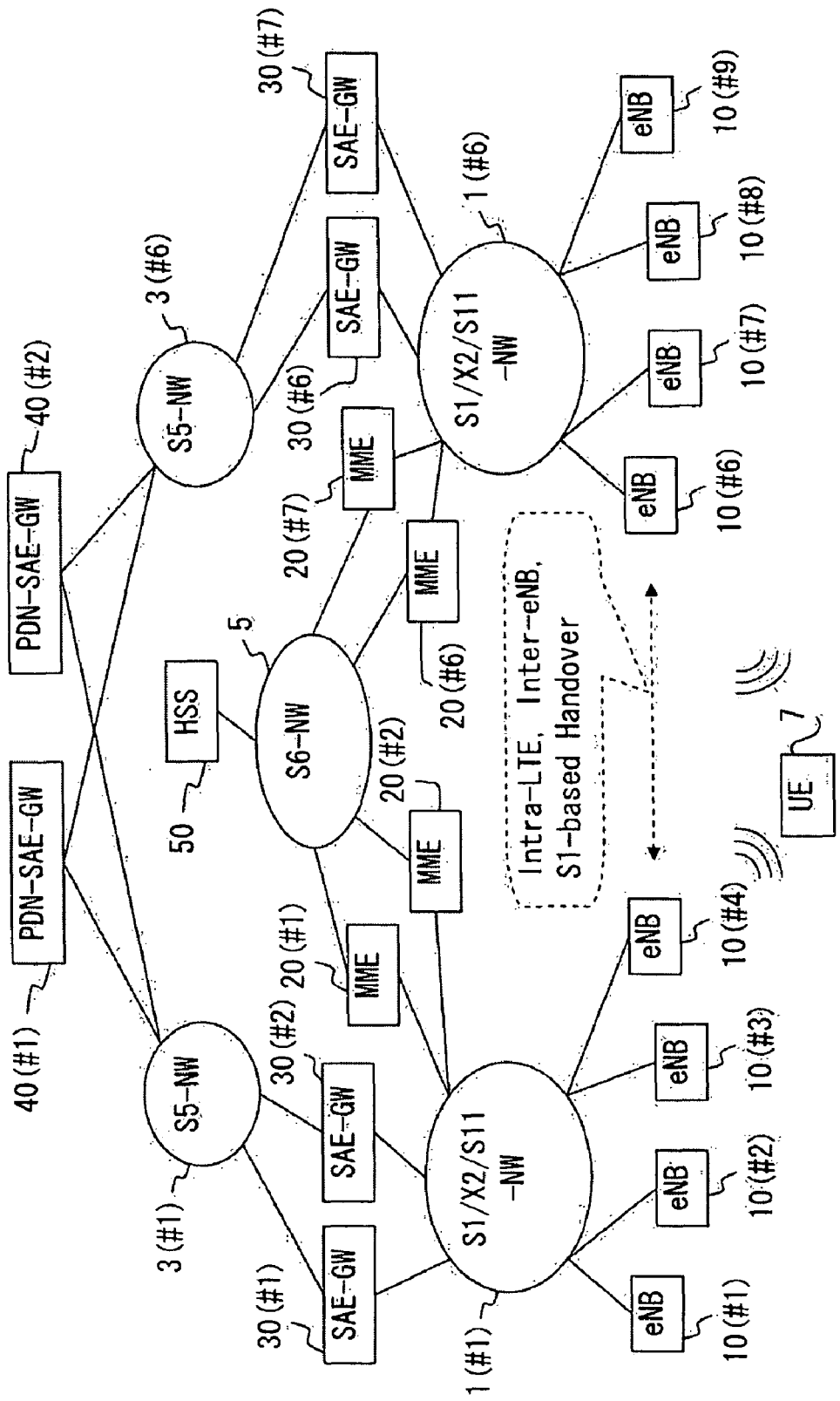
FIG. 1 is a diagram showing an example of a system architecture of an LTE system in a first embodiment.

To start with, a system architecture of the LTE system in the first embodiment will be described with reference to FIG. 1. FIG. 1 is a diagram showing an example of the system architecture of the LTE system in the first embodiment.

As shown in FIG. 1, the LTE system in the first embodiment is configured by an eNB 10, an MME 20, an SAE-GW 30, a PDN-SAE-GW 40, an HSS 50, etc and provides a predetermined mobile communication service to a mobile terminal (User Equipment, which will hereinafter be abbreviated to UE) 7 connected to the present system. The UE 7 connects, corresponding to its location, to at least one eNB 10 by the wireless link, thus connecting with the LTE system. Note that the first embodiment does not limit the mobile communication service provided to the UE 7 by the LTE system. Further, each of these nodes configuring the LTE system according to the first embodiment represents a logical node, and hence an available scheme is that any nodes illustrated in FIG. 1 may be realized by one single device. An outline of a role of each node is as already described in the "Background Art" section.

A topology is that the nodes eNBs 10(#1), 10(#2), 10(#3) and 10(#4), the SAE-GWs 30(#1) and 30(#2), and the MMEs 20(#1) and 20(#2) are respectively connected to a network 1(#1). On the other hand, the nodes eNBs 10(#6), 10(#7), 10(#8) and 10(#9), the SAE-GWs 30(#6) and 30(#7), and the MMEs 20(#6) and 20(#7) are respectively connected to a network 1(#6).

Further, the SAE-GWs 30(#1), 30(#2), and the PDN-SAE-GWs 40(#1), 40(#2) are respectively connected to a network 3(#1), while the SAE-GWs 30(#6), 30(#7) and the PDN- SAE-GWs 40(#1), 40(#2) are connected to the network 3(#6). The MMEs 20(#1), 20(#2), 20(#6), 20(#7) and the HSS 50 are individually connected to a network 5.

Figure 2:
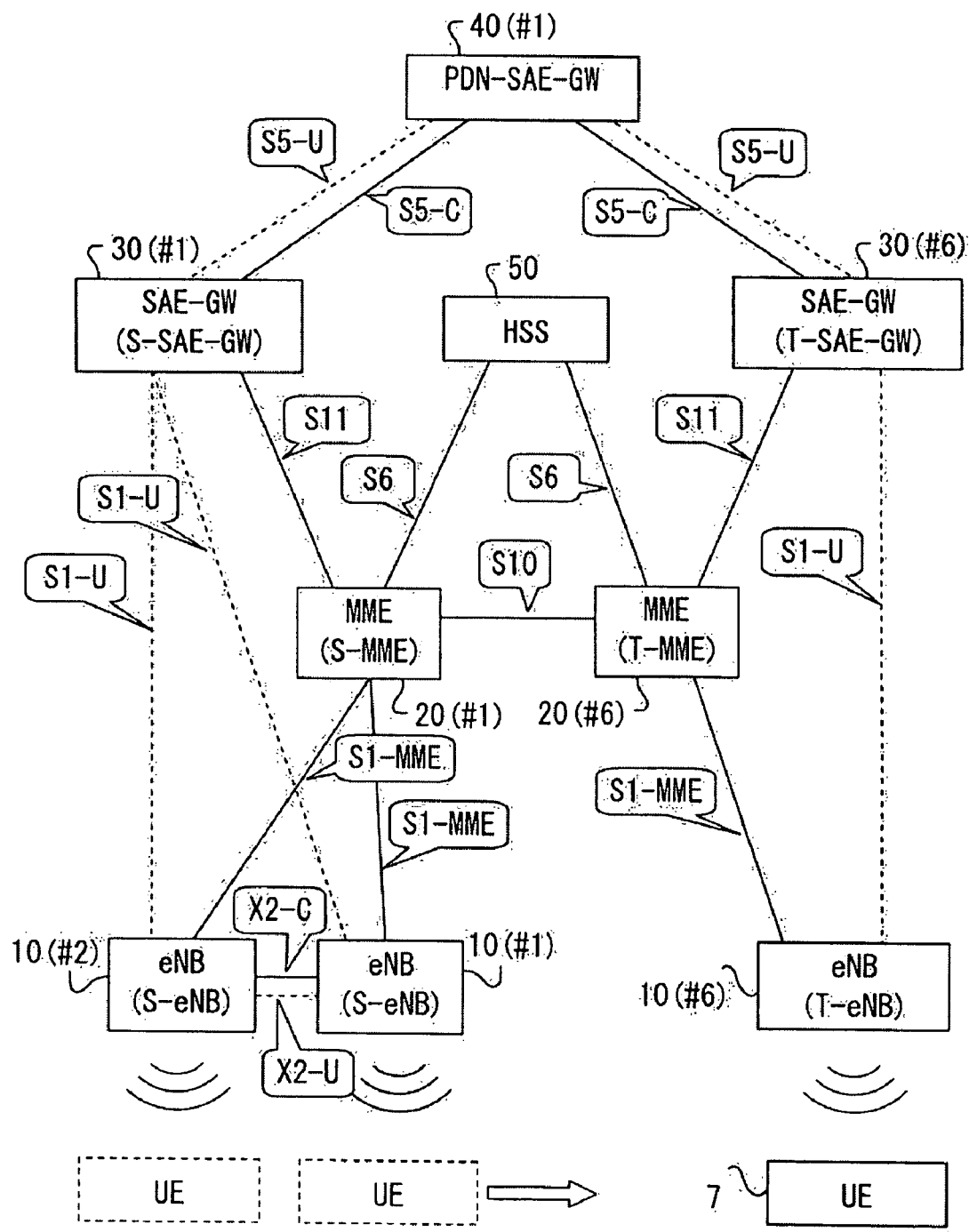
FIG. 2 is a diagram showing an example of a logical topology of the LTE system in the first embodiment.

FIG. 2 is a diagram showing an example of a logical topology of the LTE system in the first embodiment. Each of lines connecting the respective logical nodes in FIG. 2 represents an interface, an interface depicted by a solid line designates a C-plane (Control plane) interface, and an interface depicted by a broken line denotes a U-plane interface.

As between the eNBs 10(#1), 10(#2) connected via the network 1(#1), an interface connecting the eNBs 10 to each other is called an X2 interface. The X2 interface is classified into an X2 interface on the C-plane and an X2 interface on the U-plane.

As between the MME 20(#1) and the eNB 10(#1) connected via the network 1(#1), an interface connecting the eNB 10 and the MME 20 is called an S1-MME interface. As between the SAE-GW 30(#1) and the eNB 10(#1) connected via the network 1(#1), an interface connecting the eNB 10 and the SAE-GW 30 is called an S1-U interface. The S1-MME interface is defined as the interface on the C-plane, while the S1-U interface is defined as the interface on the U-plane, and these interfaces are generically termed S1 interfaces. The interface connecting the MMEs 20 is called an S10 interface.

As between the MME 20(#1) and the HSS 50 connected via the network 5, an interface connecting the MME 20 and the HSS 50 is called an S6 interface. As between the MME 20(#1) and the SAE-GW 30 (#1) connected via the network 1(#1), an interface connecting the MME 20 and the SAE-GW 30 is called an S11 interface. The S6 interface and the S11 interface are respectively defined as the interfaces on the C-plane.

As between the SAE-GW 30(#1) and the PDN-SAE-GW 40(#1) connected via the network 3(#1), an interface connecting the SAE-GW 30 and the PDN-SAE-GW 40 is called an S5 interface. The S5 interface is classified into an S5-C interface on the C-plane and an S5-U interface on the U-plane.

In the LTE system according to the first embodiment, in the architecture illustrated in FIG. 1, a handover between the eNB 10 connected to the network 1(#1) and the eNB 10 connected to the network 1(#6) is an S1 base handover. According to the example in FIG. 2, the handover between the eNB 10(#1) and the eNB 10(#6) is the S1 base handover.

[Outline of Operation]

Figure 3:
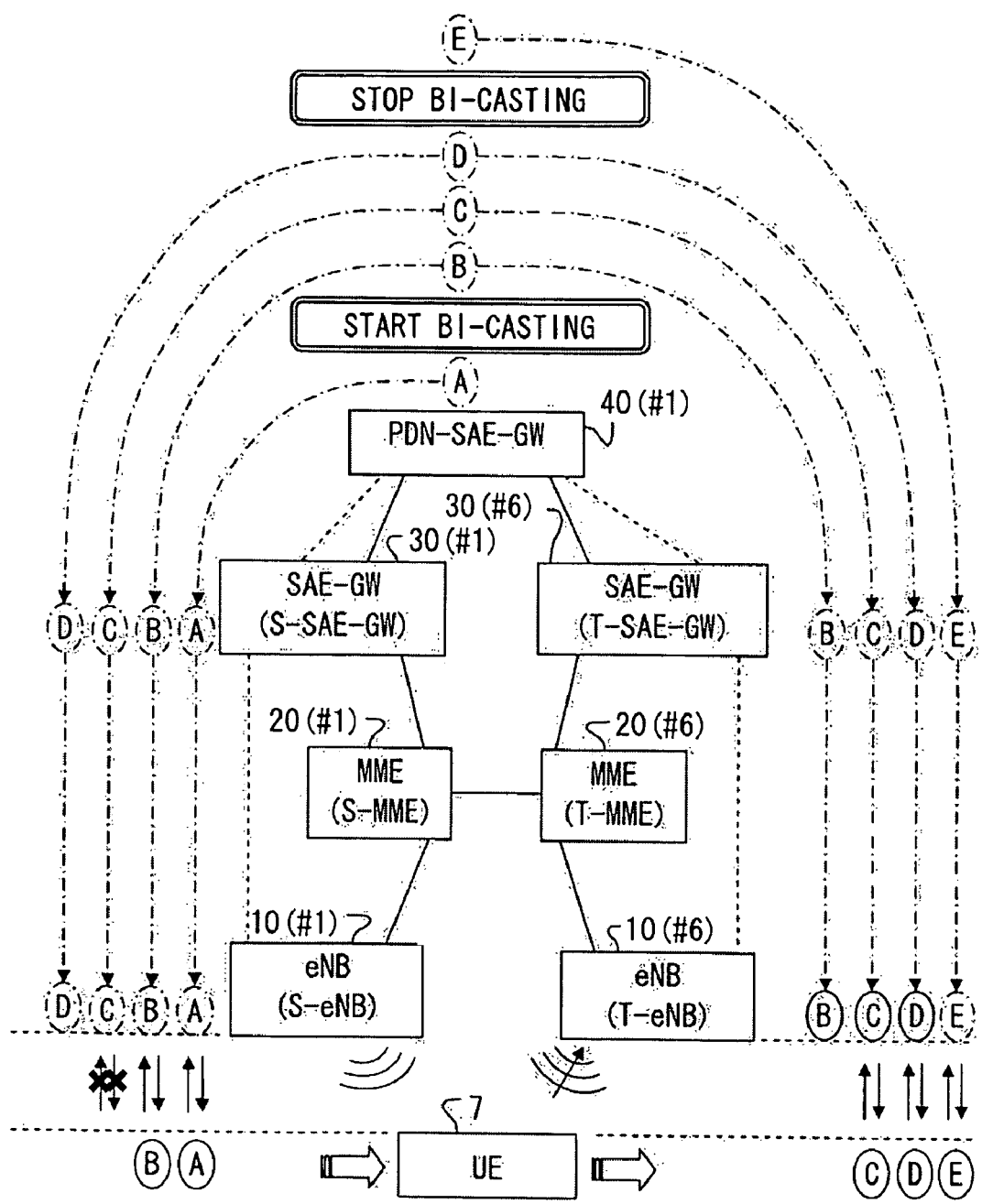
FIG. 3 is a diagram showing an outline of a user data downlink process when taking a S1 base handover by the LTE system in the first embodiment.
Figure 4:
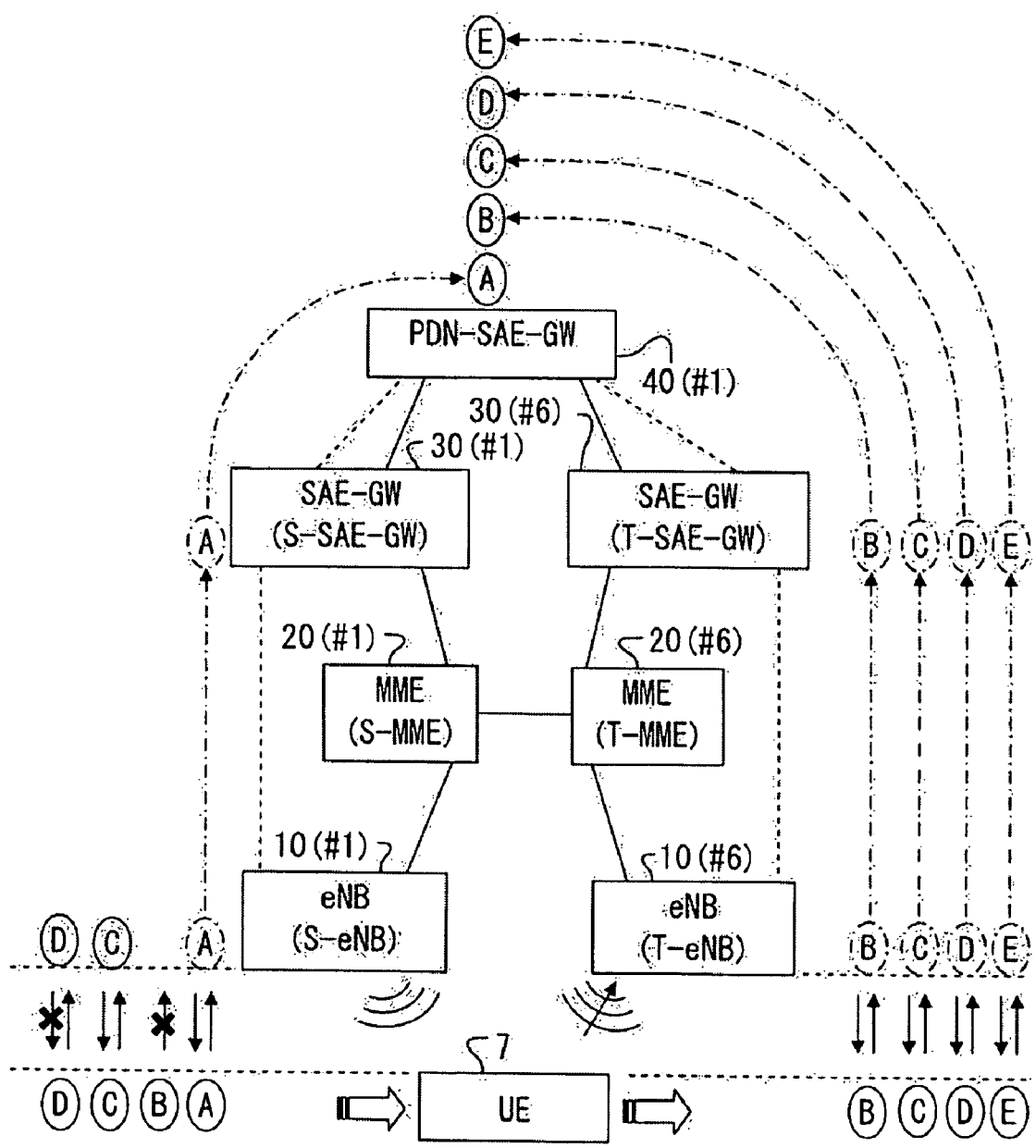
FIG. 4 is a diagram showing an outline of a user data uplink process when taking the S1 base handover by the LTE system in the first embodiment.

An outline of an operation of the LTE system in the first embodiment will hereinafter be described with reference to FIGS. 3 and 4. FIG. 3 is a diagram showing a user data downlink process when taking the S1 base handover in the LTE system in the first embodiment. FIG. 4 is a diagram showing a user data uplink process when taking the S1 base handover in the LTE system in the first embodiment. FIGS. 3 and 4 illustrate examples in which the UE 7 takes the handover from the eNB 10(#1) to the eNB 10(#6) in the example of the system architecture in FIG. 1. This handover is, since the MME 20 and the SAE-GW 30 managing the eNB 10(#1) and the eNB 10(#6) are different, is defined as the S1 base handover.

Hereinafter, when taking the handover, the eNB 10 connected before the UE 7 moves is expressed as S-eNB 10, while the eNB 10 connected after the UE 7 has moved is expressed as T-eNB 10. Similarly, the MME 20 and the SAE-GW 30 managing the S-eNB 10 are expressed by S-MME 20 and S-SAE-GW 30, while the MME 20 and the SAE-GW 30 managing the T-eNB 10 are expressed by T-MME 20 and T-SAE-GW 30. Moreover, the S-MME 20 and the S-SAE-GW 30 are designated as source-side nodes, while the T-MME 20 and the T-SAE-GW 30 are designated as target-side nodes as the case may be.

<Downlink Process>

To begin with, the user data downlink process when taking the S1 base handover in the LTE system according to the first embodiment will be outlined with reference to FIG. 3. The following discussion will exemplify a case in which the PDN-SAE-GW 40(#1) holds data A, B, C, D, E as downlink data (user data) addressed to the UE 7, and the UE 7 connects at first to the S-eNB 10(#1).

The downlink data A transmitted from the PDN-SAE-GW 40(#1) is delivered to the UE 7 via the S-SAE-GW 30(#1) and S-eNB 10(#1). The UE 7 moves from the S-eNB 10(#1) towards the T-eNB 10(#6).

In the LTE system, when the S-eNB 10(#1) determines the handover for the UE 7, the eNB 10, the MME 20 and the SAE-GW 30 instruct PDN-SAE-GW 40(#1) to transmit the downlink data addressed to the UE 7 to both of the S-SAE-GW 30(#1) and the T-SAE-GW 30(#6) by use of a C-plane control signal (Bi-casting request). Hereinafter, the transmission of the downlink data addressed to the predetermined UE to both of the S-SAE-GW and the T-SAE-GW is referred to as the Bi-casting.

The PDN-SAE-GW 40(#1), when receiving the Bi-casting request, hereafter transmits the downlink data B, C, D addressed to the UE 7 to both of the S-SAE-GW 30(#1) and the T-SAE-GW 30(#6). With this transmission, the T-eNB 10(#6), when receiving the bi-cast downlink data, retains this downlink data till T-eNB 10(#6) receives a Handover Confirm message from the UE 7 (refer to S11 in FIG. 27).

The T-eNB 10(#6), upon receiving the Handover Confirm message from the UE 7, extracts a desired piece of downlink data of the UE 7, included in the message, from within the retain data, and transmits the extracted downlink data to the UE 7. Through this process, the UE 7 can receive the downlink data from any one of the eNBs 10 before and after the handover has taken place, and can therefore receive all the data without any leak of the data.

The UE 7, till transmitting the Handover Confirm message to the T-eNB 10(#6), basically can receive the downlink data transmitted from the S-eNB 10(#1). An example in FIG. 3 is that the UE 7, after receiving the downlink data B, transmits the Handover Confirm message to the T-eNB 10(#6).

With this transmission, the UE 7 can receive the downlink data A, B from the S-eNB 10(#1), and can receive the downlink data C, D, E from the T-eNB 10(#6).

Further, in the LTE system, the UE 7, if unable to receive the downlink data B transmitted from the S-eNB 10(#1), can also receive the downlink data B from the T-eNB 10(#6) because of the downlink data B being retained by the T-eNB 10(#6). At this time, the UE 7 designates the desired downlink data with respect to the T-eNB 10(#6) by use of the Handover Confirm message etc.

For a period till a Bi-casting stop instruction reaches the PDN-SAE-GW 40(#1), the downlink data is transmitted to both of the S-eNB 10(#1) and the T-eNB 10(#6). After the handover has been approved, the downlink data C, D sent to the S-eNB 10(#1) are deleted in a resource release process after stopping the Bi-casting.

<Uplink Process>

Next, a user data uplink process when taking the S1 base handover in the LTE system according to the first embodiment will be outlined with reference to FIG. 4. The following discussion will exemplify a case in which the UE 7 holds the data A, B, C, D, E as uplink data (user data), and connects to the S-eNB 10(#1).

The UE 7 moves from the S-eNB 10(#1) towards the T-eNB 10(#6) while transmitting the uplink data A to the PDN-SAE-GW 40(#1) via the S-eNB 10(#1) and the S-SAE-GW 30(#1).

In the LTE system, the eNB 10 receives the data uplinked from the UE 7 and manages identifying information from which a sequence of the data is recognized. The identifying information involves utilizing, e.g., an SN (Sequence Number) used for packet sequence control in PDCP (Packet Data Convergence Protocol).

The S-eNB 10(#1), if unable to receive the data in a due sequence, retains the uplink data ranging from the data received not in the due sequence onward without transmitting these pieces of uplink data to the S-SAE-GW 30(#1).

According to the example in FIG. 4, the S-eNB 10(#1), after receiving the uplink data A. receives the uplink data C, D. In this case, the uplink data B is not received, and hence it follows that the uplink data C, D are the data received in the non-due sequence. Note that the UE 7 at this time receives an ACK signal showing that the uplink data A, C are properly received from the S-eNB 10(#1) and therefore recognizes that the uplink data A, C can be properly uplinked. On the other hand, the S-eNB 10(#1) actually properly receives the uplink data A, C, D. The ACK signal for the uplink data D does not reach the UE 7, and hence such a discrepancy occurs.

Under such a situation, the S-eNB 10(#1), after transmitting the uplink data A to the S-SAE-GW 30(#1), does not transmit but retains the uplink data C, D.

Figure 26:
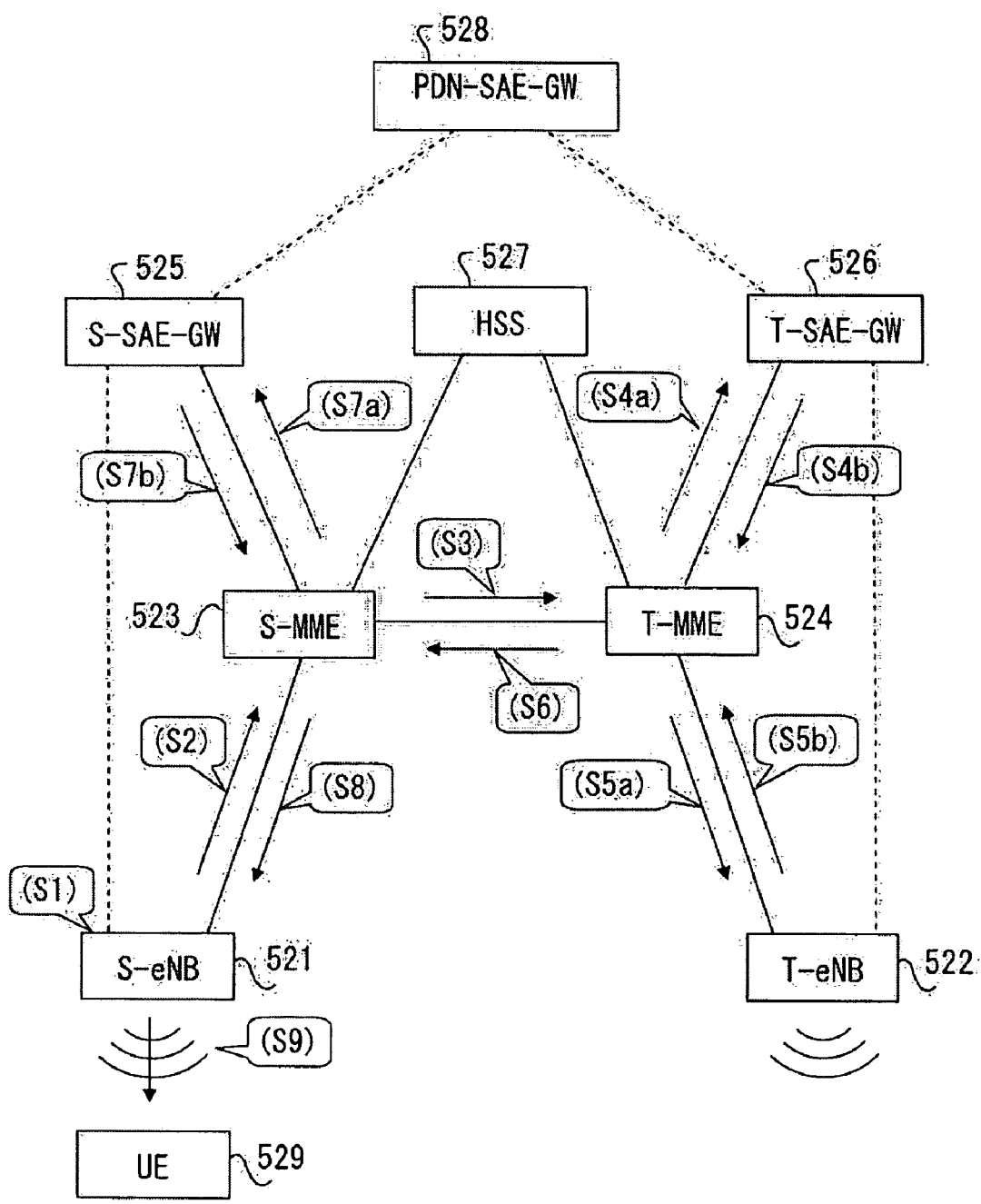
FIG. 26 is a diagram showing an outline of the S1 base handover process by a conventional LTE mobile communication system.

The UE 7, when receiving the handover request (Handover Command; S9 in FIG. 26) from the LTE system, transmits the Handover Confirm message to the T-eNB 10(#6), and thereafter transmits the subsequent uplink data sequentially from the uplink data that could not be transmitted in the due sequence. To be specific, the UE 7 transmits the uplink data B, C, D, E to the T-eNB 10(#6). The T-eNB 10(#6) sequentially transmits these pieces of uplink data to the T-SAE-GW 30(#6).

With this operation, according to the LTE system, the uplink data from the UE 7 executing the S1 base handover can be sequentially delivered to the PDN-SAE-GW 40(#1). At this time, the PDN-SAE-GW 40(#1) has no necessity for executing the sequential control of the uplink data coming from the UE 7. The PDN-SAE-GW 40(#1) might receive dually the uplink data and therefore deletes the redundant data by use of the identifying information from which the data sequence is recognized.

[Configuration of Device]

A function of each of the devices (nodes) building up the LTE system in the first embodiment will hereinafter be explained. Note that only the node functions related to the uplink and the downlink of the user data when taking the S1 base handover are explained, and the explanations and illustrations of other functions, which may be whatever types of functions, are therefore omitted.

<eNB>

Figure 5:
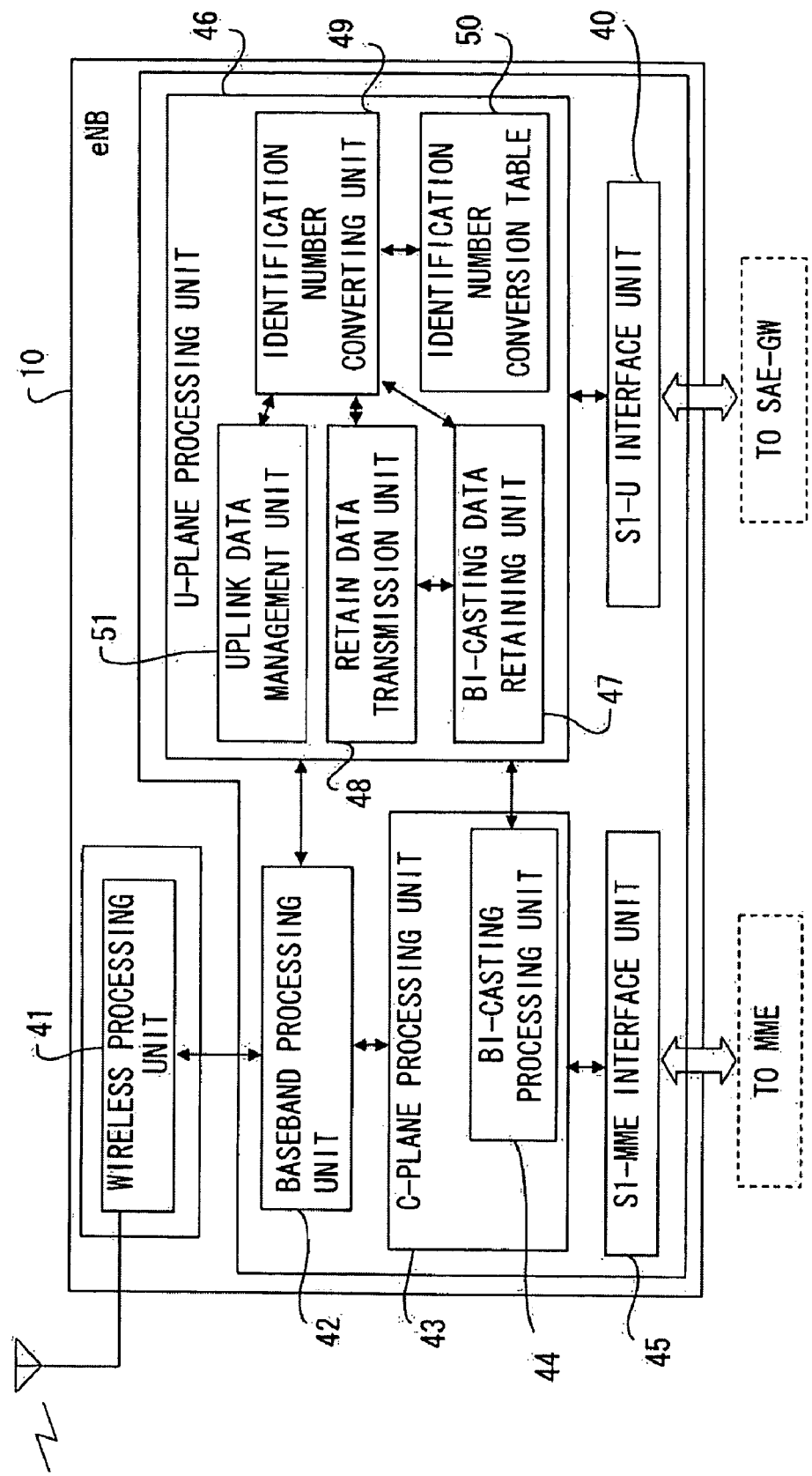
FIG. 5 is a block diagram showing a functional configuration of an eNB 10 in the first embodiment.

FIG. 5 is a block diagram showing a functional configuration of the eNB 10 in the first embodiment. As shown in FIG. 5, the eNB 10 includes a wireless processing unit 41, a baseband processing unit 42, a C-plane processing unit 43, an S1-MME interface unit 45, a U-plane processing unit 46, an S1-U interface unit 40, etc. These function units of the eNB 10 are realized by way of software components or hardware components or combinations of the software/hardware components (refer to the [Others] section).

The wireless processing unit 41 and the baseband processing unit 42 process the signals transmitted to and received from the UE 7 connected to the LTE system. The wireless processing unit 41 and the baseband processing unit 42 are not, however, the function units having particularly characteristics of the first embodiment, and are therefore outlined herein.

The wireless processing unit 41 is connected to an antenna, and processes the signals that should be transmitted from this antenna to the UE 7 and the signals received via the antenna from the UE 7. The wireless processing unit 41 generates radio signals from the baseband signals transmitted from the baseband processing unit 42, and transmits the thus-generated radio signals via the antenna. On the other hand, the wireless processing unit 41 frequency-converts the radio signals received by the antenna into the baseband signals, and sends the baseband signals to the baseband processing unit 42.

The baseband processing unit 42 is constructed of a scheduler, multiplexing unit (unillustrated), etc, and processes a data packet (uplink data) transmitted and control data from the UE 7. The data packet and the control data processed herein are sent to the C-plane processing unit 43 and the U-plane processing unit 46. Further, the baseband processing unit 42 receives the data packets (downlink data) etc, which should be transmitted to the UE 7, from the C-plane processing unit 43 and the U-plane processing unit 46, then generates the baseband signals into which these data packets are multiplexed, and transmits the baseband signals to the wireless processing unit 41.

The C-plane processing unit 43 executes a process related to the C-plane (e.g., an SCTP (Stream Control Transmission Protocol) layer). To be specific, the C-plane processing unit 43 establishes and releases an SCTP association, and controls the transmission and the reception of C-plane control data (message) needed when taking the S1 base handover by utilizing the SCTP association.

The C-plane processing unit 43 includes a Bi-casting processing unit 44 etc.

The C-plane processing unit 43, when receiving the control messages transmitted and received when taking the S1 base handover, transmits the message related to the Bi-casting function in these control messages to the Bi-casting processing unit 44. Specifically, the C-plane processing unit 43, when becoming the T-eNB, receives a Bi-casting request message from the MME 20 via the S1-MME interface unit 45, and also receives the Handover Confirm message from the UE 7 via the wireless processing unit 41 and the baseband processing unit 42. On the other hand, the C-plane processing unit 43, when becoming the S-eNB, receives a Resource release message from the MME 20 via the S1-MME interface unit 45.

The Bi-casting processing unit 44, when receiving the Bi-casting request message, instructs the U-plane processing unit 46 to generate downlink tunnel end point information (TEID) (which will hereinafter be expressed as D-eNB-TEID) of the S1-U interface related to the target UE 7, and to retain the downlink data addressed to the target UE 7. The Bi-casting processing unit 44, upon receiving the D-eNB-TEID from the U-plane processing unit 46, generates a Bi-casting response message containing the D-eNB-TEID, and sends the Bi-casting response message to the C-plane processing unit 43. The C-plane processing unit 43 sends this message back to the MME 20 via the S1-MME interface unit 45.

The Bi-casting processing unit 44, when receiving the Handover Confirm message, sends an identification number of the downlink data contained in this message and a retain data transmission instruction to the U-plane processing unit 46. The downlink data identification number is contained in the Handover Confirm message in order for the UE 7 to request the data that was not normally downlinked from the S-eNB 10(#1). The identification number may involve utilizing the SN (Sequence Number) employed for the packet sequence control based on the PDCP (Packet Data Convergence Protocol).

Further, the Bi-casting processing unit 44, when receiving the Resource release message, sends an instruction for releasing the resources for the UE 7 to the U-plane processing unit 46.

The S1-MME interface unit 45 is connected to the network 1 and executes a communication process related to the C-plane on the S1-MME interface. Specifically, the S1-MME interface unit 45 receives an S1 data chunk containing the Bi-casting response message etc and other chunks from the C-plane processing unit 43, and sends these chunks to the network 1. On the other hand; the S1-MME interface unit 45 receives the S1 data chunk containing the Bi-casting request message etc and other chunks from the network 1, and sends these chunks to the C-plane processing unit 43. Note that the S1 base handover can not utilize the X2 interface, and hence any function related to the X2 interface is not stated herein.

The U-plane processing unit 46 executes a process pertaining to the U-plane (e.g., GTP (GPRS (General Packet Radio Service) Tunneling Protocol) layer). To be specific, the U-plane processing unit 46 establishes, between the U-plane processing unit 46 and the SAE-GW 30 managing the unit 46 itself, a GTP tunnel set up on a security association established based on IPSec etc. Further, the U-plane processing unit 46 controls the transmission and the reception of the user data (uplink data and downlink data) on the U-plane.

The U-plane processing unit 46, when receiving the TEID generation instruction from the Bi-casting processing unit 44 as described above, generates the tunnel end point information (TEID) utilized for the downlink for the target UE 7. The U-plane processing unit 46 receives the user data downlinked from the SAE-GW 30 with this allocated TEID, and sends the user data to the baseband processing unit 42 in order to transmit this user data to the UE 7. The U-plane processing unit 46 sends the generated TEID to the Bi-casting processing unit 44.

The U-plane processing unit 46 includes a Bi-casting data retaining unit 47, a retain data transmission unit 48, an identification number converting unit 49, an identification number conversion table 50, an uplink data management unit 51, etc.

The U-plane processing unit 46, when receiving an instruction of retaining the downlink data addressed to the UE 7 or an instruction of releasing the resources for the UE 7 from the Bi-casting processing unit 44 described above, transfers the instruction to the Bi-casting data retaining unit 47. The U-plane processing unit 46, when receiving a retain data transmission instruction together with the identification number of the downlink data requested by the UE 7, transmits these items of data to the retain data transmission unit 48. The U-plane processing unit 46, when receiving the wirelessly-transmitted user data (uplink data) from the baseband processing unit 42, sends the uplink data and the identification number of this data to the uplink data management unit 51.

The Bi-casting data retaining unit 47, upon receiving an instruction of retaining the downlink data from the U-plane processing unit 46, retains the data downlinked to an address of the UE 7 from the SAE-GW 30 till the handover for the target UE 7 is approved and synchronized (e.g., till the Handover Confirm message is received from the UE 7) (which is the case of becoming the T-eNB). At this time, the Bi-casting data retaining unit 47 attaches the same identification number as that of the same downlink data transmitted to the source side to the downlink data sent from the SAE-GW 30. The Bi-casting data retaining unit 47 retains the downlink data together with this identification number.

The Bi-casting data retaining unit 47, when receiving an instruction of releasing the resources for the UE 7, deletes the downlink data that is the Bi-cast data and disabled from being delivered to the UE 7 but is retained (which is the case of becoming the S-eNB).

The retain data transmission unit 48, upon receiving a retain data transmission instruction together with the identification number of the downlink data requested by the UE 7, sends the downlink data, which is the data after this identification number and retained in the Bi-casting data retaining unit 47 in the sequence according to the identification numbers, to the baseband processing unit 42. The downlink data retained by the Bi-casting data retaining unit 47 is the data that is Bi-cast from the SAE-GW 30 and is therefore attached with the identification number enabling this data to be specified between the eNB 10 and the SAE-GW 30. Accordingly, the retain data transmission unit 48 requests the identification number converting unit 49 to specify the downlink data associated with the identification number requested from the UE 7, and acquires the associated downlink data from the Bi-casting data retaining unit 47.

The identification number converting unit 49 mutually converts the identification number (which will hereinafter be referred to as a UE-eNB identification number) attached for enabling the user data to be specified between the UE 7 and the eNB 10 and also the identification number (which will hereinafter be referred to as an eNB-SAE identification number) attached for enabling the user data to be specified between the eNB 10 and the SAE-GW 30 as described above. Specifically, the identification number converting unit 49, upon receiving the UE-eNB identification number for the UE 7 that is sent from the retain data transmission unit 48, refers to the identification number conversion table 50 and thus acquires the eNB-SAE identification number associated with the UE-eNB identification number. The identification number converting unit 49 instructs the Bi-casting data retaining unit 47 to send the downlink data after the acquired eNB-SAE identification number to the retain data transmission unit 48.

The identification number conversion table 50 stores relativity between the eNB-SAE identification number and the UE-eNB identification number. FIG. 6 is a diagram showing an example of the identification number conversion table 50 of the eNB 10 in the first embodiment. As shown in FIG. 6, the identification number conversion table 50 stores the associative relation between the eNB-SAE identification number and the UE-eNB identification number in connection with each UE.

Note that the identification numbers for specifying the user data may be utilized in unification in the LTE system. In this case, the eNB-SAE identification number is the same as the UE-eNB identification number, and hence the identification number converting unit 49 and the identification number conversion table 50 are not required.

The uplink data management unit 51, upon receiving the uplink data, manages the UE-eNB identification numbers of the uplink data, and forwards only the uplink data that can be received in the due sequence to the SAE-GW 30 via the S1-U interface unit 40. The uplink data management unit 51 retains the UE-eNB identification number of the uplink data already forwarded to the SAE-GW 30, and compares the UE-eNB identification number with the identification number of the received uplink data, thus determining whether the uplink data can be received in the due sequence or not. The uplink data management unit 51, when determining that the uplink data can not be received in the due sequence, does not forward but retains the uplink data. The uplink data management unit 51, when determining that the uplink data can be received in the due sequence and deciding to forward the uplink data to the SAE-GW 30, instructs the identification number converting unit 49 to convert the identification number into the eNB-SAE identification number, and forwards the uplink data together with the thus-converted eNB-SAE identification number via the S1-U interface unit 40 (to the SAE-GW 30).

The S1-U interface unit 40 is connected to the network 1 and executes a communication process related to the U-plane on the S1-U interface. To be specific, the S1-U interface unit 40 receives the uplink data (GTP data packet) sent from the U-plane processing unit 46, and sends the uplink data to the network 1. On the other hand, the S1-U interface unit 40 receives the downlink data (GTP data packet) from the network 1, and sends the downlink data to the U-plane processing unit 46.

<MME>

Figure 7:
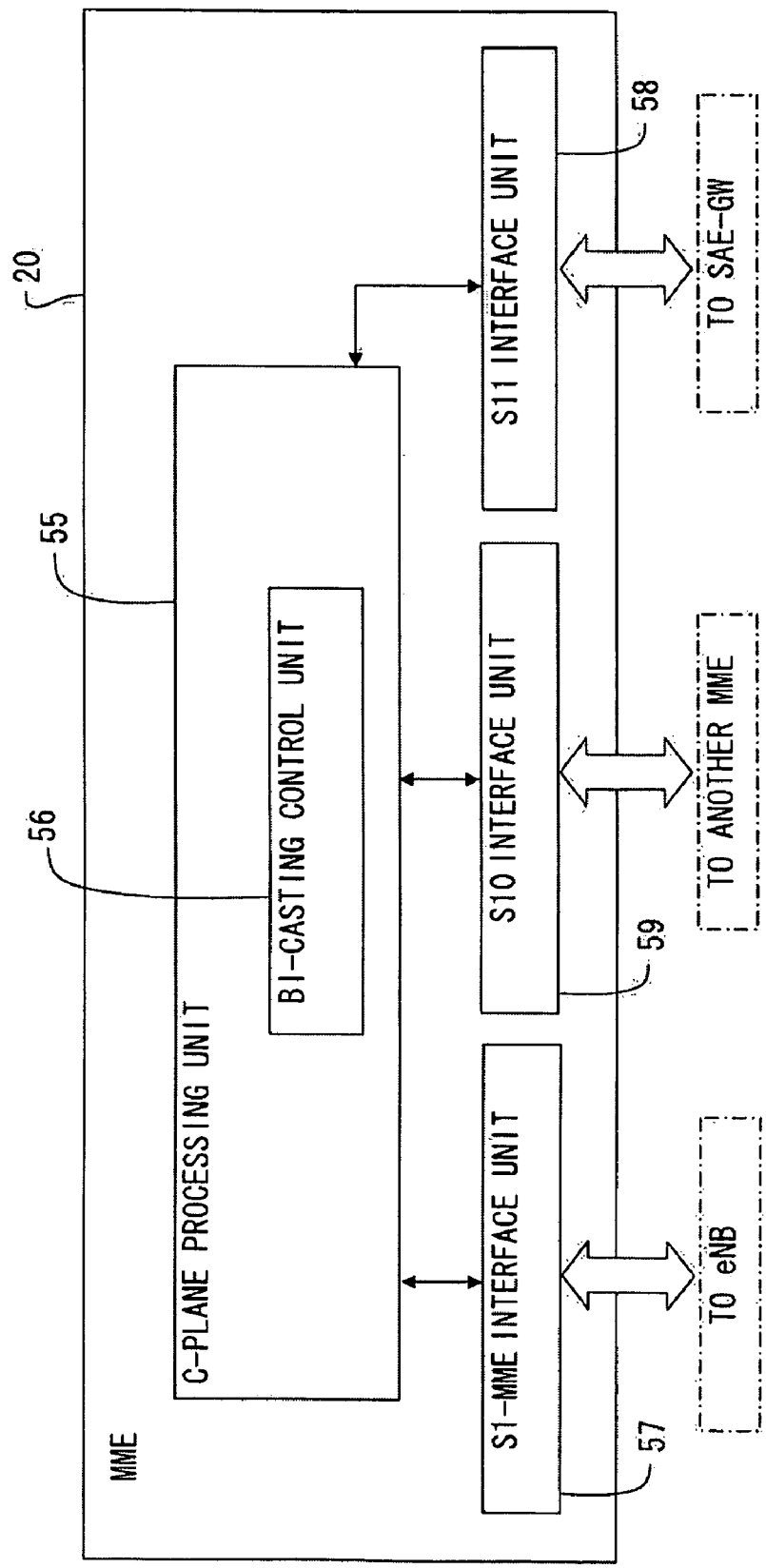
FIG. 7 is a block diagram showing a functional configuration of an MME 20 in the first embodiment.

FIG. 7 is a block diagram showing a functional configuration of the MME 20 in the first embodiment. As illustrated in FIG. 7, the MME 20 includes a C-plane processing unit 55, an S1-MME interface unit 57, an S11 interface unit 58, an S10 interface unit 59, etc. These function units of the MME 20 are realized by way of software components or hardware components or combinations of the software/hardware components (refer to the paragraph [Others]).

The C-plane processing unit 55 executes the process related to the C-plane, and performs call control, resource control, etc with respect to the UE 7. To be specific, the C-plane processing unit 55 establishes and releases the SCTP association, and controls the transmission and the reception of the C-plane control message needed when taking the S1 base handover by utilizing the SCTP association.

The C-plane processing unit 55 includes a Bi-casting control unit 56 etc.

The C-plane processing unit 55, when receiving the control messages transmitted and received when taking the S1 base handover from the S1-MME interface unit 57, the S10 interface unit 59, the S11 interface unit 58, etc, transmits the message related to the Bi-casting function in these control messages to the Bi-casting control unit 56. To be specific, the C-plane processing unit 55, when becoming the T-MME 20 and when receiving a Forward Relocation Request message notifying of the determination of the handover for the UE 7 from the S-MME 20 via the S10 interface unit 59, transmits this message to the Bi-casting control unit 56. At this time, the C-plane processing unit 55 recognizes the determination of the handover with respect to the UE 7 serving as a message target node, and acquires pieces of information on the T-eNB 10 and the S-eNB 10 from the information contained in this message. The C-plane processing unit 55 determines, based on these pieces of information, whether the SAE-GW 30 should be changed for that handover or not.

The C-plane processing unit 55, when receiving a Bi-casting Response message from the T-eNB 10 via the S1-MME interface unit 57, sends this message to the Bi-casting control unit 56. Further, the C-plane processing unit 55, when becoming the S-MME 20 and when receiving a Forward Relocation complete message from the T-MME 20 via the S10 interface unit 59, transmits this message to the Bi-casting control unit 56.

The Bi-casting control unit 56, upon receiving the Forward Relocation Request message, generates the Bi-casting request message. The Bi-casting control unit 56 transmits the thus-generated message to the T-eNB 10 related to the handover for the UE 7 via the S1-MME interface unit 57. The Bi-casting request message is a message for instructing the T-eNB 10 receiving this message to retain the data downlinked via the SAE-GW 30. Note that this Bi-casting request message may contain information serving for the T-eNB 10 to generate a UE context of the target UE 7.

The Bi-casting control unit 56, upon receiving the Bi-casting Response message, extracts D-eNB-TEID contained in this message. The Bi-casting control unit 56 generates a Create Context Request (SAE-GW) message containing the extracted D-eNB-TEID. The Bi-casting control unit 56 transmits the thus-generated message to the T-SAE-GW 30 via the S11 interface unit 58.

Further, the Bi-casting control unit 56, when receiving the Forward Relocation Complete message, generates a Resource Release message for giving an instruction of releasing the resources ensured for the target UE 7. The Bi-casting control unit 56 transmits the thus-generated message to the S-eNB 10 via the S1-MME interface unit 57 and to the S-SAE-GW 30 via the S11 interface unit 58.

The S1-MME interface unit 57 connects to the network 1 and executes the communication process related to the C-plane on the S-MME interface. To be specific, the S1-MME interface unit 57 receives the S1 data chunk containing the Bi-casting request message, the Resource Release message, etc and other chunks from the C-plane processing unit 55, and sends these chunks to the network 1. On the other hand, the S1-MME interface unit 57 receives the S1 data chunk containing the Bi-casting response message etc and other chunks from the network 1, and sends these chunks to the C-plane processing unit 55.

The S11 interface unit 58 connects to the network 1 and executes the communication process pertaining to the C-plane on the S11 interface. To be specific, the S11 interface unit 58 receives an S11 data chunk containing the Create Context Request (SAE-GW) message, the Resource Release message, etc and other chunks from the C-plane processing unit 55, and sends these chunks to the network 1. On the other hand, the S11 interface unit 58 also receives the S11 data chunk and other chunks from the network 1, and sends these chunks to the C-plane processing unit 55.

The S10 interface unit 59 connects to the network 1 and executes the communication process related to the C-plane on the S10 interface that establishes the connection between the MMEs 20. Specifically, the S10 interface unit 59 receives the data chunk containing the Forward Relocation Request message etc and other chunks from the C-plane processing unit 55, and transmits these chunks to the network 1. On the other hand, the S10 interface unit 59 also receives the data chunk containing the Forward Relocation Request message etc and other chunks from the network 1 and sends these chunks to the C-plane processing unit 55.

<SAE-GW>

Figure 8:
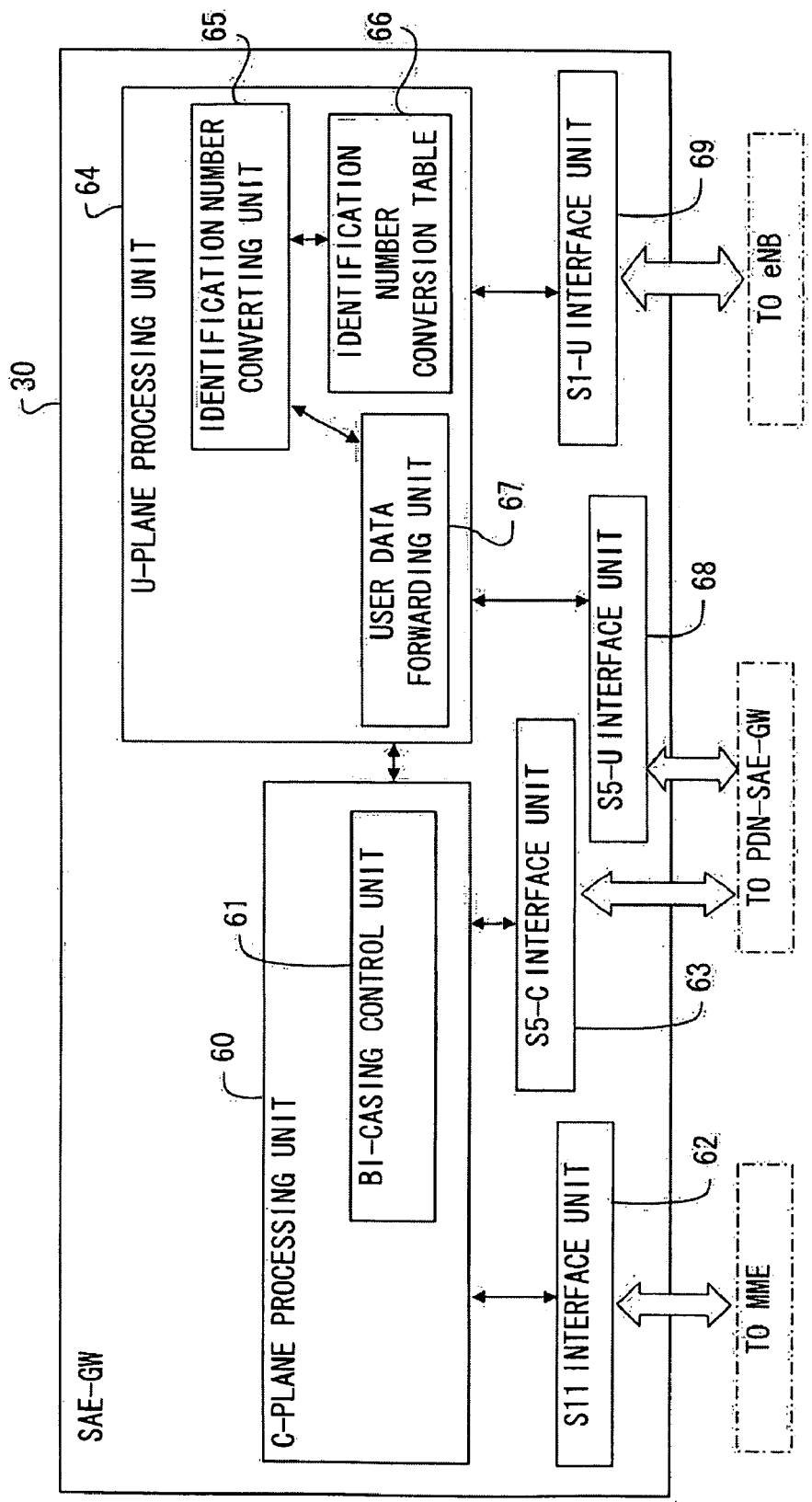
FIG. 8 is a block diagram showing a functional configuration of a SAE-GW 30 in the first embodiment.

FIG. 8 is a block diagram showing a functional configuration of the SAE-GW 30 in the first embodiment. As illustrated in FIG. 8, the SAE-GW 30 includes a C-plane processing unit 60, a U-plane processing unit 64, an S11 interface unit 62, an S5-C interface unit 63, an S5-U interface unit 68, an S1-U interface unit 69, etc. These function units of the SAE-GW 30 are realized by way of software components or hardware components or combinations of the software/hardware components (refer to the [Others] section).

The C-plane processing unit 60 executes the process related to the C-plane. The C-plane processing unit 60 establishes and releases the SCTP association, and controls the transmission and the reception of the C-plane control message needed when taking the S1 base handover by utilizing the SCTP association.

The C-plane processing unit 60 includes a Bi-casting control unit 61 etc.

The C-plane processing unit 60, when receiving the control messages transmitted and received when taking the S1 base handover from the S11 interface unit 62, the S5-C interface unit 63, etc, sends the control message concerning the Bi-casting function in these control messages to the Bi-casting control unit 61. Specifically, the C-plane processing unit 60, when becoming the T-SAE-GW 30 and when receiving the Create Context Request (SAE-GW) message notifying of the determination of the handover for the UE 7 from the T-MME 20 via the S11 interface unit 62, transmits this message to the Bi-casting control unit 61. The C-plane processing unit 60, when becoming the T-SAE-GW 30 and when receiving the Bi-casting response message from the PDN-SAE-GW 40 via the S5-C interface unit 63, sends this message to the Bi-casting control unit 61. Moreover, the C-plane processing unit 60, when becoming the S-SAE-GW 30 and when receiving the Resource Release message from the S-MME 20 via the S11 interface unit 62, transmits this message to the Bi-casting control unit 61.

The Bi-casting control unit 61, upon receiving the Create Context Request (SAE-GW) message, extracts the D-eNB-TEID contained in this message. The Bi-casting control unit 56 sends the extracted D-eNB-TEID to the U-plane processing unit 64, and instructs the U-plane processing unit 64 to generate the downlink tunnel end point information (TEID) (which will hereinafter be termed D-SAEGW-TEID) of the S5-U interface with respect to the target UE 7.

The Bi-casting control unit 61, when receiving the D-SAEGW-TEID from the U-plane processing unit 64, generates a Bi-casting request message containing the D-SAEGW-TEID. The Bi-casting control unit 61 transmits this message to the PDN-SAE-GW 40 via the S5-C interface unit 63. Further, the Bi-casting control unit 61, when receiving the Resource Release message, sends the instruction of releasing the resources for the UE 7 to the U-plane processing unit 64.

The U-plane processing unit 64 carries out the process related to the U-plane. To be specific, the U-plane processing unit 64 establishes the GTP tunnel that is set up on the security association established based on the IPSec etc between the U-plane processing unit 64 and the PDN-SAE-GW 40 connecting to the unit 64 itself. Further, the U-plane processing unit 64 controls the transmission and the reception of the user data (uplink data and the downlink data) on the U-plane by utilizing this GTP tunnel.

The U-plane processing unit 64, when receiving the TEID generating instruction from the Bi-casting control unit 61 as described above, generates the D-SAEGW-TEID for the target UE 7. The U-plane processing unit 64 receives, through the S5-U interface unit 68, the user data downlinked via the S5-U interface from the PDN-SAE-GW 40 with this allocated D-SAEGW-TEID, and transmits this user data to a user data forwarding unit 67. The U-plane processing unit 64 sends this allocated D-SAEGW-TEID to the Bi-casting control unit 61. Moreover, the U-plane processing unit 64, upon receiving the user data uplinked from the eNB 10 via the S1-U interface, transmits the user data to the user data forwarding unit 67. The U-plane processing unit 64, when receiving an instruction of releasing the resources for the UE 7, releases the resources for the user data of the UE 7, which are utilized by the user data forwarding unit 67.

The U-plane processing unit 64 includes a user data forwarding unit 67, an identification number converting unit 65, an identification number conversion table 66, etc.

The user data forwarding unit 67, upon receiving the downlink data from the PDN-SAE-GW 40 via the S5-U interface unit 68, forwards the downlink data to the eNB 10 via the S1-U interface unit 69. The received downlink data is attached with an identification number (which will hereinafter be termed an SAE-PSAE identification number) enabling to be specified by the SAE-GW 30 and the PDN-SAE-GW 40. Accordingly, the user data forwarding unit 67 requests the identification number converting unit 65 to convert the SAE-PSAE identification number into an eNB-SAE identification number. The user data forwarding unit 67 forwards, together with the downlink data, the eNB-SAE identification number sent from the identification number converting unit 65 to the eNB 10.

The user data forwarding unit 67, when receiving the uplink data from the eNB 10 via the S1-U interface unit 69, forwards this uplink data to the PDN-SAE-GW 40 via the S5-U interface unit 68. This uplink data is attached with the identification number in the same way as the downlink data is and therefore requests the identification number converting unit 65 to convert this identification number. Herein, the eNB-SAE identification number is converted into the SAE-PSAE identification number. The user data forwarding unit 67 forwards the SAE-PSAE identification number together with the uplink data thereof, which is sent from the identification number converting unit 65, to the PDN-SAE-GW 40.

The identification number converting unit 65 mutually converts the eNB-SAE identification number and the SAE-PSAE identification number described above. To be specific, the identification number converting unit 65, upon receiving the eNB-SAE identification number sent from the user data forwarding unit 67, refers to the identification number conversion table 66, thereby acquiring the SAE-PSAE identification number associated with the eNB-SAE identification number. The identification number converting unit 65 also performs a reversed conversion thereto.

The identification number conversion table 66 stores relativity between the eNB-SAE identification number and the SAE-PSAE identification number. FIG. 9 is a diagram showing an example of the identification number conversion table 66 of the SAE-GW 30 in the first embodiment. As illustrated in FIG. 9, the identification number conversion table 66 stores the associative relation between the eNB-SAE identification number and the SAE-PSAE identification number.

Note that, as described above, in a case where the LTE system utilizes in unification the identification numbers for specifying the user data, the eNB-SAE identification number is the same as the SAE-PSAE identification number, and consequently the identification number converting unit 65 and the identification number conversion table 66 are not needed.

The S1-U interface unit 69 connects to the network 1 and executes the communication process related to the U-plane on the S1-U interface. Specifically, the S1-U interface unit 69 receives the downlink data (GTP data packet) sent from the U-plane processing unit 64, and transmits the downlink data to the network 1. On the other hand, the S1-U interface unit 69 receives the uplink data (GTP data packet) from the network 1 and sends the uplink data to the U-plane processing unit 64.

The S5-U interface unit 68 connects to the network 3 and carries out the communication process pertaining to the U-plane on the S5-U interface. To be specific, the S5-U interface unit 68 receives the uplink data (GTP data packet) sent from the U-plane processing unit 64, and transmits the uplink data to the network 3. On the other hand, the S5-U interface unit 68 receives the downlink data (GTP data packet) from the network 3 and sends the downlink data to the U-plane processing unit 64.

The S11 interface unit 62 connects to the network 1 and executes the communication process related to the C-plane on the S11 interface. Specifically, the S11 interface unit 62 receives the S11 data chunk and other chunks from the C-plane processing unit 60, and sends these chunks to the network 1. On the other hand, the S11 interface unit 62 receives the S11 data chunks such as the Create Context Request (SAE-GW) message and the Resource Release message and other chunks from the network 1, and transmits these chunks to the C-plane processing unit 60.

The S5-C interface unit 63 connects to the network 3 and executes the communication process related to the C-plane on the S5-C interface. Specifically, the S5-C interface unit 63 receives the S5 data chunk such as the Bi-casting Request message and other chunks from the C-plane processing unit 60, and sends these chunks to the network 3. On the other hand, the S5-C interface unit 63 receives the S5 data chunk such as the Bi-casting Response message and other chunks from the network 3, and transmits these chunks to the C-plane processing unit 60.

<PDN-SAE-GW>

Figure 10:
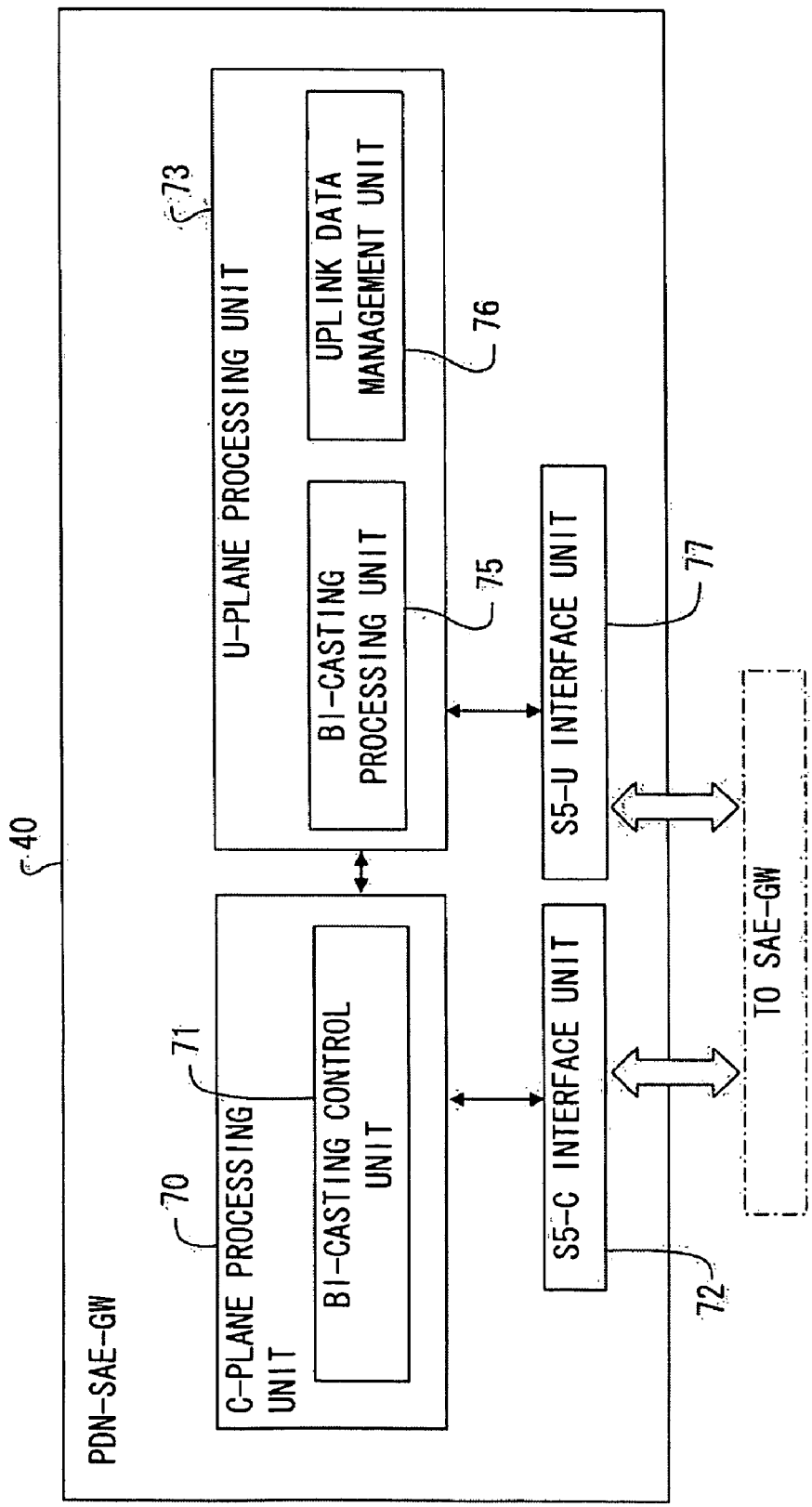
FIG. 10 is a block diagram showing a functional configuration of a PDN-SAE-GW 40 in the first embodiment.

FIG. 10 is a block diagram showing a functional configuration of the PDN-SAE-GW 40 in the first embodiment. As shown in FIG. 10, the PDN-SAE-GW 40 includes a C-plane processing unit 70, a U-plane processing unit 73, an S5-C interface unit 72, an S5-U interface unit 77, etc. These function units of the PDN-SAE-GW 40 are realized by way of software components or hardware components or combinations of the software/hardware components (refer to the paragraph [Others]).

The C-plane processing unit 70 executes the process related to the C-plane. The C-plane processing unit 70 establishes and releases the SCTP association, and controls the transmission of the reception of the C-plane control message needed when taking the S1 base handover by utilizing the SCTP association.

The C-plane processing unit 70 includes a Bi-casting control unit 71 etc.

The C-plane processing unit 70, when receiving the control messages transmitted and received when taking the S1 base handover from the S5-C interface unit 72 etc, sends the message related to the Bi-casting function in these control messages to the Bi-casting control unit 71. Specifically, the C-plane processing unit 70, upon receiving the Bi-casting request message, an Update Context Request (PDN-SAE-GW) message, etc from the T-SAE-GW 30 via the S5-C interface unit 72, transmits these messages to the Bi-casting control unit 71.

The Bi-casting control unit 71, when receiving the Bi-casting request message, extracts the D-SAEGW-TEID contained in this message. The Bi-casting control unit 71 sends the extracted D-SAEGW-TEID to the U-plane processing unit 73, and instructs the U-plane processing unit 73 to start the Bi-casting about the user data for the target UE 7.

The Bi-casting control unit 71, upon receiving the Update Context Request (PDN-SAE-GW) message, executes a process of switching over a path for the target UE 7, and instructs the U-plane processing unit 73 to stop the Bi-casting for the UE 7.

The U-plane processing unit 73 executes the process pertaining to the U-plane. To be specific, the U-plane processing unit 73 establishes the GTP tunnel between the U-plane processing unit 73 and the SAE-GW 30 connecting to the unit 73 itself, and controls the transmission and the reception of the user data (uplink data and the downlink data) on the U-plane by use of this GTP tunnel.

The U-plane processing unit 73 includes a Bi-casting processing unit 75, an uplink data management unit 76, etc.

The U-plane processing unit 73, when receiving a Bi-casting start instruction from the Bi-casting control unit 71 as described above, instructs the Bi-casting processing unit 75 to start the Bi-casting. Conversely, the U-plane processing unit 73, upon receiving a Bi-casting stop instruction from the Bi-casting control unit 71, instructs the Bi-casting processing unit 75 to stop the Bi-casting. The U-plane processing unit 73, when receiving the uplink data from the SAE-GW 30 via the S5-U interface unit 77, transfers the uplink data to the uplink data management unit 76.

The Bi-casting processing unit 75 executes the Bi-casting of the user data. Namely, the Bi-casting processing unit 75, upon receiving the Bi-casting start instruction, transmits the downlink data addressed to the target UE 7 to both of the S-SAE-GW 30 and the T-SAE-GW 30. At this time, the Bi-casting processing unit 75 attaches the same identification number to the same downlink data, and transmits the downlink data together with the attached identification number to the S-SAE-GW 30 and the T-SAE-GW 30, respectively. The Bi-casting processing unit 75, when receiving the Bi-casting stop instruction, stops the Bi-casting for the target UE 7.

The uplink data management unit 76, upon receiving the uplink data from the UE 7, executes a dual check about the uplink data on the basis of the data identification number (SAE-PSAE identification number) sent together with the uplink data. The PDN-SAE-GW 40 might receive the same data from both of the S-SAE-GW 30 and the T-SAE-GW 30 with respect to the uplink data from the UE 7. The uplink data management unit 76 performs the dual check, then deletes the dual uplink data and forwards the other uplink data to another network in the sequence according to the identification numbers.

Note that the uplink data management unit 76 has no necessity for performing the sequence control of the uplink data. This is because the uplink data sent from the SAE-GW 30 are received in the due sequence.

Operational Example

An operational example of the LTE system in the first embodiment will hereinafter be described with reference to FIGS. 11, 12, 13 and 14. FIGS. 11, 12, 13 and 14 are diagrams each showing the operational example of the LTE system in the first embodiment, exemplifying a case in which the UE 7 takes the handover from the S-eNB 10(#1) to the T-eNB 10(#6). This handover is defined as the S1 base handover since the MME 20 and the SAE-GW 30 managing the eNB 10(#1) and the eNB 10(#6) are different. In FIGS. 11, 12, 13 and 14, the message depicted by the solid line is the C-plane message, while the message depicted by the dotted line is the user data on the U-plane.

<Downlink Process>

Figure 11:
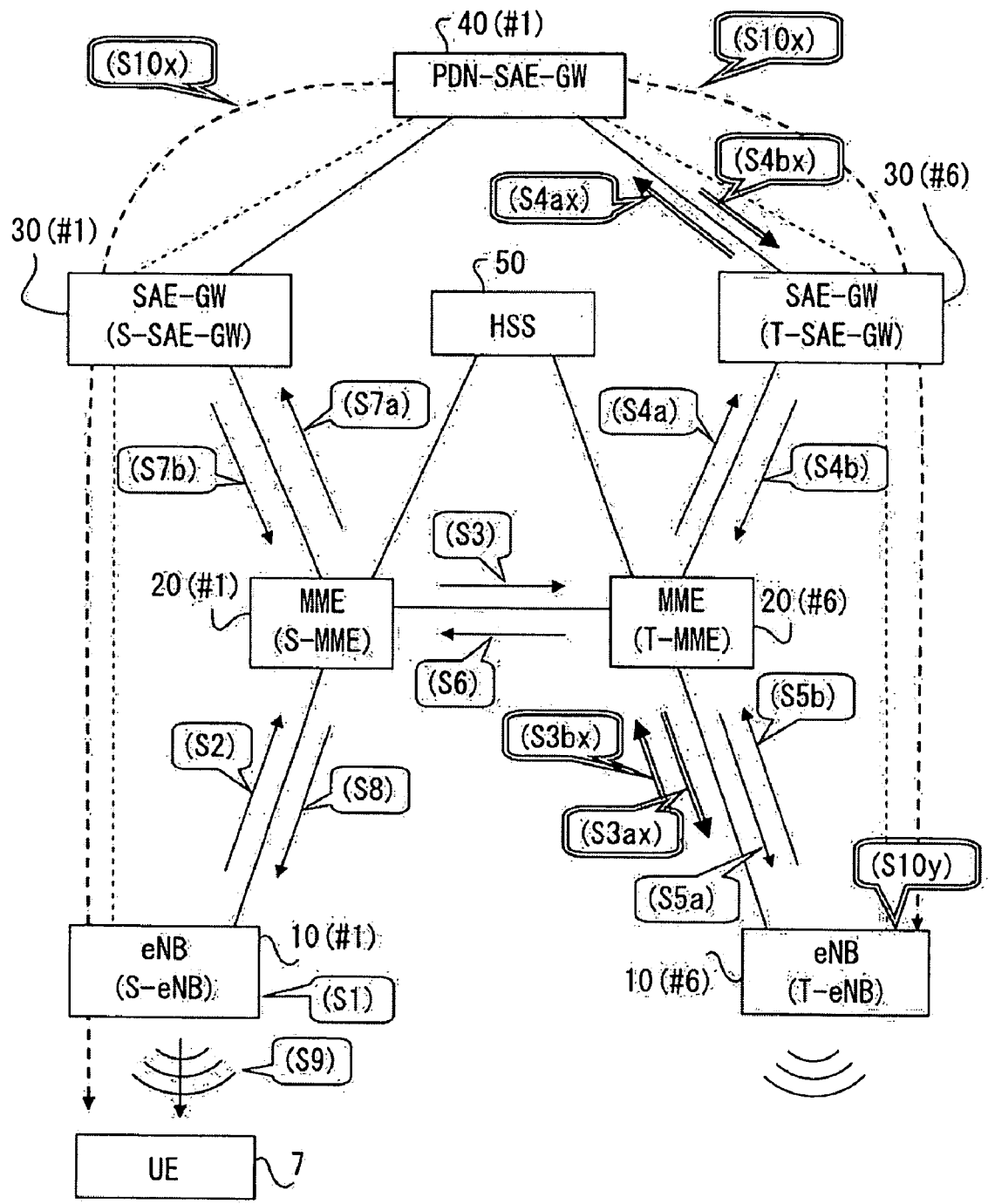
FIG. 11 is a diagram showing the user data downlink process when taking the S1 base handover by the LTE system in the first embodiment.
Figure 12:
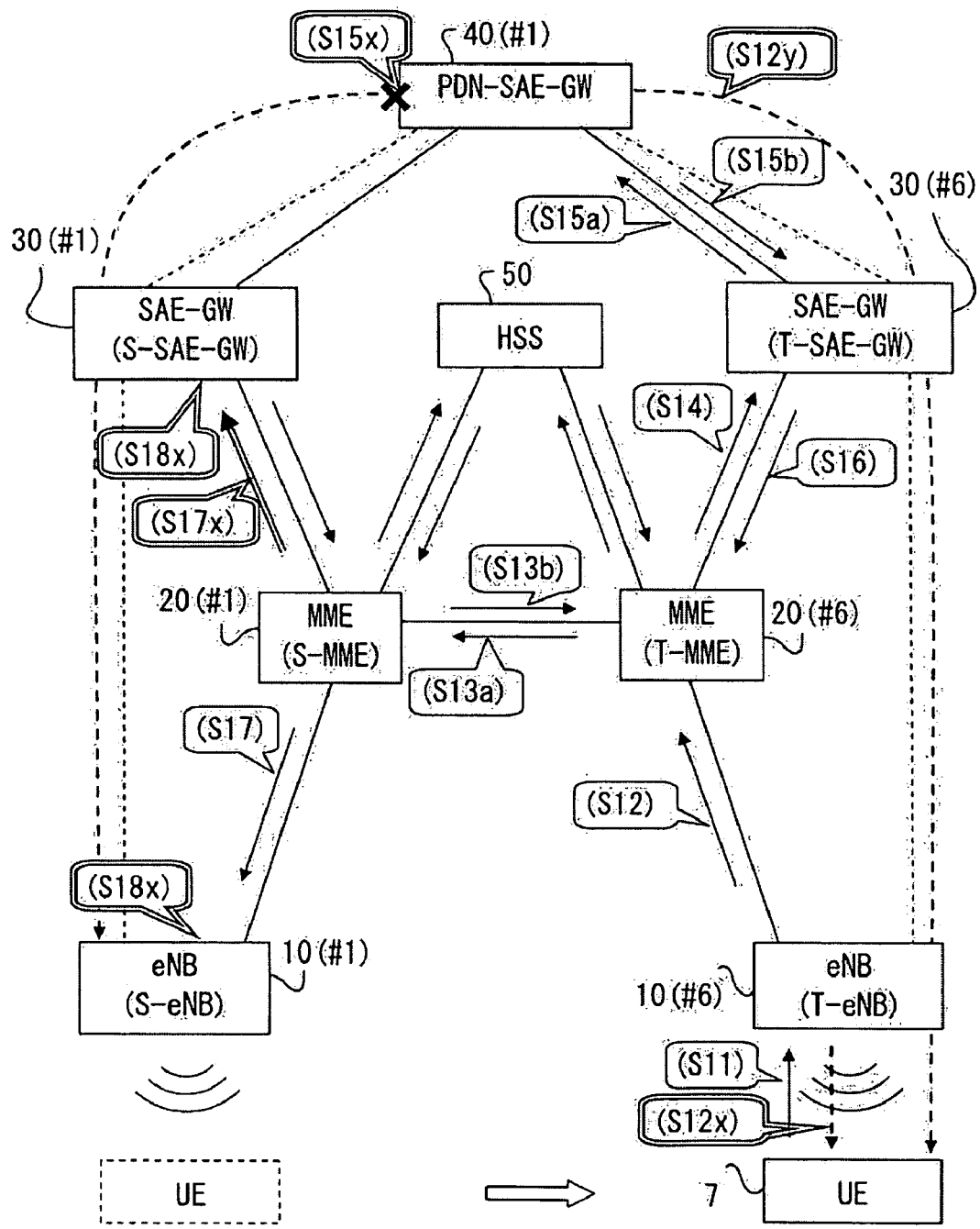
FIG. 12 is a diagram showing the user data downlink process when taking the S1 base handover by the LTE system in the first embodiment.

To begin with, a user data downlink process when taking the S1 base handover by the LTE system in the first embodiment will be described with reference to FIGS. 11 and 12. FIGS. 11 and 12 are diagrams each showing the user data downlink process when taking the S1 base handover by the LTE system in the first embodiment.

A premise for executing the handover process is that the S-eNB 10(#1) and the UE 7 transmit and receive, through the wireless communications, a pilot signal and reception quantity information measured based on this pilot signal (Measurement control, Measurement report). The S-eNB 10(#1) determines, based on the reception quantity information given from the UE 7, the handover for the UE 7 (S1). Upon determining the handover, the S-eNB 10(#1) sends a Relocation Required message to the MME 20(#1) (S2).

The S-MME 20(#1), when receiving this Relocation Required message, recognizes based on pieces of information specifying the UE 7, the S-eNB 10(#1) and the T-eNB 10(#6) contained in this message that the S1 base handover for the UE 7 is determined. The S-MME 20(#1) detects the T-MME 20(#6) managing the T-eNB 10(#6), and transmits the Forward Relocation Request message to the T-MME 20(#6) (S3). This message contains the UE context etc about the UE 7.

The T-MME 20(#6), when receiving the Forward Relocation Request message (S3), determines whether or not the SAE-GW should be changed with respect to the handover for the UE 7. Herein, the T-MME 20(#6) determines the T-SAE-GW 30(#6) as the SAE-GW that manages the T-eNB 10(#6). Subsequently, the T-MME 20(#6) transmits the Bi-casting Request message defined as an instruction for retaining the downlink data addressed to the UE 7 to the T-eNB 10(#6) (S3*ax*). At this time, the Bi-casting Request message may contain a bearer set up for the UE 7 and an identifier specifying the PDN-SAE-GW 40(#1).

The T-eNB 10(#6) receiving the Bi-casting Request message prepares for retaining the downlink data addressed to the UE 7. At this time, the T-eNB 10(#6) allocates the tunnel end point information (D-eNB-TEID) for the downlink traffic (S1 U-plane) of the UE 7 about the GTP tunnel between the T-eNB 10(#6) and the T-SAE-GW 30(#6).

The T-eNB 10(#6), when completely preparing for retaining the downlink data and if having a success in allocating the D-eNB-TEID for the downlink traffic, transmits the Bi-casting Response message containing the allocated D-eNB-TEID etc back to the T-MME 20(#6) (S3*bx*). The T-eNB 10(#6) thereafter retains the downlink data for the UE 7 that is sent from the T-SAE-GW 30(#6) till taking the synchronism with the UE 7 (S10*y*).

Note that the T-eNB 10(#6) may generate, based on the information such as the bearer and the security context contained in the Bi-casting Request message, the UE context with respect to the UE 7.

The T-MME 20(#6), when receiving the Bi-casting Response message from the T-eNB 10(#6) (S3*bx*), transmits the Create Context Request (SAE-GW) message containing the D-eNB-TEID included in this Response message to the T-SAE-GW 30(#6) (S4*a*).

The T-SAE-GW 30(#6), upon receiving the Create Context Request (SAE-GW) message from the T-MME 20(#6) (S4*a*), extracts the D-eNB-TEID contained in this message. With this process, the T-SAE-GW 30(#6) hereafter forwards the downlink data for the UE 7, which is transmitted from the PDN-SAE-GW 40, to the T-eNB 10(#6) by use of the D-eNB-TEID.

Further, at this time, the T-SAE-GW 30(#6) allocates the tunnel end point information (D-SAEGW-TEID) for the downlink traffic (S1 user plane) of the UE 7 about the GTP tunnel between the T-SAE-GW 30(#6) and the PDN-SAE-GW 40(#1).

The T-SAE-GW 30(#6), when getting successful in allocating the D-SAEGW-TEID, transmits the Bi-casting Request message containing the D-SAEGW-TEID to the PDN-SAE-GW 40(#1) (S4*ax*). This message is utilized for instructing the PDN-SAE-GW 40(#1) to Bi-cast the downlink data addressed to the UE 7.

The PDN-SAE-GW 40(#1), upon receiving the Bi-casting Request message (S4*ax*), extracts the D-SAEGW-TEID contained in this message. With this operation, the PDN-SAE-GW 40(#1) hereafter utilizes the D-SAEGW-TEID about the downlink data addressed to the UE 7 and to be transmitted to the T-SAE-GW 30(#6). Note that the tunnel end point information used for the transmission to the S-SAE-GW 30(#1) as the other gateway of the Bi-casting involves using the already-allocated information as it is. The PDN-SAE-GW 40(#1), on the occasion of Bi-casting the downlink data, attaches the same identification number to the same downlink data and transmits the downlink data together with the attached identification number to the source side and the target side, respectively. The PDN-SAE-GW 40(#1) thereafter sends the Bi-casting Response message back to the T-SAE-GW 30(#6) (S4*bx*).

The T-SAE-GW 30(#6), when receiving this Bi-casting Response message (S4*bx*), sends the Create Context Response (SAE-GW) message to the T-MME 20(#6) (S4*b*).

The T-MME 20(#6), upon receiving this message, transmits the Relocation Request message to the T-eNB 10(#6) (S5*a*).

The T-eNB 10(#6), when receiving this Relocation Request message, generates, based on the information such as the bearer and the security context contained in this message, a UE context related to the UE 7. The T-eNB 10(#6) sends a Relocation Request Acknowledge message back to the T-MME 20(#6) (S5*b*). Note that if the Bi-casting Request message (S3*ax*) sent to the T-eNB 10(#6) from the T-MME 20(#6) contains the information for generating the UE context, the processes in (S5*a*) and (S5*b*) may be removed.

The PDN-SAE-GW 40(#1), after receiving the Bi-casting Request message, starts transmitting the downlink data addressed to the UE 7 to the T-SAE-GW 30(#6) and the S-SAE-GW 30(#1) as well (S10*x*) (Bi-casting transmission).

The Bi-cast downlink data is sent via the T-SAE-GW 30(#6) to the T-eNB 10(#6) by using the D-SAEGW-TEID and the D-eNB-TEID described above. The T-eNB 10(#6) retains the downlink data till taking the synchronism with the UE 7 (S10*y*). At this time, the UE 7, which does not yet receive the Handover Command from the S-eNB 10(#1) and is kept in the connecting status with the S-eNB 10(#1), therefore receives the data downlinked via the S-SAE-GW 30(#1) and S-eNB 10(#1) (S10*x*).

By the way, the T-MME 20(#6), upon receiving Relocation Request Acknowledge message (S5*b*), sends the Forward Relocation Response message to the S-MME 20(#1) (S6).

The S-MME 20(#1) recognizes by receiving this message that the necessary resources have already been ensured in the handover target node of the UE 7. With this process, the S-MME 20(#1) executes a process of updating the SAE-GW managing the U-plane for the UE 7 to the T-SAE-GW 30(#6) from the S-SAE-GW 30(#1). At this time, the S-MME 20(#1) transmits an Update Context Request (SAE-GW) message to the S-SAE-GW 30(#1), and receives an Update Context Response (SAE-GW) message from the S-SAE-GW 30(#1) (S7*a*) (S7*b*).

The S-MME 20(#1) transmits the Relocation Command message to the S-eNB 10(#1) (S8). The S-eNB 10(#1) receiving this message sends the Handover Command to the UE 7 in order to notify that the preparation for the handover is approved by the system side (S9).

The UE 7, when receiving the Handover Command (S9), secedes from the precedent cell managed by the S-eNB 10(#1) and starts the synchronizing process with a present cell managed by the T-eNB 10(#6). The UE 7, when taking the synchronism with the present cell, sends the Handover Confirm message to the T-eNB 10(#6) (S11).

The T-eNB 10(#6) detects the approval of the handover for the UE 7 by receiving the Handover Confirm message from the UE 7. With this operation, the T-eNB 10(#6) wirelessly transmits the retained downlink data addressed to the UE 7 to the UE 7 (S12x). The Handover Confirm message contains an identification number (UE-eNB identification number) of the data requested to be downlinked by the UE 7. Accordingly, the T-eNB 10(#6) transmits, to the UE 7, the data after the data specified by the identification number in the sequence from the data specified by the identification number in the retained data.

Note that the downlink data still remains to be Bi-cast. The T-eNB 10(#6) has detected the approval of the handover for the UE 7, and therefore wirelessly transmits, to the UE 7, the downlink data sent from the T-SAE-GW 30(#6) after receiving the Handover Confirm message so as to reach the UE 7 in the sequence according to the identification number.

Figure 27:
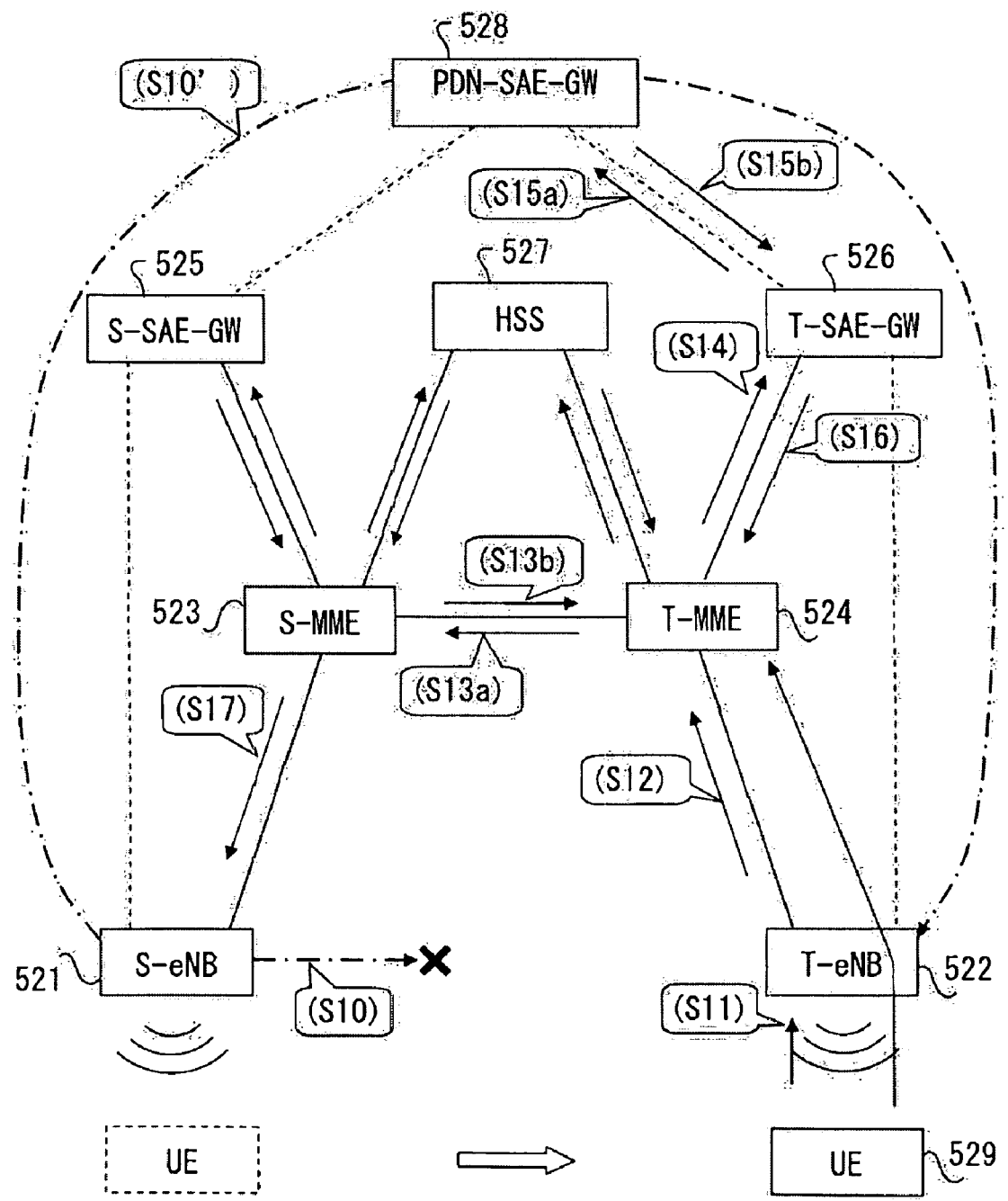
FIG. 27 is a diagram showing an outline of the S1 base handover process by the conventional LTE mobile communication system.

Thereafter, in the same way as in FIG. 27, the T-eNB 10(#6) notifies the T-MME 20(#6) of the approval of the handover for the UE 7 through a Relocation Complete message (S12). With this operation, the Update Context Request (SAE-GW) message is sent to the T-SAE-GW 30(#6) from the T-MME 20(#6) (S14), and an Update Context Request (PDN-SAE-GW) message is sent to the PDN-SAE-GW 40(#1) from the T-SAE-GW 30(#6) (S15a).

The PDN-SAE-GW 40(#1), when detecting the approval of the handover for the UE 7 by receiving this message, switches over the signals addressed to the UE 7 to the handover target node (target side), and stops Bi-casting the downlink data addressed to the UE 7 (S15x). Namely, the PDN-SAE-GW 40 (#1) hereafter transmits, with respect to the S1 user plane, the downlink data addressed to the UE 7 via only a route passing though the T-SAE-GW-30(#6) and the T-eNB 10(#6) (S12y)

The PDN-SAE-GW 40(#1) sends the Update Context Response (PDN-SAE-GW) message back to the T-SAE-GW 30(#6) (S15b). The T-SAE-GW 30(#6), upon receiving this reply, sends the Update Context Response (SAE-GW) message to the T-MME 20(#6) (S16).

Incidentally, the T-MME 20(#6), when receiving the Relocation Complete message from the T-eNB 10(#6) (S12), transmits the Update Context Request message to the T-SAE-GW 30(#6) (S14) and transmits the Forward Relocation Complete message to the S-MME 20(#1) (S13a).

The S-MME 20(#1), when detecting the approval of the handover for the UE 7 by receiving this message, transmits a Release Resource message to the S-eNB 10(#1) and the S-SAE-GW 30(#1) (S17) (S17x). The S-eNB 10(#1) and the S-SAE-GW 30(#1) receiving this message release the resources ensured for the UE 7, such as the downlink data and the uplink data addressed to the UE 7 that are retained by the Bi-casting (S18x).

<Uplink Process>

Figure 13:
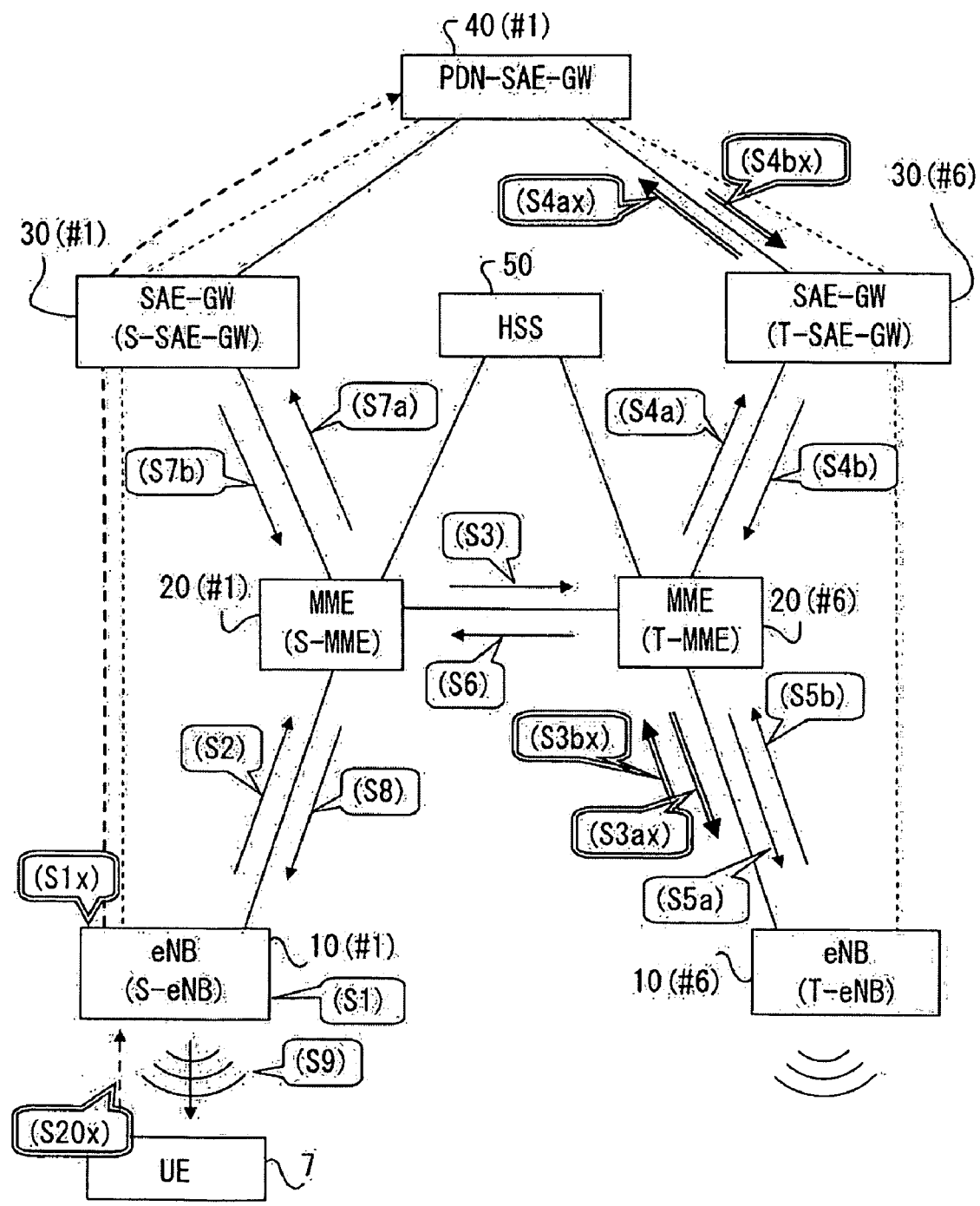
FIG. 13 is a diagram showing the user data uplink process when taking the S1 base handover by the LTE system in the first embodiment.
Figure 14:
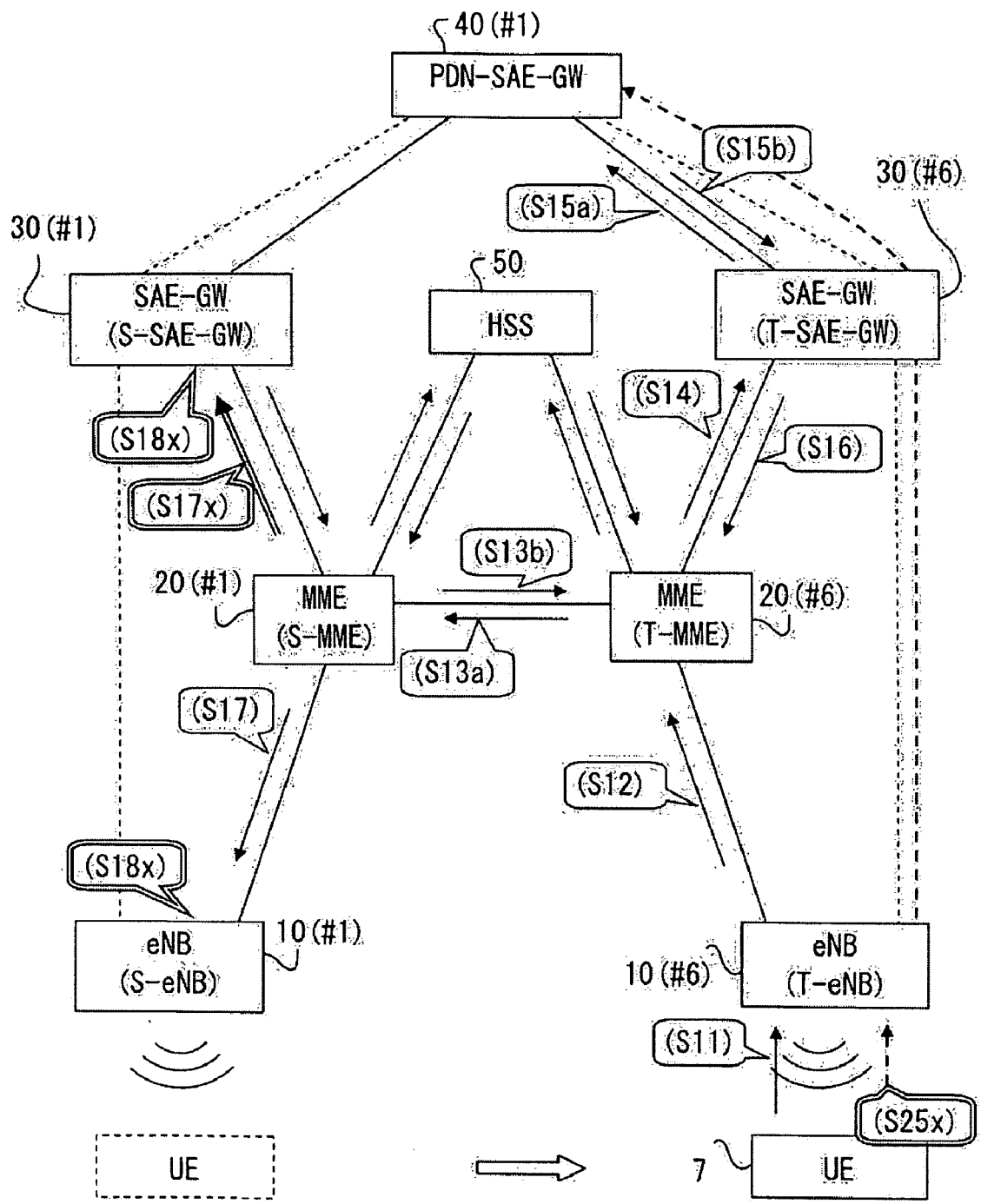
FIG. 14 is a diagram showing the user data uplink process when taking the S1 base handover by the LTE system in the first embodiment.

Next, a user data uplink process when taking the S1 base handover by the LTE system in the first embodiment will be explained with reference to FIGS. 13 and 14. FIGS. 13 and 14 are diagrams each showing the user data uplink process when taking the S1 base handover by the LTE system in the first embodiment. Note that a C-plane message (depicted by a solid line) illustrated in FIGS. 13 and 14 is the same as in FIGS. 11 and 12, and hence only the C-plane message related to the user data uplink process will be described herein. Further, the processes marked with the same symbols and numerals (indicated by balloon lines) in FIGS. 13 and 14 are the same processes as those in FIGS. 11 and 12.

The S-eNB 10(#1), when determining the handover for the UE 7 (S1), hereafter performs the sequence control of the uplink data from the UE 7 (S1x). Specifically, the S-eNB 10 (#1), when receiving the uplink data from the UE 7 (S20x), manages a UE-eNB identification number thereof, forwards only the uplink data that can be received in the due sequence to the S-SAE-GW 30(#1), and does not forward but retain the uplink data that can not be received in the due sequence (S1x). At this time, the UE 7 also checks, based on the existence or non-existence of the ACK signal from the S-eNB 10(#1), whether the uplink data normally reaches the S-eNB 10(#1) or not. The UE 7 retains the identification number of the uplink data determined not to normally reach the S-eNB 10(#1).

After the S-eNB 10(#1) has determined the handover for the UE 7, in the same way as in FIGS. 11 and 12, the C-plane message is transmitted and received. The tunnel end point information for the uplink traffic (S1 user plane) for the UE 7 in the GTP tunnel may involve utilizing the same information as the information used on the connecting source side, and the information may newly be allocated by the connecting destination.

If the connecting destination (target side) newly allocates the tunnel end point information, the information may be delivered to each node through the C-plane message as follows.

The T-SAE-GW 30(#6), on the occasion of receiving the Create Context Request (SAE-GW) message from the T-MME 20(#6) (S4a), allocates the tunnel end point information (U-eNB-TEID) for the uplink traffic (S1 user plane) forth UE 7 about the GTP tunnel between the T-eNB 10(#6) and the GW 30(#6) itself.

The PDN-SAE-GW 40(#1), when receiving the Bi-casting Request message (S4ax), allocates the tunnel end point information (U-SAEGW-TEID) for the uplink traffic (S1 user plane) of the UE 7 about the GTP tunnel between the T-SAE-GW 30(#6) and the GW 40(#1) itself. The PDN-SAE-GW 40(#1), on the occasion of sending the Bi-casting Response message back to the T-SAE-GW 30(#6) (S4bx), gets the U-SAEGW-TEID contained in this message.

The T-SAE-GW 30(#6), upon receiving this Bi-casting Response message (S4bx), extracts the U-SAEGW-TEID contained in this message. With this operation, the T-SAE-GW 30(#6) transmits the uplink data sent by the T-eNB 10(#6) from the UE 7 to the PDN-SAE-GW 40(#1) by use of this U-SAEGW-TEID.

The T-SAE-GW 30(#6), on the occasion of sending the Create Context Response (SAE-GW) message back to the T-MME 20(#6), gets the previously-allocated U-eNB-TEID contained in this message (S4b). The T-MME 20(#6), when receiving this message, extracts the U-eNB-TEID from this message. The T-MME 20(#6), on the occasion of transmitting the Relocation Request message to the T-eNB 10(#6) (S5a), gets the U-eNB-TEID contained in this message.

The T-eNB 10(#6), when receiving the Relocation Request message (S5a), extracts the U-eNB-TEID contained in this message. With this operation, the T-eNB 10(#6) transmits the uplink data sent from the UE 7 to the T-SAE-GW 30(#6) by use of the U-eNB-TEID.

The UE 7 receives the Handover Command (S9), and, when taking the synchronism with the present cell managed by the T-eNB 10(#6), sends the Handover Confirm message to the T-eNB 10(#6) (S11). Thereafter, the UE 7 wirelessly transmits, to the T-eNB 10(#6), the data after the data specified by the identification number in the sequence from the uplink data that is determined not to normally reach the S-eNB 10(#1) (S25x).

The PDN-SAE-GW 40(#1) receives the uplink data from the UE 7 via a route of the S-eNB 10(#1) through the S-SAE- GW 30(#1) and via a route of the T-eNB 10(#6) through the T-SAE-GW 30(#6). At this time, only the uplink data received in the due sequence under the data sequence control by the S-eNB 10(#1) is delivered to the PDN-SAE-GW 40(#1). As for the uplink data with a change in the data reception sequence, the data after the data specified by the identification number thereof are made to stay in the S-eNB 10(#1). Thereafter, the uplink data with the change in the reception sequence and the data after the identification number thereof are sequentially delivered to the PDN-SAE-GW 40(#1) via the T-eNB 10(#6).

Owing to this operation, the PDN-SAE-GW 40(#1) has no necessity for performing the sequence control of the uplink data with respect to the UE 7. The PDN-SAE-GW 40(#1), however, conducts the dual check of the data because of there being the case of receiving the same data via the route of the S-eNB 10(#1) and via the route of the T-eNB 10(#6).

Operation and Effect in First Embodiment

In the LTE system according to the first embodiment, if the S-eNB 10(#1) determines the handover for the UE 7, the PDN-SAE-GW 40(#1) is immediately notified of this determination by use of the C-plane control message. Through this notification, the PDN-SAE-GW 40(#1) detects the handover for the UE 7 and the Bi-casting of the downlink data addressed to the UE 7 is started. As to the downlink data to be Bi-cast, the same data on both of the source side and the target side are attached with the same identification number and thus transmitted.

The Bi-cast downlink data is retained by the T-eNB 10(#6) till the downlink request (Handover Confirm message) containing the designation of the predetermined identification number is sent from the UE 7.

This scheme enables the UE 7 to receive any downlink data from any eNB 10 before and after taking the handover for the UE 7 when conducting the S1 base handover, whereby the UE 7 can receive all the data without any leak of the data. The UE 7 can receive from the T-eNB 10(#6) the downlink data that can not be received from the S-eNB 10(#1) before the approval of the handover.

The C-plane control message used for the PDN-SAE-GW 40(#1) to start the Bi-casting is transferred and received as follows.

When the S-eNB 10(#1) determines the S1 base handover for the UE 7, the S-MME 20(#1) is notified of the S1 base handover through the Relocation Required message, and the T-MME 20(#6) is notified of this handover through the Forward Relocation Request message. Furthermore, the T-ME 20(#6) notifies the T-SAE-GW 30(#6) of the S1 base handover for the UE 7 through the Create Context Request (SAE-GW) message, and the T-SAE-GW 30(#6) notifies the PDN-SAE-GW 40(#1) of this handover through the Bi-casting Request message.

Thus, according to the first embodiment, the handover for the UE 7, which is determined by the S-eNB 10(#1), is notified to the PDN-SAE-GW 40(#1) through the C-plane control message. This scheme enables the Bi-casting transmission to be promptly started, whereby the loss of the downlink data can be reduced.

Note that in order to notify the high-order node of the determination of the handover through the C-plane control message, the communication resources (tunnel end point information: D-eNB-TEID and D-SAEGW-TEID) on the target side, which are needed for starting the Bi-casting, are ensured in the node on the target side, and the high-order node is notified of these pieces of information simultaneously.

The identification number for specifying the downlink data may be utilized in unification throughout the LTE system as a whole. This scheme eliminates the necessity for providing the function unit that converts the identification number between the nodes. Further, each unique identification number is utilized between the nodes and is converted by each node, whereby there may be acquired the same effect as by utilizing the identification number in unification throughout the system on the whole. This scheme, though each node requires the function unit for converting the identification number, enables a data size of the identification number itself to be reduced.

When the T-eNB 10(#6) detects the approval of the handover for the UE 7, the PDN-SAE-GW 40(#1) is immediately notified of this detection by use of the C-plane control message, and the Bi-casting is stopped. At this time, when the S-MME 20(#1) detects the approval of the handover for the UE 7, the Resource Release message is sent to the S-SAE-GW 30(#1) and the S-eNB 10(#1), respectively.

With this operation, there are released the downlink data sent to the S-eNB 10(#1) after the approval of the handover for the UE 7 and the communication resources utilized for the downlink.

On the other hand, in the LTE system according to the first embodiment, after S-eNB 10(#1) has determined the handover for the UE 7, the uplink data is received from the UE 7, in which case the data sequence control is conducted. Namely, if the uplink data is not received in the due sequence, the uplink data received after the data received in the non-due sequence is not forwarded to the high-order node. The uplink data that can not be delivered in the due sequence to the S-eNB 10(#1) is, after the identification number thereof, transmitted in the sequence via the T-eNB 10(#6).

With this scheme, the PDN-SAE-GW 40(#1) has no necessity for performing the sequence control such as rearranging the uplink data even when taking the S1 base handover, and hence a processing load on the PDN-SAE-GW 40(#1) can be decreased.

Second Embodiment

The LTE system in a second embodiment will hereinafter be described. A system architecture of the LTE system in the second embodiment is the same as the system architecture of the LTE system in the first embodiment illustrated in FIG. 1, and therefore its description is omitted herein.

[Outline of Operation]

Figure 15:
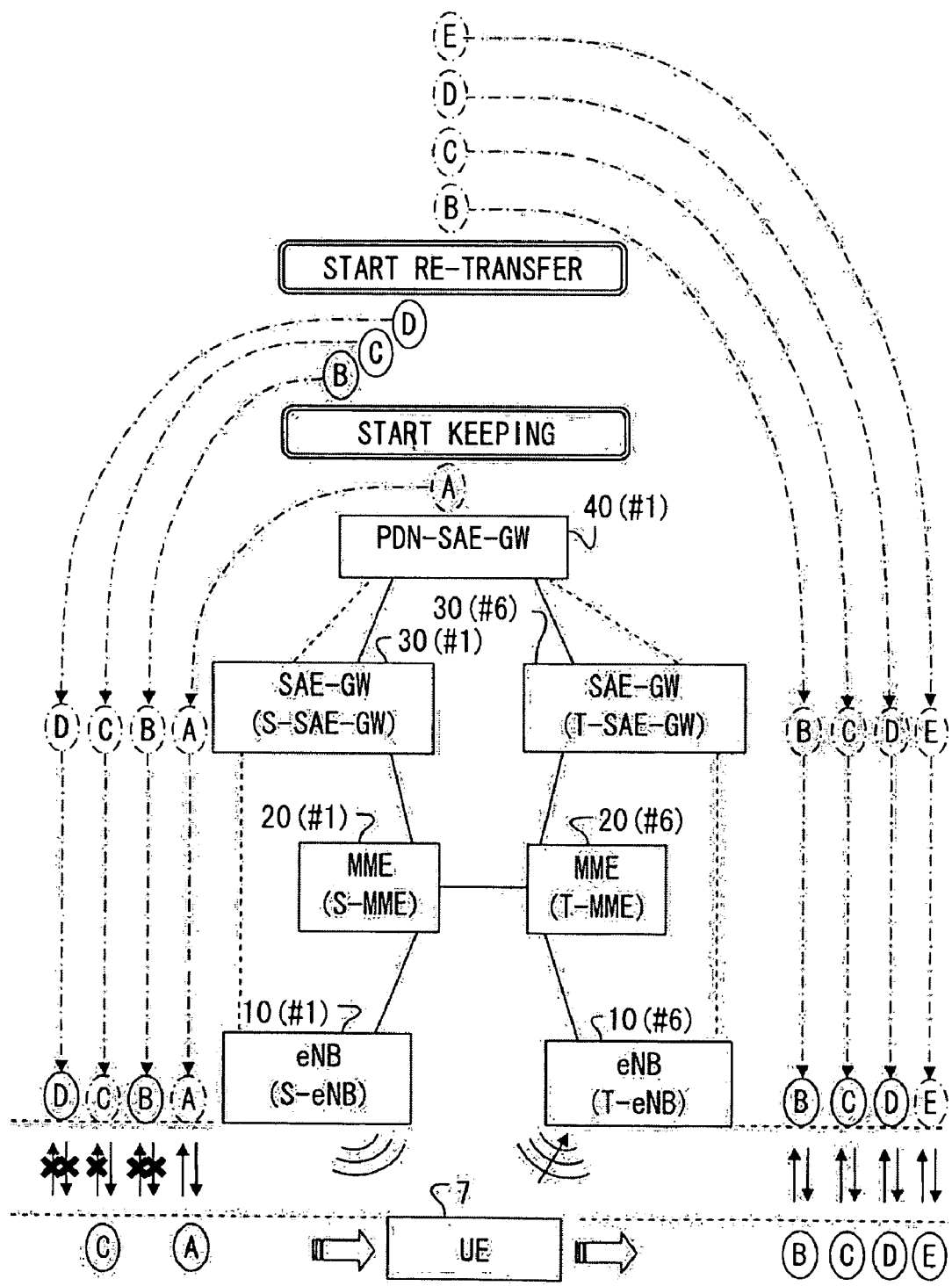
FIG. 15 is a diagram showing the user data downlink process when taking the S1 base handover by the LTE system in a second embodiment.

An operation of the LTE system in the second embodiment will hereinafter be outlined with reference to FIG. 15. FIG. 15 is a diagram showing an outline of a user data downlink process when taking the S1 base handover by the LTE system in the second embodiment. Note that the LTE system in the second embodiment is different in terms of the downlink process from the first embodiment but is the same in terms of the uplink process as the first embodiment. Accordingly, only the downlink process will be discussed as below. Further, FIG. 15 illustrates the same scene as exemplified in FIG. 3, showing the example where the UE 7 takes the S1 base handover from eNB 10(#1) to the eNB 10(#6).

<Downlink Process>

The PDN-SAE-GW 40(#1) holds the data, A, B, C, D, E as the downlink data (user data) addressed to the UE 7, and the UE 7 connects to the S-eNB 10(#1). The downlink data transmitted from the PDN-SAE-GW 40(#1) is delivered to the UE 7 via the S-SAE-GW 30(#1) and the S-eNB 10(#1). The UE 7 moves toward the T-eNB 10(#6) from the S-eNB 10(#1).

In the LTE system, when the S-eNB 10(#1) determines the handover for the UE 7, the eNB 10, the MME 20 and the SAE-GW 30 notify the PDN-SAE-GW 40(#1) of the handover for the UE 7 by using the C-Plane control message.

The PDN-SAE-GW 40(#1), upon detecting the handover for the UE 7 from the C-plane control message, hereafter continues to transmit the downlink data addressed to the UE 7, and retains a copy of the downlink data till a transmission instruction comes in again. At this time, the already-downlinked user data and the copy thereof are attached with the same identification number and thus retained. According to an example in FIG. 15, the PDN-SAE-GW 40(#1) transmits the downlink data B, C, D via a route of the S-SAE-GW 30(#1) through the S-eNB 10(#1), and retains the copies of these pieces of downlink data.

The UE 7 could, it is assumed, normally receive the downlink data A, C from the S-eNB 10(#1). Thereafter, the UE 7 receives the Handover Command message from the S-eNB 10(#1), and executes the handover process for the UE 7 itself. The UE 7, thereafter, transmits the Handover Confirm message to the T-eNB 10(#6). At this time, the UE 7 gets an identification number of the reception-disabled downlink data contained in the Handover Confirm message. The example in FIG. 15 shows that the Handover Confirm message contains the identification number specifying the downlink data B.

The identification number contained in this Handover Confirm message is, together with the notification of the approval of the handover for the UE 7, delivered to the PDN-SAE-GW 40(#1) via the T-eNB 10(#6), the T-MME 20(#6) and the T-SAE-GW 30(#6) by utilizing the C-plane control message.

The PDN-SAE-GW 40(#1), upon detecting the approval of the handover for the UE 7, stops the transmission of the downlink data toward the source side and the retention of the copy thereof, and starts transmitting the subsequent downlink data to the T-SAE-GW 30(#6) on the target side. In this case, the copy of the downlink data is not retained.

At this time, the PDN-SAE-GW 40(#1), before starting the transmission of the downlink data to the T-SAE-GW 30(#6), transmits, to the T-SAE-GW 30(#6), the downlink data after the notified identification number in the sequence from the downlink data specified by the notified identification number in the retained downlink data. According to the example in FIG. 15, the identification number specifying the downlink data B is notified from the UE 7, and hence the PDN-SAE-GW 40(#1) transmits the retained downlink data B, C, D in the due sequence to the T-SAE-GW 30(#6). Thereafter, the PDN-SAE-GW 40(#1) transmits the downlink data E to the T-SAE-GW 30(#6).

This scheme enables the UE 7 to receive the downlink data from any eNB 10 before and after the handover, and can therefore receive all the data without causing any leak of the data. Especially, the UE 7, when in the handover process, can receive the downlink data B, D, which could not be received by the S-eNB 10(#1), from the T-eNB 10(#6) because of the data B, D being retained in the PDN-SAE-GW 40(#1).

[Configuration of Device]

A function of each of the devices (nodes) building up the LTE system in the second embodiment will hereinafter be explained. Note that only the node functions related to the uplink and the downlink of the user data when taking the S1 base handover are explained, and the explanations and illustrations of other functions, which may be whatever types of functions, are therefore omitted.

<eNB>

Figure 16:
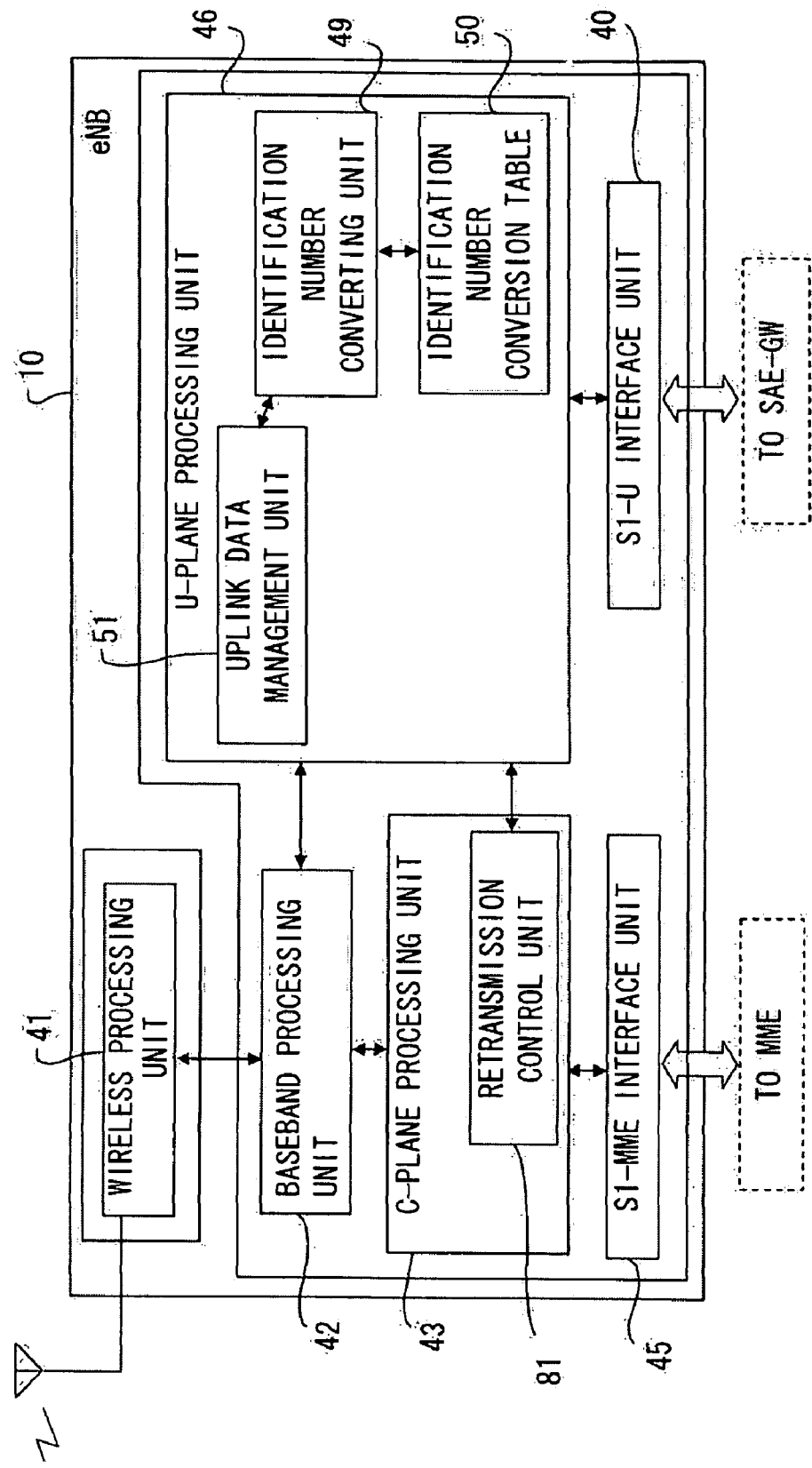
FIG. 16 is a block diagram showing a functional configuration of the eNB 10 in the second embodiment.

FIG. 16 is a block diagram showing a functional configuration of the eNB 10 in the second embodiment. As shown in FIG. 16, the eNB 10 in the second embodiment has the same function units as those in the first embodiment illustrated in FIG. 5. The eNB 10 in the second embodiment is, however, different to some extent from the first embodiment in terms of the functions of the C-plane processing unit 43 and the U-plane processing unit 46. Only the function units different from the first embodiment will hereinafter be described.

The C-plane processing unit 43 has a retransmission control unit 81 as a substitute for the Bi-casting processing unit 44 in the first embodiment. The retransmission control unit 81 processes the Handover Confirm message and the Relocation Complete message in the C-plane control messages processed by the C-plane processing unit 43. To be specific, the C-plane processing unit 43, when becoming the T-eNB and when receiving the Handover Confirm message from the UE 7 via the wireless processing unit 41 and the baseband processing unit 42, transmits this message to the retransmission control unit 81.

The retransmission control unit 81 extracts a downlink data identifier contained in the Handover Confirm message. The downlink data identifier is data for specifying the downlink data that can not be normally received by the UE 7 from the S-eNB 10(#1). The retransmission control unit 81, when transmitting the Relocation Complete message from the C-plane processing unit 43, gets the extracted downlink data identifier contained in this message. The Relocation Complete message is transmitted to the T-MME 20(#6) via the S1-MME interface unit 45.

The U-plane processing unit 46 has neither the Bi-casting data retaining unit 47 nor the retain data transmission unit 48 given in the first embodiment. Other functions of the U-plane processing unit 46 are the same as those in the first embodiment.

Note that in the second embodiment it is also necessary for the whole LTE system to grasp the identification number for specifying the user data. This identification number is utilized for specifying the data that the UE 7 wants to download, and the UE 7 notifies of this identification number through the Handover Confirm message etc. Accordingly, in the second embodiment also, similarly to the first embodiment, the U-plane processing unit 46 includes the identification number converting unit 49 and the identification number conversion tale 50. Incidentally, the whole LTE system including the UE 7 utilizes the identification number for specifying the user data in unification, in which case the U-plane processing unit 46 has no necessity of including the identification number converting unit 49 and the identification number conversion tale 50.

<MME>

Figure 17:
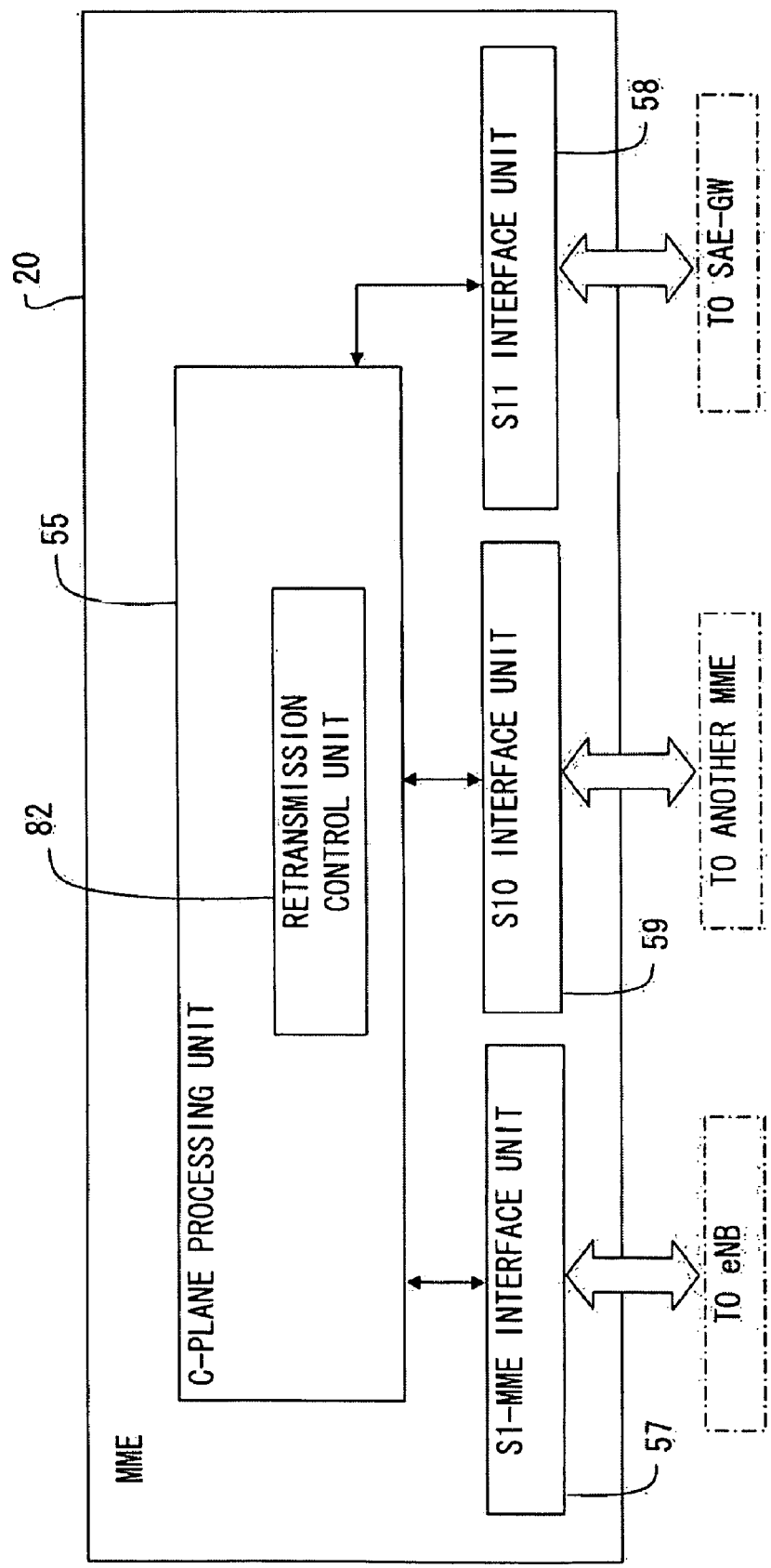
FIG. 17 is a block diagram showing a functional configuration of the MME 20 in the second embodiment.

FIG. 17 is a block diagram showing a functional configuration of the MME 20 in the second embodiment. As illustrated in FIG. 17, the MME 20 in the second embodiment has the same function units as those in the first embodiment shown in FIG. 7. The MME 20 in the second embodiment is, however, different to some extent from the first embodiment in terms of a function of a C-plane processing unit 55. Only the function unit different from the first embodiment will hereinafter be described.

The C-plane processing unit 55 includes a retransmission control unit 82 in place of the Bi-casting control unit 56 in the first embodiment. The retransmission control unit 82 processes the Relocation Complete message and the Update Context Request (SAE-GW) message in the C-plane control messages processed by the C-plane processing unit 55. Specifically, the C-plane processing unit 55, when becoming the T-MME and when receiving the Relocation Complete message from the T-eNB 10(#6) via the S1-MME interface unit 57, transmits this message to the retransmission control unit 82.

The retransmission control unit 82 extracts the downlink data identifier contained in the Relocation Complete message. The retransmission control unit 82, when the Update Context Request (SAE-GW) message is transmitted from the C-plane processing unit 55, gets the extracted downlink data identifier contained in this message. This Update Context Request (SAE-GW) message is transmitted to the T-SAE-GW 30(#6) via the S1 interface unit 58.

<SAE-GW>

Figure 18:
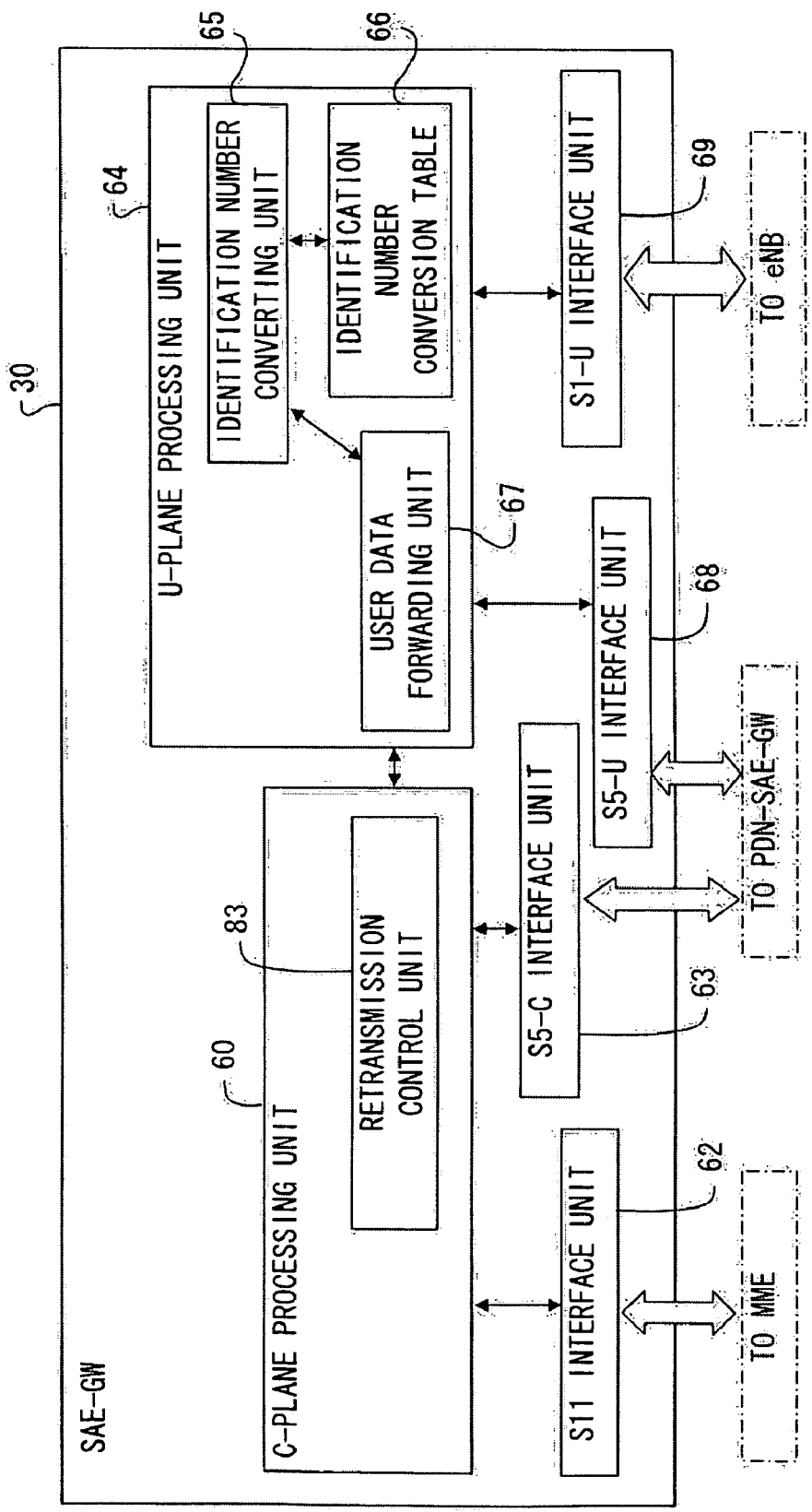
FIG. 18 is a block diagram showing a functional configuration of the SAE-GW 30 in the second embodiment.

FIG. 18 is a block diagram showing a functional configuration of the SAE-GW 30 in the second embodiment. As illustrated in FIG. 18, the SAE-GW 30 in the second embodiment has the same function units as those in the first embodiment illustrated in FIG. 8. The SAE-GW 30 in the second embodiment is, however, different to some extent from the first embodiment in terms of a function of a C-plane processing unit 60. Only the function unit different from the first embodiment will hereinafter be explained.

The C-plane processing unit 60 has a retransmission control unit 83 that replaces the Bi-casting control unit 61 in the first embodiment. The retransmission control unit 83 processes a Keep data Request message, a Keep data Response message, the Update Context Request (SAE-GW) message and the Update Context Request (PDN-SAE-GW) message in the C-plane control messages processed by the C-plane processing unit 60.

To be specific, the C-plane processing unit 60, when becoming the T-SAE-GW and when receiving the Create Context Request (SAE-GW) message from the T-MME 20(#6) via the S11 interface unit 62, notifies the retransmission control unit 83 of this purport. Further, the C-plane processing unit 60, when becoming the T-SAE-GW and when receiving the Update Context Request (SAE-GW) message from the T-MME 20(#6) via the S11 interface unit 62, transmits this message to the retransmission control unit 83.

The retransmission control unit 83, when receiving the notification purporting that the Create Context Request (SAE-GW) message is received from the C-plane processing unit 60, generates the Keep data Request message for starting the retention of the downlink data addressed to the UE 7. The retransmission control unit 83 transmits the Keep data Request message to the PDN-SAE-GW 40(#1) via the S5-C interface unit 63. The retransmission control unit 83, when receiving the Keep data Response message from the PDN-SAE-GW 40(#1) via the S5-C interface unit 63, instructs the C-plane processing unit 60 to transmit the Create Context Response (SAE-GW) message.

Further, the retransmission control unit 83, when receiving the Update Context Request (SAE-GW) message from the C-plane processing unit 60, extracts the downlink data identification number contained in this message. The retransmission control unit 83, when the Update Context Request (PDN-SAE-GW) message is transmitted from the C-plane processing unit 60, gets the extracted downlink data identifier contained in this message. The Update Context Request (PDN-SAE-GW) message is transmitted to the PDN-SAE-GW 40(#1) via the S5-C interface unit 63.

<PDN-SAE-GW>

Figure 19:
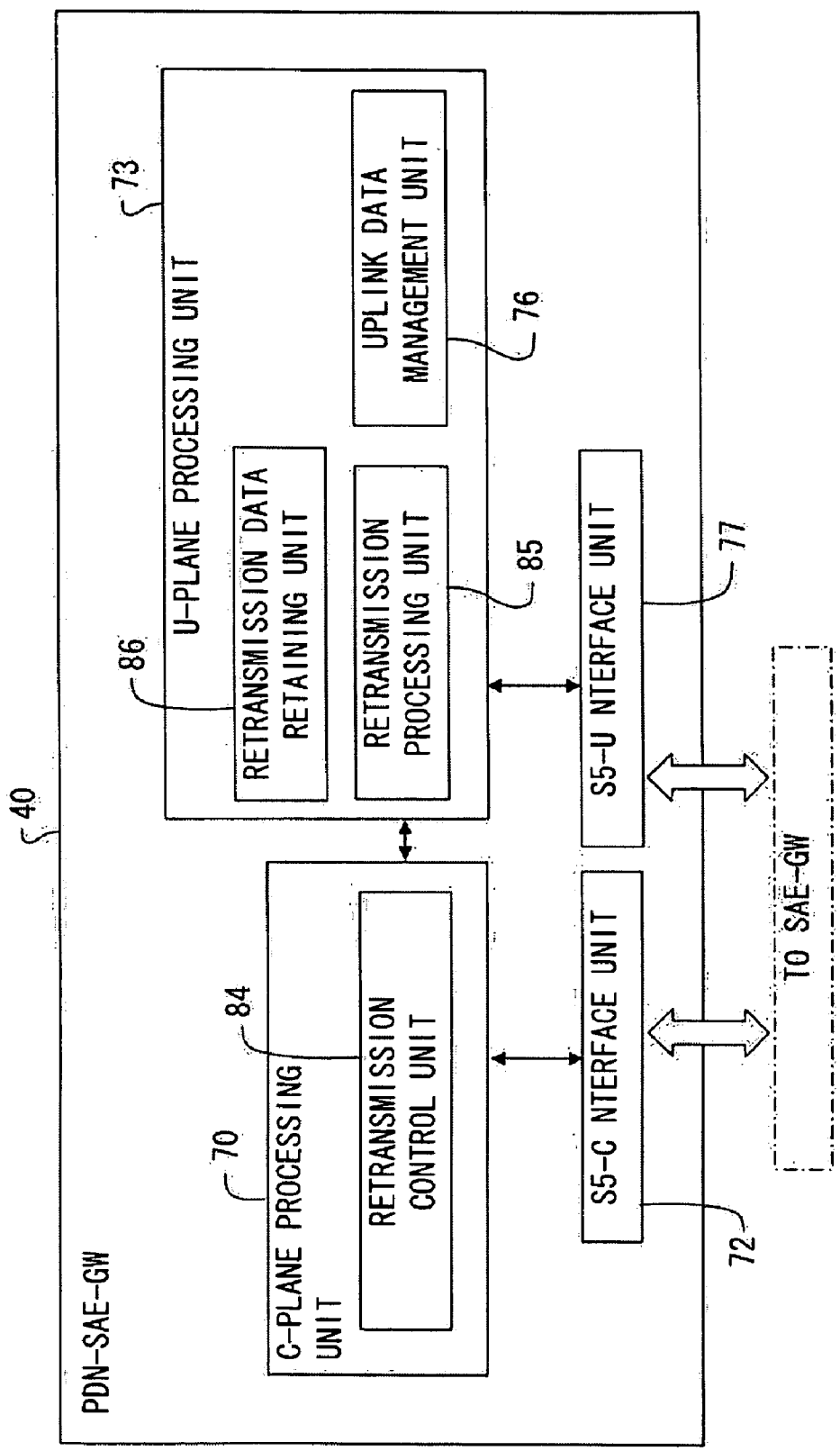
FIG. 19 is a block diagram showing a functional configuration of the PDN-SAE-GW 40 in the second embodiment.

FIG. 19 is a block diagram showing a functional configuration of the PDN-SAE-GW 40 in the second embodiment. As illustrated in FIG. 19, the PDN-SAE-GW 40 in the second embodiment has the same function units as those in the first embodiment illustrated in FIG. 10. The PDN-SAE-GW 40 in the second embodiment is, however, different to some extent from the first embodiment in terms of functions of a C-plane processing unit 70 and a U-plane processing unit 73. Only the function units different from the first embodiment will hereinafter be described.

The C-plane processing unit 70 has a retransmission control unit 84 as a substitute for the Bi-casting control unit 71 in the first embodiment. The retransmission control unit 84 processes the Keep data Request message, the Keep data Response message and the Update Context Request (PDN-SAE-GW) message in the C-plane control messages processed by the C-plane processing unit 70. To be specific, the C-plane processing unit 70, when receiving the Keep data Request message or the Update Context Request (PDN-SAE-GW) message via the S5-C interface unit 72, sends the message to the retransmission control unit 84.

The retransmission control unit 84, when receiving the Keep data Request message from the C-plane processing unit 70, instructs the U-plane processing unit 73 to start retaining the downlink data addressed to the UE 7 as the target of this message. The retransmission control unit 84, upon receiving the notification purporting that the retention of the downlink data addressed to the UE 7 is started from the U-plane processing unit 73, generates the Keep data Response message, and transmits this message to the T-SAE-GW 30(#6) via the S5-C interface unit 72.

The retransmission control unit 84, when receiving the Update Context Request (PDN-SAE-GW) message from the C-plane processing unit 70, extracts the downlink data identifying information contained in this message. The retransmission control unit 84 sends the extracted identifying information to the U-plane processing unit 73, and instructs the U-plane processing unit 73 to downlink the user data addressed to the UE 7 based on the identifying information.

The U-plane processing unit 73 includes a retransmission processing unit 85 and a retransmission data retaining unit 86 in place of the Bi-casting processing unit 75 in the first embodiment.

The retransmission data retaining unit 86, upon receiving an instruction to start retaining the downlink data addressed to the UE 7 from the U-plane processing unit 73, hereafter transmits the user data downlinked as addressed to the UE 7 to the SAE-GW 30, and retains a copy thereof. The retained user data is attached with the same identification number as that of the same user data that has already been downlinked toward the source side. At this time, the UE 7 still remains connected to the S-eNB 10(#1), and hence the U-plane processing unit 73 downlinks the user data addressed to the UE 7 via a route of the S-SAE-GW 30(#1) through the S-eNB 10(#1).

The retransmission processing unit 85, when receiving the downlink data identifying information requested from the UE 7 and the downlink instruction based on this identifying information from the U-plane processing unit 73, downlinks the data after the data specified by the identifying information in the sequence from the data specified by the identifying information in the downlink data addressed to the UE 7, which is retained by the retransmission data retaining unit 86. At this time, the path for the UE 7 is switched over to the target side on the basis of the Update Context Request (PDN-SAE-GW) message sent from the T-SAE-GW 30(#6). Accordingly, the retransmission processing unit 85, in the case of retransmitting the data retained by the retransmission data retaining unit 86, downlinks the data via the route of the T-SAE-GW 30(#6) and the T-eNB 10(#6).

Operational Example

Figure 20:
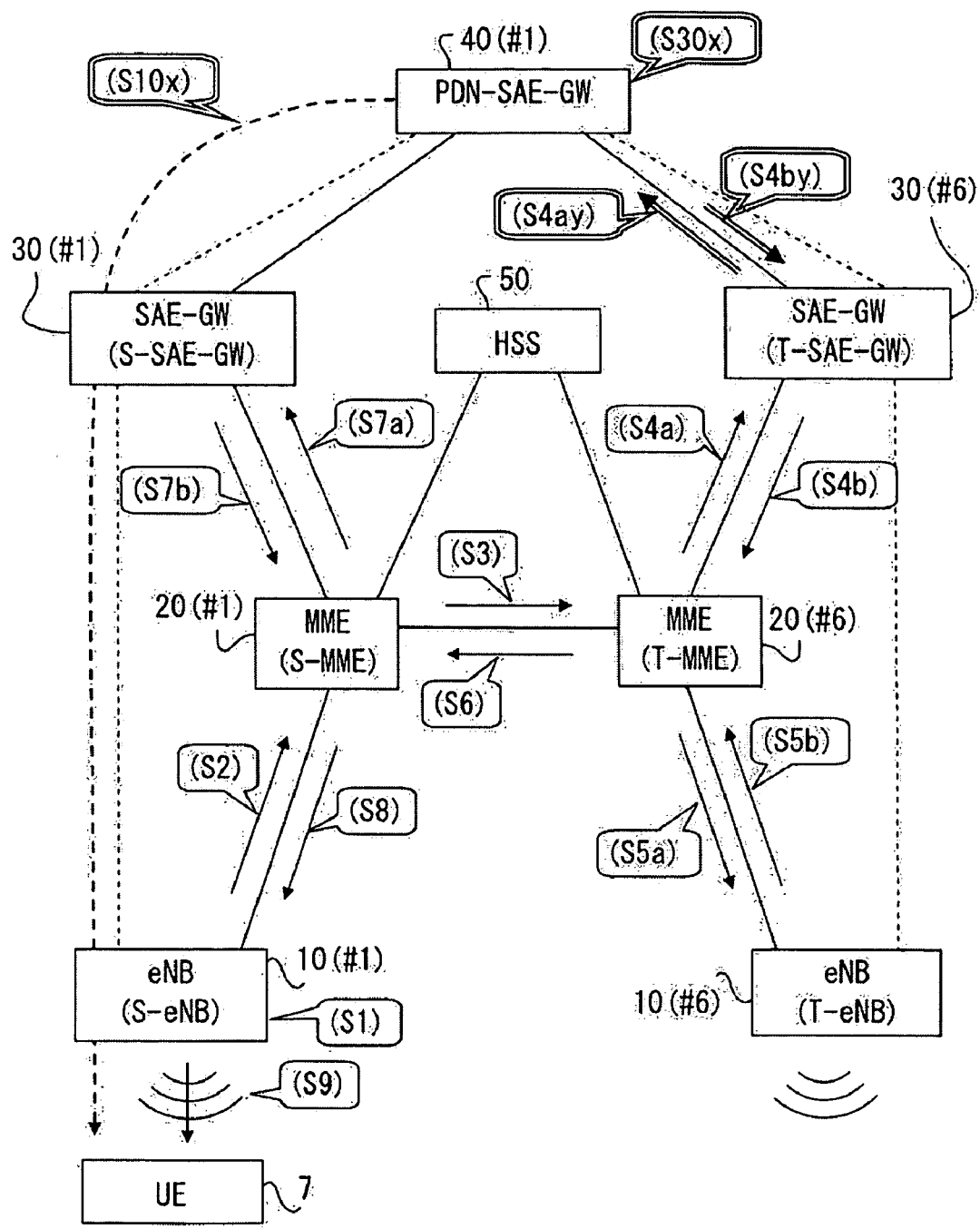
FIG. 20 is a diagram showing an operational example of the LTE system in the second embodiment.
Figure 21:
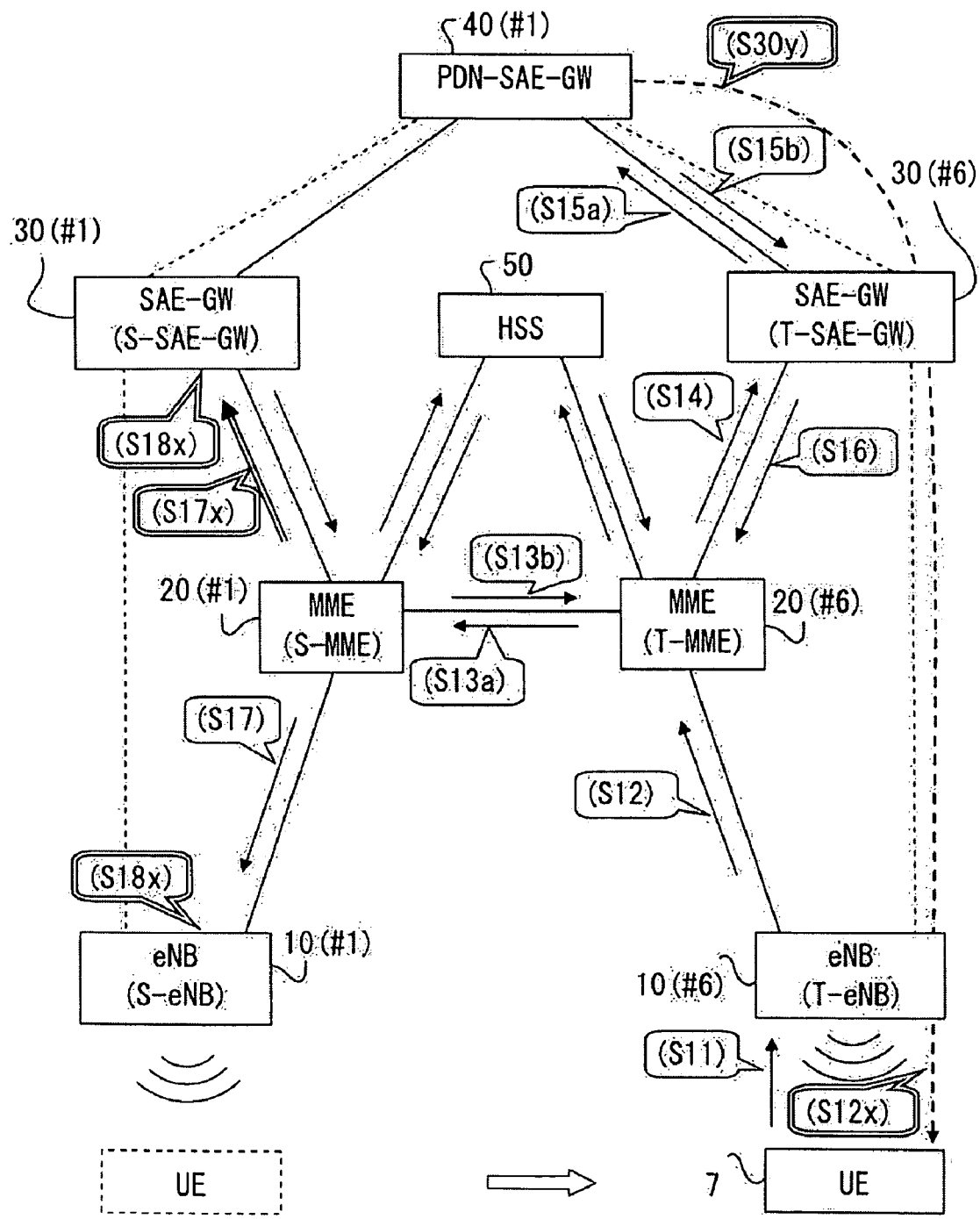
FIG. 21 is a diagram showing an operational example of the LTE system in the second embodiment.

An operational example of the LTE system in the second embodiment will hereinafter be described with reference to FIGS. 20 and 21. FIGS. 20 and 21 are diagrams each showing the operational example of the LTE system in the second embodiment, and exemplify a case in which the UE 7 takes the S1 base handover from the S-eNB 10(#1) to the T-eNB 10(#6) in the example of the system architecture in FIG. 1. In FIGS. 20 and 21, the message depicted by the solid line is the C-plane message, and the message depicted by the dotted line is the user data on the U-plane. In the LTE system according to the second embodiment, the uplink process is the same as in the first embodiment, and therefore only the downlink process will hereinafter be discussed.

<Downlink Process>

The operations in (S1), (S2), (S3) in FIG. 20 are the same as those in the first embodiment illustrated in FIG. 11, and hence their explanations are herein simplified. The S-eNB 10(#1), upon determining the handover for the UE 7 (S1), sends the Relocation Required message to the S-MME 20(#1) (S2). The S-MME 20(#1), when receiving this message, recognizes that the S1 base handover for the UE 7 has been determined, and transmits the Forward Relocation Request message to the T-MME 20(#6) (S3).

The T-MME 20(#6), when receiving the Forward Relocation Request message (S3), detects the T-SAE-GW 30(#6) as the SAE-GW that manages the T-eNB 10(#6), and transmits the Create Context Request (SAE-GW) message to the T-SAE-GW 30(#6) (S4a). The T-SAE-GW 30(#6), upon receiving this message, transmits the Keep data Request message to the PDN-SAE-GW 40(#1) (S4ay). This Keep data Request message is utilized for instructing the PDN-SAE-GW 40(#1) to detect the handover for the UE 7, then transmit the downlink data addressed to the UE 7 and retain the copy thereof.

The PDN-SAE-GW 40(#1), upon receiving the Keep data Request message (S4ay), hereafter continues to transmit the downlink data addressed to the UE 7 to the S-SAE-GW 30(#1) and retains the copy thereof. The PDN-SAE-GW 40(#1), on the occasion of retaining the user data, retains the user data together with the same identification number as that of the same user data that has already been downlinked toward the source side. The PDN-SAE-GW 40(#1), thereafter, sends the Keep data Response message back to the T-SAE-GW 30(#6) (S4by).

The T-SAE-GW 30(#6), when receiving this Keep data Response message (S4by), transmits the Create Context Response (SAE-GW) message to the T-MME 20(#6) (S4b).

The T-MME 20(#6), upon receiving this message, transmits the Relocation Request message to the T-eNB 10(#6) (S5a).

The T-eNB 10(#6), when receiving this Relocation Request message, generates a UE context related to the UE 7 on the basis of the information such as the bearer and the security context contained in this message. Further, the T-eNB 10(#6) allocates the tunnel end point information (D-eNB-TEID) for the downlink traffic (S1 user plane) for the UE 7 with respect to the GTP tunnel between the T-SAE-GW 30(#6) and the T-eNB 10(#6) itself. The T-eNB 10(#6) sends the Relocation Request Acknowledge message containing this D-eNB-TEID back to the T-MME 20(#6) (S5b).

Hereafter, the processes (operations) in (S6), (S7a), (S7b), (S9) are the same as those in the first embodiment, and hence their explanations are omitted. Note that till the Handover Command message is sent to the UE 7 from the S-eNB 10(#1) (S9), the UE 7 remains in the connecting status with the S-eNB 10(#1) and therefore receives the data downlinked via the S-SAE-GW 30(#1) and the S-eNB 10(#1) (S10x). The PDN-SAE-GW 40(#1), however, retains the downlink data that will have been received by the UE 7 after sending the Keep data Request message.

The UE 7, when receiving the Handover Command message (S9), withdraws from the precedent cell managed by the S-eNB 10(#1), and starts the synchronizing process with the present cell managed by the T-eNB 10(#6). The UE 7, when taking the synchronism with the present cell, sends the Handover Confirm message to the T-eNB 10(#6) (S11).

At this time, the UE 7 gets the identification number specifying the downlink data, which can not be normally received from the S-eNB 10(#1), contained in the Handover Confirm message. Namely, the UE 7 requests the LTE system for the downlink data after the data, which can not be normally received, through this message.

The T-eNB 10(#6), upon receiving the Handover Confirm message from the UE 7, detects the approval of the handover for the UE 7 and transmits the Relocation Complete message including the downlink data identification number contained in this message to the T-MME 20(#6) (S12).

The T-MME 20(#6), when receiving this Relocation Complete message, detects the approval of the handover for the UE 7, and extracts the downlink data identification number contained in this message. The T-MME 20(#6) transmits the Update Context Request (SAE-GW) message containing the previously-retained D-eNB-TEID and the extracted identification number to the T-SAE-GW 30(#6) (S14).

The T-SAE-GW 30(#6), when receiving this Update Context Request (SAE-GW) message, detects the approval of the handover for the UE 7, and extracts the D-eNB-TEID and the identification number contained in this message. The extracted D-eNB-TEID is hereafter utilized on the occasion of transmitting the downlink data addressed to the UE 7, which is sent from the PDN-SAE-GW 40(#1), to the T-eNB 10(#6).

Further, the T-SAE-GW 30(#6) allocates the tunnel end point information (D-SAEGW-TEID) for the downlink traffic (S1 user plane) for the UE 7 with respect to the GTP tunnel between the PDN-SAE-GW 40(#1) and the GW 30(#6) itself. The T-SAE-GW 30(#6) transmits the Update Context Request (PDN-SAE-GW) message containing the allocated D-SAEGW-TEID and the downlink data identification number to the PDN-SAE-GW 40(#1) (S15a).

The PDN-SAE-GW 40(#1), when detecting the approval of the handover for the UE 7 by receiving this message, switches over (path switchover) the signals addressed to the UE 7 to the handover destination (to the target side). Specifically, the PDN-SAE-GW 40(#1) hereafter transmits the downlink data addressed to the UE 7 only via a route of the T-SAE-GW 30(#6) and the T-eNB 10(#6) on the S1 user plane (S30y). At this time, the PDN-SAE-GW 40(#1) downlinks the user data by use of the D-SAEGW-TEID extracted from the Update Context Request (PDN-SAE-GW) message.

At this time, the PDN-SAE-GW 40(#1) starts transmitting, to the T-SAE-GW 30(#6), the data in the sequence from the data specified by the identification number extracted from the Update Context Request (PDN-SAE-GW) message in the retained downlink data addressed to the UE 7 (S30y).

The PDN-SAE-GW 40(#1), thereafter, sends the Update Context Response (PDN-SAE-GW) message back to the T-SAE-GW 30(#6) (S15b).

Thereafter, the processes (operations) in (S16), (S13a), (S13b), (S17), (S17x), (S18x) are the same as those in the first embodiment, and the individual explanations thereof are omitted.

Operation and Effect in Second Embodiment

In the LTE system according to the second embodiment, in the same way as in the first embodiment, when the S-eNB 10(#1) determines the handover for the UE 7, the PDN-SAE-GW 40(#1) is immediately notified of this determination by use of the C-plane control message. With this operation, when the PDN-SAE-GW 40(#1) detects the handover for the UE 7, hereafter the user data addressed to the UE 7 is continuously downlinked, and the copy thereof and the same identification number as the identification number attached thereto are retained by the PDN-SAE-GW 40(#1).

Thereafter, the notification of the approval of the handover from the UE 7 is sent to the PDN-SAE-GW 40(#1) via the eNB 10, the MME 20 and the SAE-GW 30 on the connection destination side (target side) through the C-plane control message. The notification of the approval of the handover contains the identifying information specifying the downlink data that can not be normally received by the UE 7 on the connection source side (source side).

With this scheme, the PDN-SAE-GW 40(#1) receives, from the target side, the downlinked data after the data specified by the identifying information in the sequence from the user data specified by the identifying information requested by the UE 7 in the user data which has already been downlinked to the source side and retained after detecting the handover.

The UE 7 is thereby enabled to receive, even when the S1 base handover takes place, the downlink data from the eNB 10 on any one of the source side and the target side, and can therefore receive all the data without causing any leak of the data. The UE 7 notifies the system of the identifying information for specifying the downlink data, which can not be received from the S-eNB 10(#1) before the approval of the handover, and is thereby enabled to receive the downlink data from the T-eNB 10(#6).

Furthermore, according to the second embodiment, the user data is transmitted to one of the source side and the target side, and it is therefore feasible to reduce the consumption of the communication bandwidths to a greater degree than by the first embodiment.

According to the second embodiment, on the occasion of realizing the downlink process without any leak of the data when in the S1 base handover, the C-plane control messages can be made smaller than by the first embodiment. According to the first embodiment, the PDN-SAE-GW 40(#1) is notified of the handover for the UE 7, and the start of the Bi-casting entails ensuring fast the communication resources on the target side. The second embodiment has no necessity for taking this point into consideration, so that the C-plane control messages can be made smaller than by the first embodiment.

With this scheme, the second embodiment can reduce the consumption of the communication resources utilized for the C-plane control messages to the greater degree than by the first embodiment.

First Modified Example

The LTE system in a first modified example will hereinafter be described. The first modified example shows a modification of the LTE system in the first embodiment as below.

In the LTE system according to the first embodiment, as for the downlink data, which is Bi-cast from the PDN-SAE-GW 40(#1) and retained by the T-eNB 10(#6), the T-eNB 10(#6) receives the Handover Confirm message containing the identification number specifying the data desired by the UE 7, whereby the data after the data specified by the identification number is sequentially transmitted to the UE 7. Namely, in the LTE system according to the first embodiment, in the case of receiving the downlink data from the S-eNB 10(#1) in a state of having a missing number in the sequence of the identification numbers, the UE 7 might in some cases receive redundantly the already-received data from the T-eNB 10(#6) because the T-eNB 10(#6) has transmitted the downlink data after the data specified by the missing identification number.

Moreover, when the user data is uplinked in the first embodiment, the S-eNB 10(#1), if unable to receive the data in the due sequence after determining the handover, does not transmit the uplink data after the data received in the non-due sequence to the S-SAE-GW 30(#1) but retains this uplink data, and sequentially transmits the data after the data, which can not be normally uplinked to the S-eNB 10(#1) when the UE 7 transmits the Handover Confirm message to the T-eNB 10(#6), to the T-eNB 10(#6). Namely, the PDN-SAE-GW 40(#1) in the first embodiment sequentially receives, from the source side, only the uplink data received in the due sequence by the S-eNB 10(#1) and receives, if the S-eNB 10(#1) receives the uplink data in the state of having the missing number in the sequence of the identification numbers, the uplink data after the data specified by the missing identification number from the target side.

Herein, a scheme given herein by way of the first modified example is that when downlinked, the Handover Confirm message contains the identification numbers of want-to-downlink pieces of data of the UE 7, and the T-eNB 10(#6) may transmit, to the UE 7, only the data specified by each identification number contained in the message in the retained downlink data.

Similarly, another scheme given by way of the first modified example is that when uplinked, the S-eNB 10(#1) transmits all the received uplink data to the high-order node, and the UE 7 may transmit, to the T-eNB 10(#6), only the fail-to-uplink data to the S-eNB 10(#1).

Note that the system architecture of the LTE system in the first modified example is the same as in the first embodiment illustrated in FIG. 1, and hence its description is omitted herein.

[Configuration of Device]

The functions of the individual devices (nodes) configuring the LTE system in the first modified example will hereinafter be explained. The MME 20 and the SAE-GW 30 have nothing changed as compared with the first embodiment, and therefore their descriptions are herein omitted. Only the function units different from those in the first embodiment will be hereinafter be described.

<eNB>

A functional configuration of the eNB 10 in the first modified example is the same as in the first embodiment. Functions of the retain data transmission unit 48 and the uplink data management unit 51, which are included in the U-plane processing unit 46 are, however, different to some extent from the first embodiment.

The retain data transmission unit 48 in the first modified example, when instructed to transmit the retain data together with the identification number of the downlink data requested by the UE 7, transmits the data specified by each identification number in the downlink data retained by the Bi-casting data retaining unit 47 in the sequence according to the identification numbers to the baseband processing unit 42.

The uplink data management unit 51 in the first modified example, upon receiving the uplink data, forwards, without performing the sequence control thereof, the uplink data to the SAE-GW 30 via the S1-U interface unit 40.

With this operation, the retain data transmission unit 48 in the first modified example is not required to conduct the sequence management of the uplink data. Further, there is no uplink data to be retained, so that there is no necessity for executing the process of deleting the data in the communication resource release process.

<PDN-SAE-GW>

A functional configuration of the PDN-SAE-GW 40 in the first modified example is the same as in the first embodiment. A function of the uplink data management unit 76 included in the U-plane processing unit 73 is, however, more or less different from the first embodiment.

The uplink data management unit 76 in the first modified example, upon receiving the uplink data from the UE 7, rearranges the uplink data and checks the data redundancy based on the identification number (SAE-PSAE identification number) of the data sent together with the uplink data. The PDN-SAE-GW 40 in some cases might receive, similarly to the first embodiment, with respect to the uplink data from the UE 7, redundantly the same data from both of the S-SAE-GW 30 and the T-SAE-GW 30 and might receive the data in random order.

Accordingly, the uplink data management unit 76 checks and deletes the same redundant data as in the first embodiment, and executes the process of rearranging the uplink data according to the identification numbers. The redundant data is thus deleted, and the properly rearranged uplink data is forwarded in the sequence of the identification numbers to another network.

Operational Example

Figure 22:
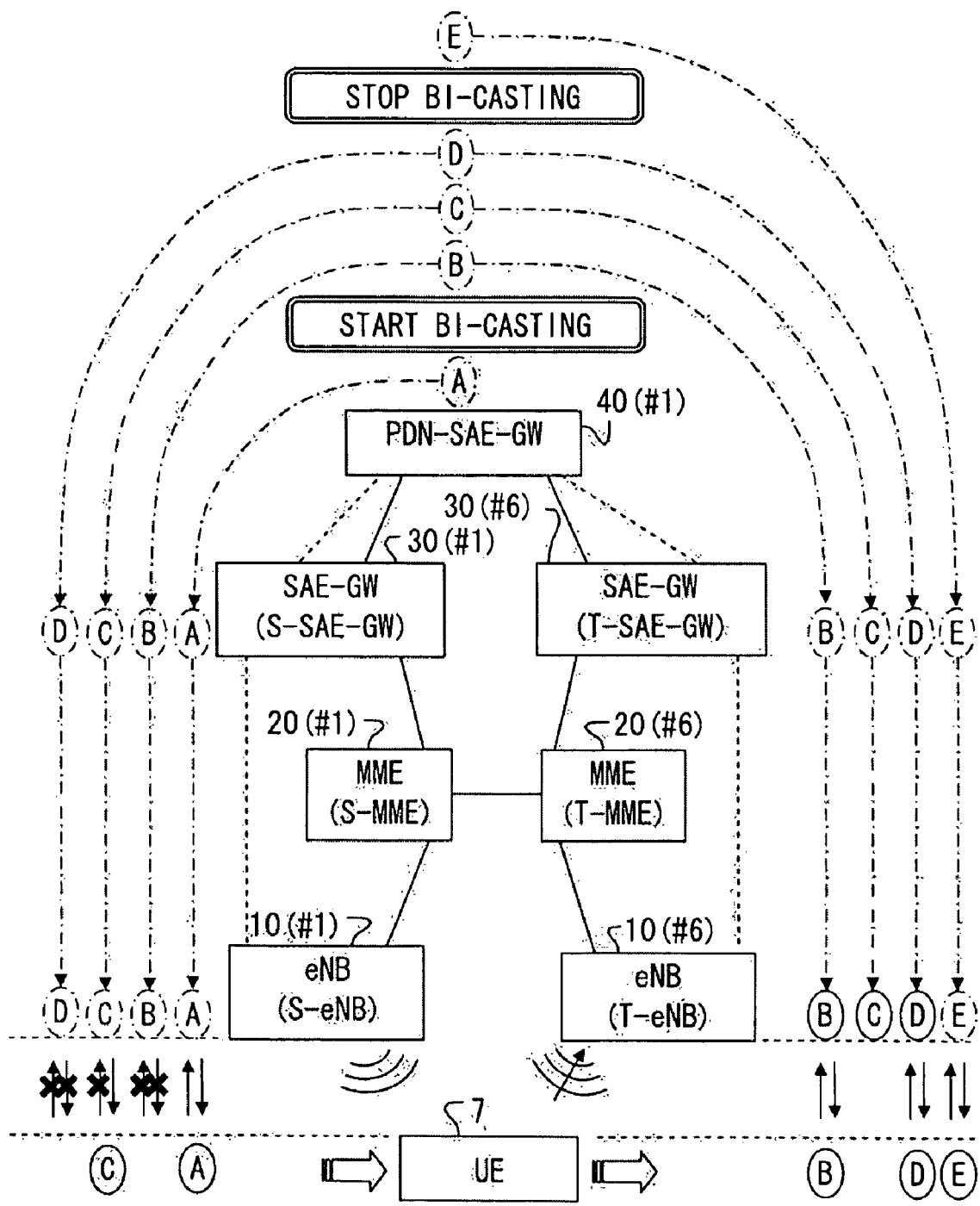
FIG. 22 is a diagram showing the user data downlink process when taking the S1 base handover by the LTE system in a first modified example.
Figure 23:
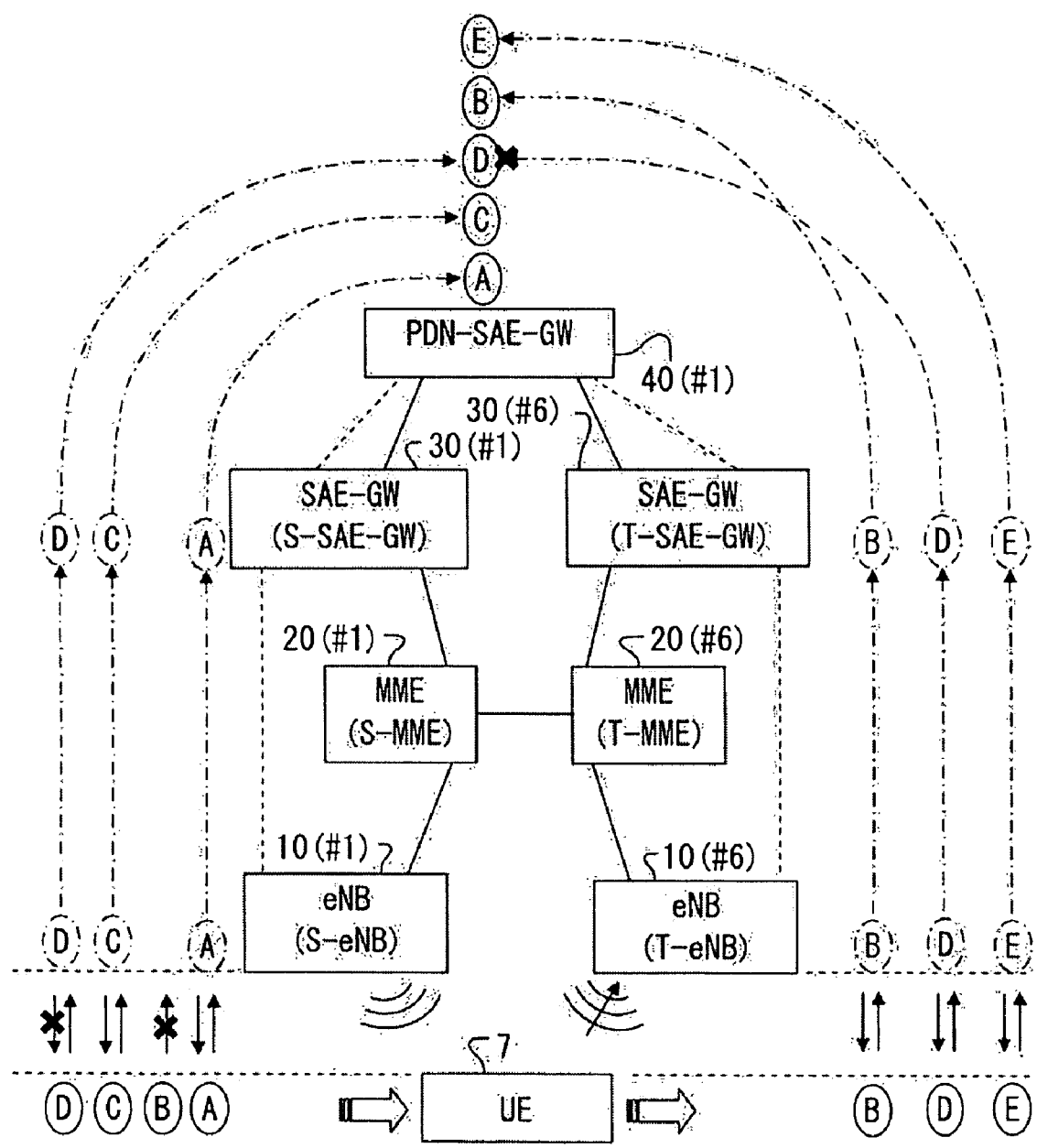
FIG. 23 is a diagram showing the user data uplink process when taking the S1 base handover by the LTE system in the first modified example.

An operational example of the LTE system in the first modified example will hereinafter be described with reference to FIGS. 22 and 23. FIG. 22 is a diagram showing a user data downlink process when taking the S1 base handover in the LTE system in the first modified example. FIG. 23 is a diagram showing a user data uplink process when taking the S1 base handover in the LTE system in the first modified example. FIGS. 22 and 23 each show the same scene as in the example illustrated in FIGS. 3 and 4, and exemplify a case in which the UE 7 takes the S1 base handover from the eNB 10(#1) to the eNB 10(#6).

<Downlink Process>

The PDN-SAE-GW 40(#1) holds the data, A, B, C, D, E as the downlink data (user data) addressed to the UE 7, and the UE 7 connects to the S-eNB 10(#1). The downlink data A and C transmitted from the PDN-SAE-GW 40(#1) is delivered to the UE 7 via the S-SAE-GW 30(#1) and the S-eNB 10(#1). The downlink data B is not normally downlinked to the UE 7 from the S-eNB 10(#1). Further, the S-eNB 10(#1) recognizes that the downlink data C can not be normally downlinked to the UE 7, while the UE 7 recognizes that the data is normally downlinked. In such a status, the UE 7 moves from the S-eNB 10(#1) toward the T-eNB 10(#6).

In the LTE system, the S-eNB 10(#1) determines the handover for the UE 7, and the PDN-SAE-GW 40(#1) starts the Bi-casting by the same method as in the first embodiment. Through this operation, the T-eNB 10(#6) retains the Bi-cast downlink data B, C, D till the Bi-casting is stopped.

The UE 7 receives the Handover Command message from the S-eNB 10(#1) and, when approving the handover process for the UE 7 itself, transmits the Handover Confirm message to the T-eNB 10(#6). At this time, the UE 7 gets each identification number specifying the non-received downlink data contained in the Handover Confirm message. The example in FIG. 22 shows that the Handover Confirm message contains the identification number specifying the downlink data B and the identification numbers specifying the data from the downlink data C onward.

The T-eNB 10(#6), when receiving this Handover Confirm message, sequentially transmits, to the UE 7, only the retained downlink data specified by the respective identification numbers contained in this message.

<Uplink Process>

Next, the user data uplink process when taking the S1 base handover in the LTE system according to the first modified example will be described with reference to FIG. 23.

The UE 7 holds the data A, B, C, D, E as the uplink data (user data) and connects to the S-eNB 10(#1). The UE 7 moves from the S-eNB 10(#1) toward the T-eNB 10(#6) while transmitting the uplink data A to the PDN-SAE-GW 40(#1) via the S-eNB 10(#1) and the S-SAE-GW 30(#1).

According to the example in FIG. 23, the uplink data A, C, D are normally received by the S-eNB 10(#1). The S-eNB 10(#1) sequentially transmits the received uplink data A, C, D to the S-SAE-GW 30(#1) irrespective of the receiving sequence.

Herein, the UE 7 recognizes that the uplink data B, D can not be properly transmitted. The uplink data D properly reaches the S-eNB 10(#1), and nevertheless an ACK signal thereof does not reach the UE 7, resulting in occurrence of such an error.

The UE 7, when receiving the Handover Command message from the S-eNB 10(#1) and approving the handover process for the UE 7 itself, transmits the Handover Confirm message to the T-eNB 10(#6). Subsequently, the UE 7 wirelessly sequentially transmits, to the T-eNB 10(#6), the uplink data B, D determined not to normally reach the S-eNB 10(#1) and further the data subsequent thereto.

The PDN-SAE-GW 40(#1) receives the uplink data from the UE 7 via a route of the S-eNB 10(#1) and the S-SAE-GW 30(#1) and a route of the T-eNB 10(#6) and the T-SAE-GW 30(#6). The example in FIG. 23 is that the PDN-SAE-GW 40(#1), after receiving the uplink data A, C, D from the source side, receives the uplink data B, D, E from the target side. Namely, the PDN-SAE-GW 40(#1) receives the uplink data in the random order.

Accordingly, the PDN-SAE-GW 40(#1), on the occasion of transmitting these pieces of uplink data to another network, rearranges the uplink data. Further, as in the case of the uplink data D, there is the data that is redundantly delivered from both of the source side and the target side. The PDN-SAE-GW 40(#1) therefore deletes the redundant uplink data.

The PDN-SAE-GW 40(#1) in the first modified example, as compared with the first embodiment, needs to perform the sequence control of the uplink data, however, reversely the eNB 10 does not need to conduct the sequence management of the uplink data.

Second Modified Example

The LTE system in a second modified example will hereinafter be described. The second modified example is contrived to modify the LTE system in the second embodiment as below.

In the LTE system according to the second embodiment, as to the downlink data retained by the PDN-SAE-GW 40(#1), the T-eNB 10(#6) receives the Handover Confirm message containing the identification number specifying the data desired by the UE 7, then the PDN-SAE-GW 40(#1) is notified of this identification number, and the data after the data specified by this identification number is sequentially transmitted to the UE 7. Namely, in the LTE system according to the second embodiment, in the case of receiving the downlink data from the S-eNB 10(#1) in the state of having the missing number in the sequence of the identification numbers, the UE 7 might, because of the PDN-SAE-GW 40(#1) transmitting the downlink data after the data specified by the missing identification number in the data retained by the PDN-SAE-GW 40, receive redundantly the already-received data in some cases.

A scheme given herein by way of the second modified example is that when downlinked, the Handover Confirm message may contain the identification numbers of the respective pieces of data that the UE 7 desires to downlink, and the PDN-SAE-GW 40(#1) may transmit, to the UE 7, only the data specified by each of the identification numbers contained in the message in the retained downlink data. The uplink process in the second modified example may involve, with the uplink process in the second embodiment being the same as in the first embodiment, applying the uplink process in the first modified example discussed above. Accordingly, the discussion herein will be focused on the downlink process in the second modified example.

The system architecture of the LTE system in the second modified example and the functional configuration of each of the nodes are the same as those in the second embodiment, and hence their descriptions are herein omitted.

Operational Example

Figure 24:
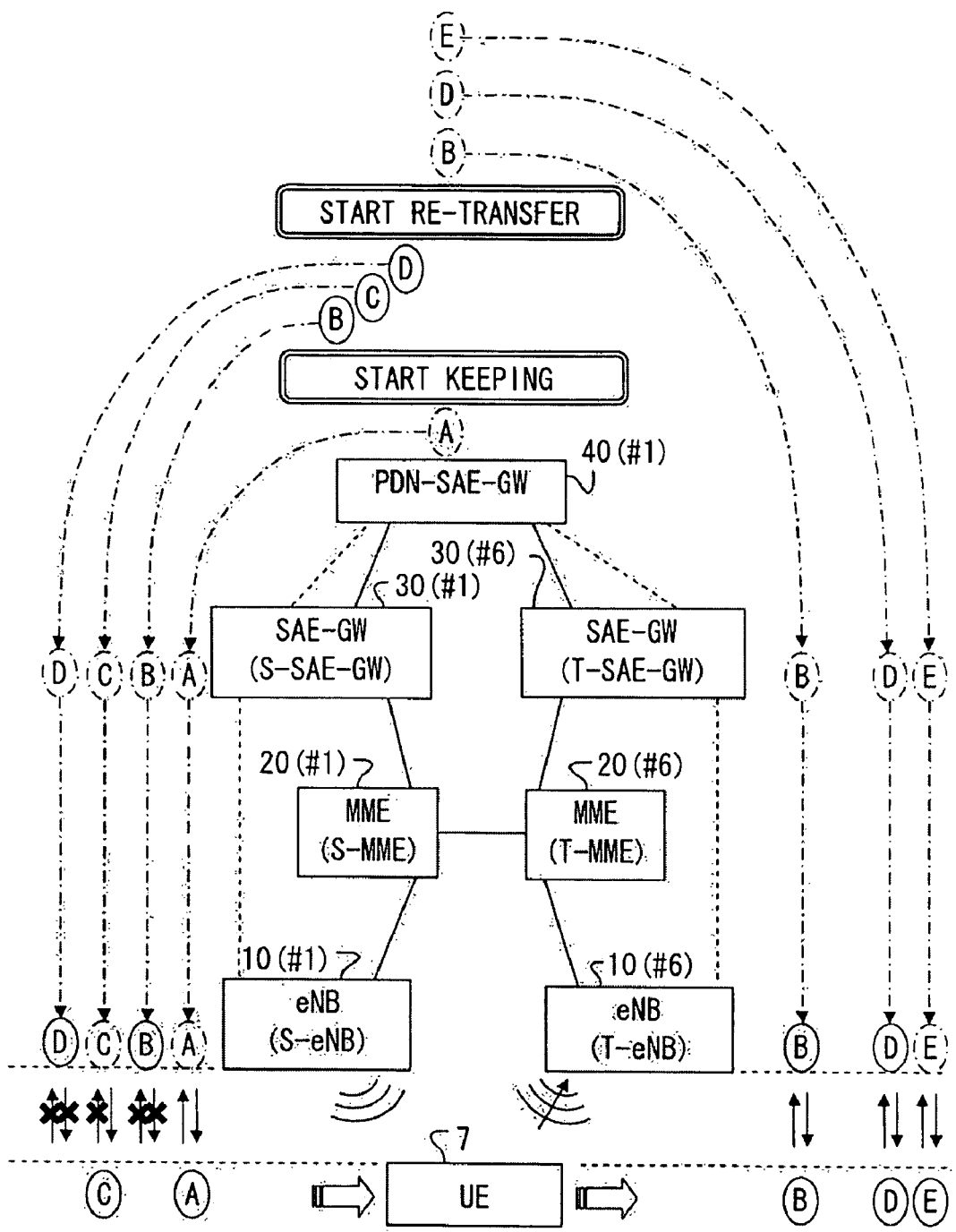
FIG. 24 is a diagram showing the user data downlink process when taking the S1 base handover by the LTE system in a second modified example.
Figure 25:
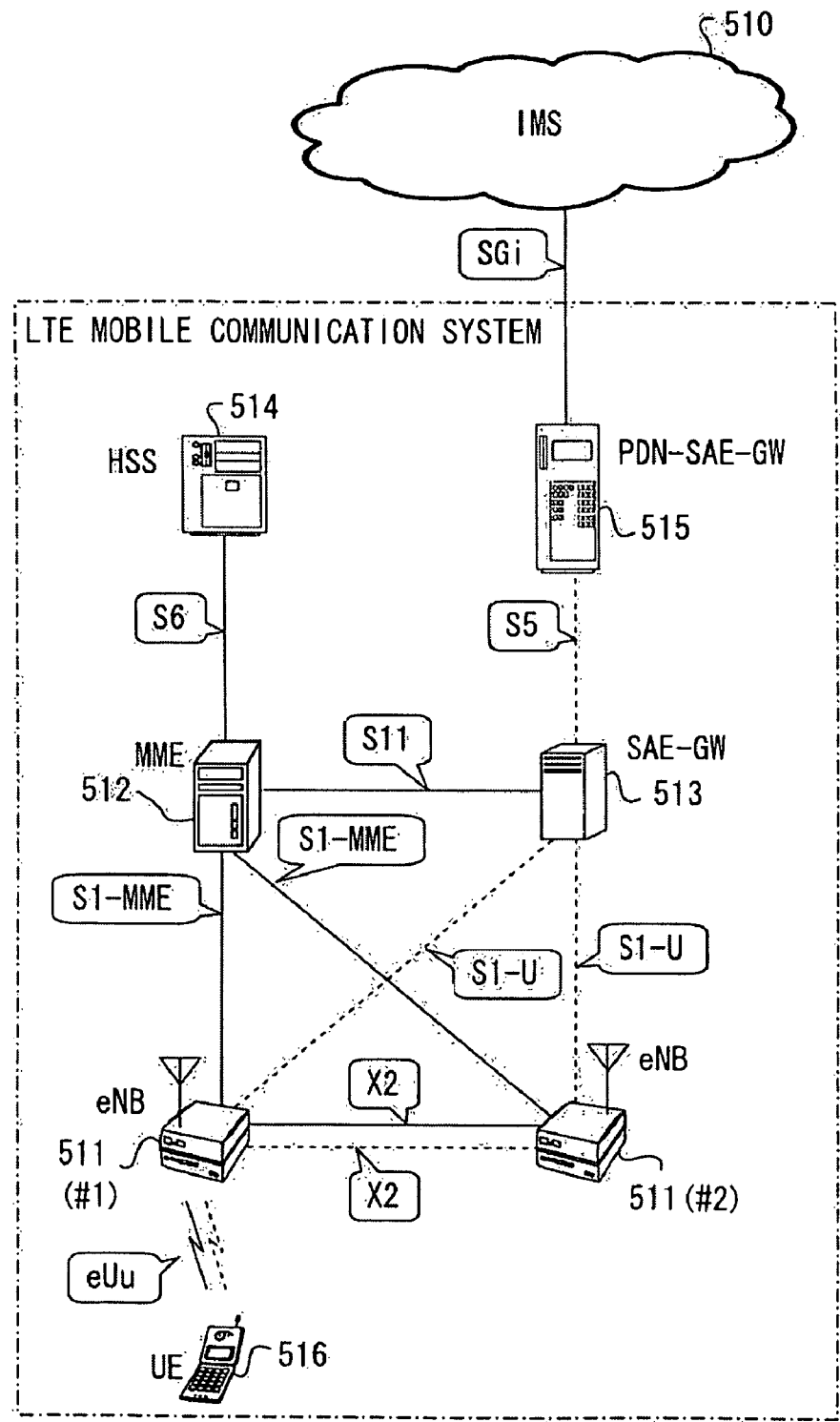
FIG. 25 is a diagram showing an example of a logical configuration of the LTE mobile communication system.

An operational example of the LTE system in the second modified example will hereinafter be described with reference to FIG. 24. FIG. 24 is a diagram showing the user data downlink process when taking the S1 base handover by the LTE system in the second modified example. FIG. 24 illustrates the same scene as in the example shown in FIG. 3, and exemplifies a case in which the UE 7 takes the S1 base handover from the eNB 10(#1) to the eNB 10(#6).

<Downlink Process>

An example of the scene illustrated in FIG. 24 is the same as the example shown in FIG. 15. The downlink data A, C transmitted from the PDN-SAE-GW 40(#1) are normally delivered to the UE 7. The S-eNB 10(#1) recognizes that the downlink data C could not be normally downlinked to the UE 7 because of being unable to receive the ACK signal from the UE 7, while the UE 7 recognizes that the downlink data C was normally downlinked.

In the LTE system, the S-eNB 10(#1) determines the handover for the UE 7, and the PDN-SAE-GW 40(#1) is notified of this handover by the same method as in the first embodiment. Through this operation, the PDN-SAE-GW 40(#1) continuously transmits the downlink data to the source side, and retains the copy of this data.

The UE 7, when receiving the Handover Command message from the S-eNB 10(#1) and approving the handover for the UE 7 itself, sends the Handover Confirm message to the T-eNB 10(#6). At this time, the UE 7 gets each identification number specifying the non-received downlink data contained in this Handover Confirm message. The example in FIG. 24 shows that the Handover Confirm message contains the identification number specifying the downlink data B and the identification numbers specifying pieces of data subsequent to the downlink data C onwards. The PDN-SAE-GW 40(#1) is notified of these identification numbers by the same method as in the second embodiment in a way that uses the C-plane control message.

With this scheme, the PDN-SAE-GW 40(#1), when receiving this Handover Confirm message, sequentially transmits, to the target side, only the data specified by the individual identification numbers contained in this message in the retained downlink data.

[Others]
[Concerning Hardware Components and Software Components]

The hardware components represent hardware circuits exemplified by a Field Programmable Gate Array (FPGA), an Application Specific Integrated Circuit (ASIC), a gate array, a combination of the logic gates, a signal processing circuit, an analog circuit, etc.

The software components represent components (segments) for realizing the above-mentioned functions as the software but do not imply any concept that limits languages and development environments, etc, which realize the software. The software components are exemplified by a task, a process, a thread, a driver, firmware, a database, a table, a function, a procedure, a subroutine, a predetermined part of program codes, a data structure, an array, a variable, a parameter, etc. These software components are realized on a single or a plurality of memories (a single or a plurality of processors (e.g., a CPU (Central Processing Unit), a DSP (Digital Signal Processor), etc).

It is to be noted that the respective embodiments do not limit the methods of realizing the individual function units, and therefore the respective function units may be configured by the methods actualized by ordinary technicians in the field of the present technology by way of the hardware components or the software components or the combinations thereof.

What is claimed is:

1. A mobile communication system comprising a plurality of nodes, hierarchically connected to each other, including a source base station wirelessly connected to a mobile terminal, and a target base station to which the mobile terminal connects after moving,
   a U-plane management station defined as a high-order node connected to both of the source base station and the target base station and managing a user plane, including:
   a first processor which executes processes comprising:
   detecting a handover for the mobile terminal; and
   transmitting, when detecting the handover for the mobile terminal, the same user data addressed to the mobile terminal toward both of the source base station and the target base station,
   the target base station including:
   a second processor which executes processes comprising:
   receiving the user data addressed to the mobile terminal, which is transmitted by the U-plane management station, and retaining the user data; and
   a wireless transmitter to wirelessly transmit, when receiving, from the mobile terminal, a handover confirm message including at least one identification number specifying the user data desired by the mobile terminal, the user data desired by the mobile terminal in the user data retained by the second processor and addressed to the mobile terminal,
   a third processor of the source base station executing:
   managing, when receiving the user data and identifying information specifying the user data wirelessly transmitted from the mobile terminal after detecting the handover for the mobile terminal, a sequence of the received user data based on the identifying information specifying the user data; and
   forwarding, if the third processor determines that the received user data is received in a due sequence, the received user data to the U-plane management station, and, whereas if the third processor determines that the received user data is not received in the due sequence, does not forward but retains the received user data.

2. The mobile communication system according to claim 1, wherein the first processor of the U-plane management station executes attaching-the same identification number to the same user data transmitted toward both of the source base station and the target base station, and transmitting the same user data together with the identification number attached thereto, and the wireless transmitter of the target base station receives the identification number specifying the user data desired by the mobile terminal from the mobile terminal and selects, based on the received identification number, the should-be-wirelessly-transmitted user data from within the user data retained by the second processor and addressed to the mobile terminal.

3. The mobile communication system according to claim 1, the source base station including:

the third processor which executes processes comprising:
determining the handover for the mobile terminal; and
transmitting, when the handover is determined by the third processor, a message containing notification of the determination of the handover to the U-plane management station via a source C-plane management station defined as a high-order node over the source base station and managing a control plane of the source base station, via a target C-plane management station defined as a high-order node over the target base station and managing the control plane of the target base station, via the target base station, and via a target U-plane management station defined as a high-order node over the target base station and managing the user plane of the target base station, and wherein the first processor of the U-plane management station executes detecting the handover for the mobile terminal by receiving a message containing the notification of the determination of the handover.

4. The mobile communication system according to claim 3, wherein the target U-plane management station includes a fourth processor which executes processes, and the second processor of the target base station and the fourth processor of the target U-plane management station executes
ensuring, when receiving the message containing the notification of the determination of the handover, a communication resource used for the user data to be downlinked to the mobile terminal from the U-plane management station, and forwarding information showing the ensured communication resource together with the message containing the notification of the determination of the handover.

5. The mobile communication system according to claim 2, wherein the wireless transmitter of the target base station receives the identification number specifying the user data desired by the mobile terminal from the mobile terminal, and wirelessly transmits the user data after the data specified by the received identification number in the sequence of the identification numbers from within the user data retained by the second processor and addressed to the mobile terminal.

6. The mobile communication system according to claim 2, wherein the wireless transmitter of the target base station receives the identification number specifying the user data desired by the mobile terminal respectively from the mobile terminal, and wirelessly transmits the user data specified by each received identification number in the sequence of the identification numbers from within the user data retained by the second processor and addressed to the mobile terminal.

7. The mobile communication system according to claim 2, the source C-plane management station including:

a fifth processor which executes processes comprising:
receiving a message containing notification of an approval of the handover for the mobile terminal via the target base station and the target C-plane management station; and
notifying, when receiving the message containing the notification of the approval of the handover for the mobile terminal, the source base station and the source U-plane management station of a resource release instruction, and
the source base station, upon receiving the resource release instruction, deletes the user data transmitted from the U-plane management station and received after the movement of the mobile terminal.

8. The mobile communication system according to claim 1, the second processor of the target base station executing:

receiving, when the mobile terminal is wirelessly connected after moving, the user data, of which delivery confirmation has not been received from the source base station by the mobile terminal, from the mobile terminal in the sequence, and forwarding the received user data to the U-plane management station.

9. The mobile communication system according to claim 1, the second processor of the target base station executing:

receiving, when the mobile terminal is wirelessly connected after moving, the user data, of which delivery confirmation has not been received from the source base station by the mobile terminal, respectively from the mobile terminal, and forwarding the received user data to the U-plane management station, and the first processor of the U-plane management station executing:
rearranging the user data received via the source base station and the target base station in the sequence according to the identification numbers each specifying the user data.

10. A mobile communication system comprising a plurality of nodes, hierarchically connected to each other, including a source base station wirelessly connected to a mobile terminal, and a target base station to which the mobile terminal connects after moving, a U-plane management station defined as a high-order node connected to both of the source base station and the target base station and managing a user plane, including:
a first processor which executes processes comprising:
detecting a handover for the mobile terminal;
retaining, after detecting the handover for the mobile terminal, on the occasion of transmitting the user data addressed to the mobile terminal toward the source base station, a copy of the user data; and
transmitting, when the target base station receives, from the mobile terminal, a handover confirm message including at least one identification number specifying the user data desired by the mobile terminal, the user data desired by the mobile terminal toward the target base station in the user data retained by the first processor and addressed to the mobile terminal, the source base station including:
a third processor which executes processes comprising:
managing, when receiving the user data and identifying information specifying the user data wirelessly transmitted from the mobile terminal after detecting the handover for the mobile terminal, a sequence of the received user data based on the identifying information specifying the user data; and
forwarding, if the third processor determines that the received user data is received in a due sequence, the received user data to the U-plane management station, and, whereas if the third processor determines that the received user data is not received in the due sequence, does not forward but retains the received user data.

11. The mobile communication system according to claim 10, wherein the first processor of the U-plane management station executes attaching-the same identification number as the identification number attached to the user data already transmitted toward the source base station, to the user data retained as the copy of the user data by the first processor, and the first processor of the U-plane management station executes acquiring the identification number specifying the user data desired by the mobile terminal via the target base station, and selecting, based on the acquired identification number, the user data that should be transmitted toward the target base station from within the user data retained by the first processor and addressed to the mobile terminal.

12. The mobile communication system according to claim 11, the target base station including:

a second processor which executes processes comprising:

getting, when receiving a message containing the identification number specifying the user data desired by the mobile terminal from the mobile terminal, this identification number contained in a predetermined message, and forwarding the predetermined message to a target C-plane management station defined as a high-order node over the target base station and managing a control plane of the target base station, and wherein the first processor of the U-plane management station acquires the identification number specifying the user data desired by the mobile terminal through a message received via the target C-plane management station and via the target U-plane management station defined as a high-order node over the target base station and managing the user plane of the target base station.

13. The mobile communication system according to claim 11, wherein the first processor of the U-plane management station executes transmitting, toward the target base station, the user data after the data specified by the identification number acquired via the target base station in the sequence according to the identification numbers from within the user data retained by the first processor.

14. The mobile communication system according to claim 11, wherein the first processor of the U-plane management station executes transmitting, toward the target base station, respectively the user data specified by each identification number acquired via the target base station from within the user data retained by the first processor.

15. The mobile communication system according to claim 10, the second processor of the target base station executing:

receiving, when the mobile terminal is wirelessly connected after moving, the user data, of which delivery confirmation has not been received from the source base station by the mobile terminal, from the mobile terminal in the sequence, and forwarding the received user data to the U-plane management station.

16. The mobile communication system according to claim 10, the second processor of the target base station executing:

receiving, when the mobile terminal is wirelessly connected after moving, the user data, of which delivery confirmation has not been received from the source base station by the mobile terminal, respectively from the mobile terminal, and forwarding the received user data to the U-plane management station, and the first processor of the U-plane management station executing:

rearranging the user data received via the source base station and the target base station in the sequence according to the identification numbers each specifying the user data.

17. A user data downlink method in a mobile communication system comprising a plurality of nodes, hierarchically connected to each other, including a source base station wirelessly connected to a mobile terminal, and a target base station to which the mobile terminal connects after moving, a U-plane management station defined as a high-order node connected to both of the source base station and the target base station and managing a user plane, executing:

detecting a handover for the mobile terminal; and redundantly transmitting, when detecting the handover for the mobile terminal, the same user data addressed to the mobile terminal toward both of the source base station and the target base station, the target base station executing:

receiving the user data addressed to the mobile terminal, which is transmitted by the U-plane management station, and retaining the user data in a retaining unit; and wirelessly transmitting, when receiving, from the mobile terminal, a handover confirm message including at least one identification number specifying the user data desired by the mobile terminal, the user data desired by the mobile terminal in the user data retained in the retaining unit and addressed to the mobile terminal, the source base station executing:

managing, when receiving the user data and identifying information specifying the user data wirelessly transmitted from the mobile terminal after detecting the handover for the mobile terminal, a sequence of the received user data based on the identifying information specifying the user data; and forwarding, if the source base station determines that the received user data is received in a due sequence, the received user data to the U-plane management station, and, whereas if the source base station determines that the received user data is not received in the due sequence, does not forward but retains the received user data.

* * * * *